United States Patent
Woodard et al.

(10) Patent No.: US 10,026,248 B2
(45) Date of Patent: Jul. 17, 2018

(54) INTEGRATED REAL ESTATE SHOWING SCHEDULING AND KEY MANAGEMENT SYSTEM

(71) Applicant: ShowingTime.com, Inc., Chicago, IL (US)

(72) Inventors: Scott E Woodard, Clarendon Hills, IL (US); Michael P Caputo, Aurora, IL (US); William Kellogg, Austin, TX (US)

(73) Assignee: ShowingTime.com, Chicago, IL (US)

( * ) Notice: Subject to any disclaimer, the term of this patent is extended or adjusted under 35 U.S.C. 154(b) by 0 days.

(21) Appl. No.: 15/669,712

(22) Filed: Aug. 4, 2017

(65) Prior Publication Data

US 2018/0061160 A1    Mar. 1, 2018

Related U.S. Application Data

(63) Continuation of application No. 15/250,486, filed on Aug. 29, 2016, now Pat. No. 9,761,071.

(51) Int. Cl.
| | |
|---|---|
| *G07C 9/00* | (2006.01) |
| *G06Q 10/10* | (2012.01) |
| *G06Q 10/06* | (2012.01) |
| *H04W 4/021* | (2018.01) |

(Continued)

(52) U.S. Cl.
CPC ... *G07C 9/00166* (2013.01); *G06Q 10/06311* (2013.01); *G06Q 10/1095* (2013.01); *G06Q 10/1097* (2013.01); *G06Q 50/16* (2013.01); *G07C 9/00571* (2013.01);

(Continued)

(58) Field of Classification Search
CPC ............ G07C 9/00166; G07C 9/00571; G07C 2209/08; G07C 9/00103; G07C 9/00174; G07C 9/0069; G06Q 50/16; G06Q 10/1095; G06Q 10/06311; G06Q 10/1097; G06Q 30/02; G06Q 10/00
See application file for complete search history.

(56) References Cited

U.S. PATENT DOCUMENTS

| | | |
|---|---|---|
| 5,014,049 A | 5/1991 | Bosley |
| 5,245,652 A | 9/1993 | Larson et al. |
| 5,280,518 A | 1/1994 | Danler et al. |

(Continued)

OTHER PUBLICATIONS

The KeyMe App, https://www.key.me/app.
MinuteKey, https://www.minutekey.com/.

*Primary Examiner* — Kabir A Timory
(74) *Attorney, Agent, or Firm* — Law Offices of Konrad Sherinian, LLC

(57) ABSTRACT

A system and method for dispensing a key from a key kiosk disposed at a realtor's office near a real property based on a showing appointment scheduled with a showing scheduling system. The appointment, including a date and time, as well as an authorized user is communicated from the showing scheduling system to the key kiosk. The user then authenticates herself or himself to the kiosk at the appropriate time, and the key is dispensed. The kiosk authenticates the user by scanning a QR code or using the physical location of the user. The kiosk will not dispense the key if the user has a different key that is checked out, but not returned yet. The key can be returned to the kiosk where it is dispensed, or a different key kiosk. The kiosk also dispenses a single common key when the user shows multiple properties.

11 Claims, 40 Drawing Sheets

(51) Int. Cl.
    *G06Q 50/16*        (2012.01)
    *G07F 11/00*        (2006.01)

(52) U.S. Cl.
    CPC ........ *G07C 9/00904* (2013.01); *H04W 4/021* (2013.01); *G07F 11/002* (2013.01)

(56) References Cited

U.S. PATENT DOCUMENTS

| | | |
|---|---|---|
| 5,475,375 A | 12/1995 | Barrett et al. |
| 5,612,683 A | 3/1997 | Trempala |
| 5,705,991 A | 1/1998 | Kniffin et al. |
| 5,974,406 A | 10/1999 | Bisdikian et al. |
| 6,101,480 A | 8/2000 | Conmy et al. |
| 6,157,315 A | 12/2000 | Kokubo et al. |
| 6,300,873 B1 | 10/2001 | Kucharczyk et al. |
| 6,385,541 B1 | 5/2002 | Blumberg |
| 6,522,875 B1 | 2/2003 | Dowling |
| 6,594,633 B1 | 7/2003 | Broerman |
| 6,624,742 B1 | 9/2003 | Romano et al. |
| 6,636,803 B1 | 10/2003 | Hartz, Jr. et al. |
| 6,727,801 B1 | 4/2004 | Gervasi |
| 6,973,432 B1 | 12/2005 | Woodard et al. |
| 7,009,489 B2 | 3/2006 | Fisher |
| 7,058,395 B2 | 6/2006 | Dowling |
| 7,193,503 B2 | 3/2007 | Fisher |
| 7,292,844 B2 | 11/2007 | Dowling et al. |
| 7,518,485 B2 | 4/2009 | Shuster |
| 7,606,558 B2 | 10/2009 | Despain et al. |
| 7,664,801 B2 | 2/2010 | Walker |
| 7,728,711 B2 | 6/2010 | Shoenfeld |
| 7,999,656 B2 | 8/2011 | Fisher |
| 8,035,480 B2 | 10/2011 | Woodard et al. |
| RE43,068 E | 1/2012 | Woodard et al. |
| 8,145,352 B2 | 3/2012 | Woodard et al. |
| 2001/0047282 A1 | 11/2001 | Raveis |
| 2003/0154573 A1 | 8/2003 | Gould |
| 2003/0179075 A1 | 9/2003 | Greenman |
| 2005/0168320 A1 | 8/2005 | Henderson et al. |
| 2005/0192930 A1 | 9/2005 | Hightower et al. |
| 2006/0106628 A1 | 5/2006 | Faherty et al. |
| 2006/0220809 A1 | 10/2006 | Stigall et al. |
| 2007/0100644 A1 | 5/2007 | Keillor |
| 2007/0290798 A1 | 12/2007 | Larson et al. |
| 2012/0246024 A1* | 9/2012 | Thomas ................ G06Q 30/06 705/26.41 |
| 2013/0282524 A1 | 10/2013 | Appolito |

\* cited by examiner

FIG. 17

|  | 0 | 0.01 | 0.02 | 0.03 | 0.04 | 0.05 | 0.06 | 0.07 | 0.08 | 0.09 |
|---|---|---|---|---|---|---|---|---|---|---|
| 0 | 0.5 | 0.504 | 0.508 | 0.512 | 0.516 | 0.5199 | 0.5239 | 0.5279 | 0.5319 | 0.5359 |
| 0.1 | 0.5398 | 0.5438 | 0.5478 | 0.5517 | 0.5557 | 0.5596 | 0.5636 | 0.5675 | 0.5714 | 0.5753 |
| 0.2 | 0.5793 | 0.5832 | 0.5871 | 0.591 | 0.5948 | 0.5987 | 0.6026 | 0.6064 | 0.6103 | 0.6141 |
| 0.3 | 0.6179 | 0.6217 | 0.6255 | 0.6293 | 0.6331 | 0.6368 | 0.6406 | 0.6443 | 0.648 | 0.6517 |
| 0.4 | 0.6554 | 0.6591 | 0.6628 | 0.6664 | 0.67 | 0.6736 | 0.6772 | 0.6808 | 0.6844 | 0.6879 |
| 0.5 | 0.6915 | 0.695 | 0.6985 | 0.7019 | 0.7054 | 0.7088 | 0.7123 | 0.7157 | 0.719 | 0.7224 |
| 0.6 | 0.7257 | 0.7291 | 0.7324 | 0.7357 | 0.7389 | 0.7422 | 0.7454 | 0.7486 | 0.7517 | 0.7549 |
| 0.7 | 0.758 | 0.7611 | 0.7642 | 0.7673 | 0.7704 | 0.7734 | 0.7764 | 0.7794 | 0.7823 | 0.7852 |
| 0.8 | 0.7881 | 0.791 | 0.7939 | 0.7967 | 0.7995 | 0.8023 | 0.8051 | 0.8078 | 0.8106 | 0.8133 |
| 0.9 | 0.8159 | 0.8186 | 0.8212 | 0.8238 | 0.8264 | 0.8289 | 0.8315 | 0.834 | 0.8365 | 0.8389 |
| 1 | 0.8413 | 0.8438 | 0.8461 | 0.8485 | 0.8508 | 0.8531 | 0.8554 | 0.8577 | 0.8599 | 0.8621 |
| 1.1 | 0.8643 | 0.8665 | 0.8686 | 0.8708 | 0.8729 | 0.8749 | 0.877 | 0.879 | 0.881 | 0.883 |
| 1.2 | 0.8849 | 0.8869 | 0.8888 | 0.8907 | 0.8925 | 0.8944 | 0.8962 | 0.898 | 0.8997 | 0.9015 |
| 1.3 | 0.9032 | 0.9049 | 0.9066 | 0.9082 | 0.9099 | 0.9115 | 0.9131 | 0.9147 | 0.9162 | 0.9177 |
| 1.4 | 0.9192 | 0.9207 | 0.9222 | 0.9236 | 0.9251 | 0.9265 | 0.9279 | 0.9292 | 0.9306 | 0.9319 |
| 1.5 | 0.9332 | 0.9345 | 0.9357 | 0.937 | 0.9382 | 0.9394 | 0.9406 | 0.9418 | 0.9429 | 0.9441 |
| 1.6 | 0.9452 | 0.9463 | 0.9474 | 0.9484 | 0.9495 | 0.9505 | 0.9515 | 0.9525 | 0.9535 | 0.9545 |
| 1.7 | 0.9554 | 0.9564 | 0.9573 | 0.9582 | 0.9591 | 0.9599 | 0.9608 | 0.9616 | 0.9625 | 0.9633 |
| 1.8 | 0.9641 | 0.9649 | 0.9656 | 0.9664 | 0.9671 | 0.9678 | 0.9686 | 0.9693 | 0.9699 | 0.9706 |
| 1.9 | 0.9713 | 0.9719 | 0.9726 | 0.9732 | 0.9738 | 0.9744 | 0.975 | 0.9756 | 0.9761 | 0.9767 |
| 2 | 0.9772 | 0.9778 | 0.9783 | 0.9788 | 0.9793 | 0.9798 | 0.9803 | 0.9808 | 0.9812 | 0.9817 |
| 2.1 | 0.9821 | 0.9826 | 0.983 | 0.9834 | 0.9838 | 0.9842 | 0.9846 | 0.985 | 0.9854 | 0.9857 |
| 2.2 | 0.9861 | 0.9864 | 0.9868 | 0.9871 | 0.9875 | 0.9878 | 0.9881 | 0.9884 | 0.9887 | 0.989 |
| 2.3 | 0.9893 | 0.9896 | 0.9898 | 0.9901 | 0.9904 | 0.9906 | 0.9909 | 0.9911 | 0.9913 | 0.9916 |
| 2.4 | 0.9918 | 0.992 | 0.9922 | 0.9925 | 0.9927 | 0.9929 | 0.9931 | 0.9932 | 0.9934 | 0.9936 |
| 2.5 | 0.9938 | 0.994 | 0.9941 | 0.9943 | 0.9945 | 0.9946 | 0.9948 | 0.9949 | 0.9951 | 0.9952 |
| 2.6 | 0.9953 | 0.9955 | 0.9956 | 0.9957 | 0.9959 | 0.996 | 0.9961 | 0.9962 | 0.9963 | 0.9964 |
| 2.7 | 0.9965 | 0.9966 | 0.9967 | 0.9968 | 0.9969 | 0.997 | 0.9971 | 0.9972 | 0.9973 | 0.9974 |
| 2.8 | 0.9974 | 0.9975 | 0.9976 | 0.9977 | 0.9977 | 0.9978 | 0.9979 | 0.9979 | 0.998 | 0.9981 |
| 2.9 | 0.9981 | 0.9982 | 0.9982 | 0.9983 | 0.9984 | 0.9984 | 0.9985 | 0.9985 | 0.9986 | 0.9986 |
| 3 | 0.9987 | 0.9987 | 0.9987 | 0.9988 | 0.9988 | 0.9989 | 0.9989 | 0.9989 | 0.999 | 0.999 |
| 3.1 | 0.999 | 0.9991 | 0.9991 | 0.9991 | 0.9992 | 0.9992 | 0.9992 | 0.9992 | 0.9993 | 0.9993 |
| 3.2 | 0.9993 | 0.9993 | 0.9994 | 0.9994 | 0.9994 | 0.9994 | 0.9994 | 0.9995 | 0.9995 | 0.9995 |
| 3.3 | 0.9995 | 0.9995 | 0.9995 | 0.9996 | 0.9996 | 0.9996 | 0.9996 | 0.9996 | 0.9996 | 0.9997 |
| 3.4 | 0.9997 | 0.9997 | 0.9997 | 0.9997 | 0.9997 | 0.9997 | 0.9997 | 0.9997 | 0.9997 | 0.9998 |

INTEGRATED REAL ESTATE SHOWING SCHEDULING AND KEY MANAGEMENT SYSTEM

CROSS-REFERENCE TO RELATED APPLICATIONS

This application is a continuation of U.S. patent application Ser. No. 15/250,486, entitled, "INTEGRATED REAL ESTATE SHOWING SCHEDULING AND KEY MANAGEMENT SYSTEM," filed Aug. 29, 2016, which is a continuation-in-part of U.S. patent application Ser. No. 14/264,949, entitled "INTEGRATED REAL ESTATE SHOWING SCHEDULING AND KEY MANAGEMENT SYSTEM," filed Apr. 29, 2014, assigned to ShowingTime.com, Inc. of Chicago, Ill., and which is hereby incorporated by reference in its entirety, and which is a continuation-in-part of U.S. patent application Ser. No. 12/757,142, entitled "INTEGRATED REAL ESTATE SHOWING SCHEDULING AND KEY DISPENSING SYSTEM," filed Apr. 9, 2010, assigned to ShowingTime.com, Inc. of Chicago, Ill., and which is hereby incorporated by reference in its entirety, and which is a continuation-in-part of U.S. patent application Ser. No. 12/039,544, entitled "SHOWING MANAGEMENT SYSTEM TO AUTOMATICALLY MATCH AND CONTROL ELECTRONIC LOCKBOXES," filed Feb. 28, 2008, assigned to ShowingTime.com, Inc. of Chicago, Ill., and which is hereby incorporated by reference in its entirety.

This application is related to U.S. Pat. No. 6,973,432, filed Nov. 20, 2000, assigned to ShowingTime.com, Inc. of Chicago, Ill., and which is hereby incorporated by reference in its entirety. This application is also related to U.S. Pat. No. 8,145,352, filed Sep. 8, 2011, assigned to ShowingTime.com, Inc. of Chicago, Ill., and which is hereby incorporated by reference.

FIELD OF THE INVENTION

The present invention relates generally to systems controlling access to property such as real estate and is particularly directed to a showing management system integrated into a key dispensing kiosk for use in high density real estate, such as for example, a condominium, town home, or apartment complex.

DESCRIPTION OF THE PRIOR ART

Paramount in the real estate business is the need to show properties for sale to potential buyers. This requires the buyer and the buyer's agent (showing agent) to access the seller's property, usually when the seller is absent. Traditionally, real estate agents have used lockboxes to store the keys to the seller's property for retrieval by showing agents. These lockboxes have long been purely mechanical, requiring an access combination, a special key, or both, to be unlocked. However, to address and improve privacy, safety and efficiency, the real estate industry has begun to use electronic real estate lock box systems to manage the access to seller's properties. The main components of these lockbox systems are an electronic lockbox, an electronic key device to open the electronic lockbox and a supervisory central computer system/database.

The functionality of a prior art electronic lockbox system (see FIG. 1) can be briefly summarized as follows. The buyer's agent (showing agent) carries an electronic key device 104, which can be a PDA, a cell phone, or a custom device adapted to wirelessly communicate with the electronic lockbox 103 and the central computer system/database 200. In order to physically remove the property key locked inside the electronic lockbox 103, the lockbox 103 requires the input of a unique access code in order to be unlocked. The access code may be generated by the central computer system 200 and is transmitted to the electronic key device 104. The electronic key device 104 will then transmit the received unique access code, to the electronic lockbox 103. Alternatively, the electronic key device 104 will present the access code to the showing agent, who must then manually input the access code into the electronic lockbox 103. The electronic lockbox 103 will then compare the received access code to an internally generated access code; and if the codes match, access will be allowed.

The data describing the lockbox access is stored in the electronic key device 104, the electronic lockbox 103, or both. The electronic key device 104 is further capable of transmitting certain access data to the central computer system/database 200 for further processing. Access data may include identifications of the electronic key device and the key device holder, e.g., the Showing Agent ID, access date and time, property identification (Listing ID), etc. The ability to track, store and centrally process these access data are a valuable tool for the real estate industry. Knowing when and who has actually accessed a listed property not only addresses safety concerns, but also provides sellers and agents with valuable information about the interest in the property listing. For example, the stored access data makes it easier to contact the showing agent after a showing to collect feedback on how the property was perceived by the potential buyer.

However, in order to accurately process the access data collected from electronic lockboxes and/or electronic keys, a central processing system needs reliable data pertaining to which specific electronic lockbox is assigned to which specific property listing. Electronic lockboxes are inherently mobile, i.e., they are moved from one property listing to the next, when a specific property no longer is available for showing appointments. There is no preset or pre-configured association between a lockbox and a particular property listing. The prior art attempts to establish at least a temporary association between the lockbox and the property listing by requiring the seller's agent (listing agent) or listing office personnel to enter both the Lockbox ID (usually a serial number, or some other form of unique Lockbox ID) and the unique property listing code. Of course, the reliance on manual data input introduces the possibility of human error or simply neglect. Manually entering all of the required data also takes time. Yet, a database with missing data cannot be efficiently and correctly mined for data.

U.S. Pat. Nos. 6,989,732 and 7,009,489, hereby incorporated by reference, teach electronic lockbox systems including date and time access control mechanisms to prevent showing agents, even with valid key devices, from gaining access to a lockbox, i.e., a property, at any time. Those systems enable users to individually allow or deny access to an electronic lockbox at specified times. These predetermined access time windows are stored inside the electronic lockbox and in the central computer system/database. When the showing agent enters a unique access code into the electronic lockbox, the lockbox compares the current time with the predetermined access time data for the particular lockbox. If the showing agent attempts to access the lockbox at a time that is outside of the predetermined access time window, access is denied.

United States Publication Number 2003/0179075, hereby incorporated by reference, teaches an alternative system of time-based access control. Instead of conditioning the authorized access to the electronic lockbox on a positive match of the current access time and a predetermined access time window, these systems generate an access code that is unique for the predetermined date and time of access and/or the person seeking access. That unique access code is only valid for the authorized user during the predetermined access time, which may include a grace period for attempting to access the lockbox a little early or a little later than the beginning of the predetermined showing time. The time based access code is provided to the authorized showing agent by the central computer system. In order to unlock the electronic lockbox, the showing agent must manually enter a unique agent ID as well as the time-based access code into the electronic lockbox.

In addition to the central computer system/database 200 managing the electronic lockboxes 103 and electronic key devices 104, so called showing management systems 100 are also used in the real estate industry. A showing management system 100 allows showing agents to make showing appointments for selected property listings. These showing managements systems 100, such as ShowingTime™'s ShowingDesk™ software, see U.S. Pat. No. 6,973,432, hereby incorporated by reference, typically integrate with or connect to one or more listing services to update its database of property listings. Showing agents can make showing appointments by directly accessing the showing management system 100 through an access device, such as a personal computer, as depicted in FIG. 2. The access device is connected to the showing management system 100 through either a wired or a wireless communications network. The showing management system 100 provides the showing agent with real-time access to all available property listings of the associated listing service. The showing agent can see the status of each property listing and available showing times making it very convenient to schedule a showing appointment. The scheduled appointment is stored real-time in the showing management system's database and is immediately visible to other showing agents accessing the showing management system. The information that is stored in the showing management system's database may include, but is not limited to, Listing ID, Showing Agent ID, and showing appointment start/end date and time.

Lockboxes provide a convenient way to enable access by a realtor to a single real estate property that is for sale. However, traditional lockboxes and electronic lockboxes are inefficient for use with dense configured real property, such as high-rise buildings, condominium complexes, town home complexes, apartment buildings and other high density real estate configurations. Key kiosks, which may hold hundreds of keys, are used to facilitate showings at such real properties. To retrieve a key from a key kiosk, a user generally must know an access code or have access to a device, such as a mechanical or electronic key, as well as an identifier for the individual real property unit that she wishes to access. For example, a user may retrieve a key corresponding to condominium unit 1649 by using a password, which may be unique to the user, as well as the unit number.

While key kiosks provide a convenient and cost effective way to provide access to realtors and others desiring to show or view a real property, present key kiosks have a number of shortcomings. One issue is that presently available key kiosks provide keys to those with the correct pass code irrespective of the time that the key is requested; i.e., even though a showing is scheduled for 1 PM, a key kiosk will provide a key to a party with the correct pass code at 12 PM or 2 PM, even though another party may have scheduled a showing at that time. Furthermore, since there is no integration with showing scheduling systems, presently available key kiosks cannot provide reminders to those who have neglected, or intentionally failed, to return keys, which will inconvenience all those coming later.

OBJECTS OF THE INVENTION

Accordingly, it is an object of this invention to provide a system and method for automatically controlling access to a key kiosk utilizing showing appointment data communicated from a showing scheduling system.

It is yet another object of this invention to provide a system and method to track those responsible for keys checked out from a key kiosk.

Another object of this disclosure is to provide a system and method for refusing to dispense a key from a key kiosk for a showing agent when she fails to return a checked-out key.

Another object of this disclosure is to provide a system and method for generating reports of key available statuses of key kiosks.

Another object of this disclosure is to provide a system and method allowing a key to be returned to a different key kiosk from the key kiosk from which the key is retrieved.

Another object of this disclosure is to provide a system and method for dispensing a key from a key kiosk for a showing agent by scanning a QR code.

Another object of this disclosure is to provide a system and method for dispensing a key from a key kiosk for a showing agent when the showing agent is nearby the key kiosk.

Another object of this disclosure is to provide a system and method for displaying a list of nearby key kiosks for a showing agent based on the physical location of the showing agent.

Another object of this disclosure is to provide a system and method for generating a showing tour including one or more stops at key kiosks.

Another object of this disclosure is to provide a system and method for dispensing a single common key from a key kiosk for a showing agent when the showing agent is showing multiple properties requiring the common key.

Another object of this disclosure is to provide a system and method for managing key transfer between showing agents.

SUMMARY OF THE INVENTION

Accordingly it is an advantage of the present invention to enable automatic dispensing of keys from a key kiosk based on the time that an appointment is scheduled for a showing. In one embodiment, the present invention is disclosed as a method of dispensing a key from a key kiosk disposed on or near a real property, the method comprising the steps of scheduling an appointment for showing a real property using a showing scheduling system. An appointment for a showing is scheduled by a user, such as, for example, a buyer's agent, a seller's agent, or a buyer interested in the property. The appointment includes a date, time, and an identifier for an authorized user. The identifier can be, for example, a unique code assigned to a person, although other forms of identification may be used as well, such as, for example, biometric identifiers, i.e., a retinal pattern, or a fingerprint, all of which are referred to herein under the general term user identifier. The appointment is then communicated to the key kiosk. This communication is conducted through a communication device, such as, for example, a network port, wireless network port, digital radio, or a paper message directed to a person that has the responsibility of manually entering information into the key kiosk. A user then enters identifies herself to the key kiosk, which validates the user, and dispenses the key. Of course, if the user was not validated, no key would be dispensed.

Further embodiments of the disclosed key dispensing method communicate from the key kiosk to the showing scheduling system the status of the key as dispensed after dispensing the key and available after the key has been returned. Additionally, the appointment can be expanded to include an end time, and the user can be notified if the key is not timely returned, i.e., returned by the end time or some period thereafter.

In a further embodiment, the present invention is disclosed as a system for dispensing a key from a key kiosk disposed on or near a real property, the system comprising a key kiosk for dispensing keys, the key kiosk disposed on or near a rear property, and including a communications device. The system further comprises a showing scheduling system for scheduling real property showings, the showing scheduling system further including a second communications device in communication with the key kiosk, and wherein the showing scheduling system communicates an appointment to the key kiosk, and the key kiosk dispenses a key after validating a user.

Further embodiments of the disclosed key dispensing system communicate the status of the key as dispensed and available from the key kiosk to the showing scheduling system, based on whether or not the key has been checked out or returned, and provide notifications to users that have not timely returned keys.

Further in accordance with the present teachings is a method for dispensing a key from a key kiosk. The method includes scheduling a showing appointment by a showing agent for showing a real property using a showing scheduling system. The appointment includes a date, time, and user identifier identifying the showing agent. The showing scheduling system determines a key kiosk that contains a set of keys associated with the real property. The showing scheduling system determines whether there is a key within the set of keys that is available for the appointment date and time. When the key is available for the appointment date and time, a server within the showing scheduling system automatically communicates the appointment to the key kiosk over the Internet. The key kiosk is adapted to dispense a plurality of keys corresponding to a plurality of real properties and including the set of keys, receive the appointment from the showing scheduling system, and authorize a user based on the appointment. When the user is authorized, the key kiosk dispenses the key. The key kiosk also communicate to the showing scheduling system a status of the key as dispensed to the authorized user from the key kiosk. The showing scheduling system receives the status of the key, and stores it into a database.

Further in accordance with the present teachings is a real estate showing appointment management system. The system includes a server for managing real estate property showing appointments, and a showing appointment management server software application running on the server. The server is adapted to communicate with a mobile communication device. The system also includes a showing appointment management server software application running on the server. The server is adapted to schedule a first appointment for showing a first real property. The first appointment includes a date, time, and user identifier, and is requested by a showing agent. The server also adapted to determine a first key kiosk containing a first set of keys associated with the first real property, and determine whether there is a first key within the first set of keys that is available for the first appointment date and time. Where the first key is available for the first appointment date and time, the server automatically communicate the first appointment and a fingerprint based authentication code to the first key kiosk over the Internet. The fingerprint based authentication code is generated from a fingerprint of the showing agent. The first key kiosk is adapted to dispense a plurality of keys corresponding to a plurality of real properties and including the first set of keys. The first key kiosk is also adapted to receive the first appointment from the server, and receive a fingerprint identifier from the mobile device. The fingerprint identifier is generated from image features derived from a fingerprint image captured by the mobile communication device. The key kiosk is also adapted to authenticate the showing agent based on the first appointment, the fingerprint authentication code, and the fingerprint identifier. Where the showing agent is authorized, the key kiosk dispenses the first key, and communicates to the server a first status of the first key as dispensed to the authorized showing agent from the first key kiosk. The server receives the first status of the first key.

Further in accordance with the present teachings is a real estate showing appointment management system. The system includes a server for managing real estate property showing appointments, and a showing appointment management server software application running on the server. The server is adapted to schedule a first appointment for showing a first real property. The first appointment includes a date, time, and user identifier. The server is also adapted to determine a first key kiosk for making a copy key to access the first real property, and determine a set of key measures. The set of key measures specifies a physical key corresponding to the first real property. The server is further adapted to send the first appointment and the set of key measures to the first key kiosk over the Internet. The first key kiosk is adapted to dispense a plurality of keys corresponding to a plurality of real properties and including the first set of keys. Moreover, the key kiosk is adapted to receive the first appointment and the set of key measures from the server, and authorize a first user based on the first appointment. Where the first user is authorized, the key kiosk creates the copy key based on the set of key measures, and dispenses the copy key.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 17 depicts a table of cumulative probabilities for a standard normal distribution;

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION OF THE ILLUSTRATED EMBODIMENT

Figure 1:
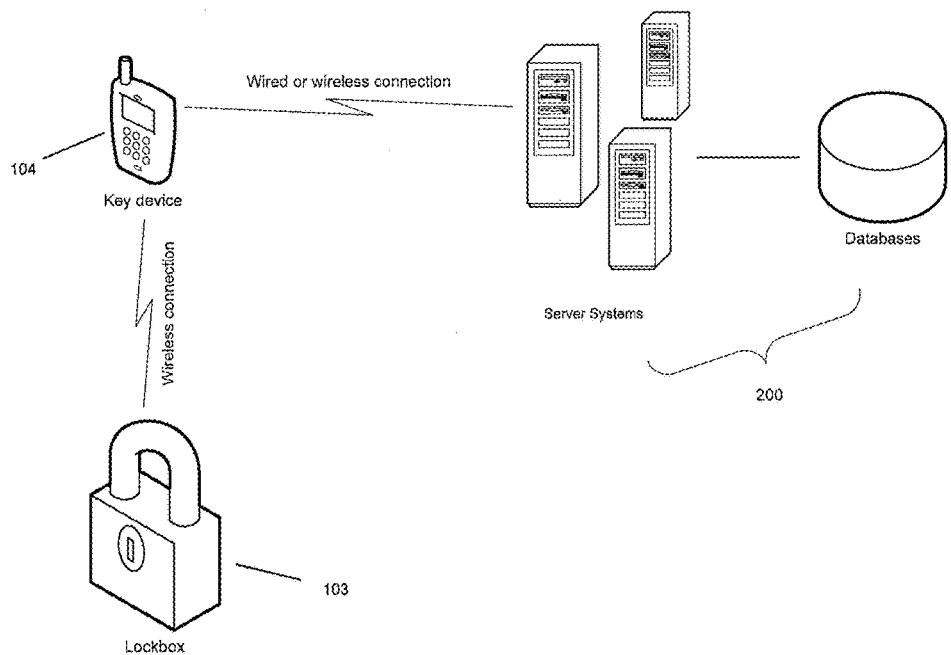
FIG. 1 depicts a prior art electronic lockbox system.
Figure 2:
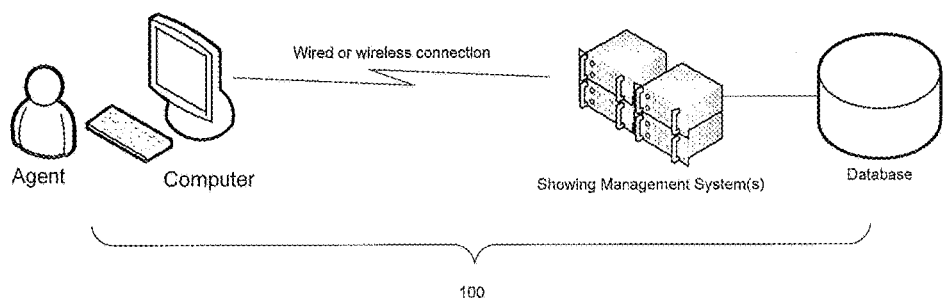
FIG. 2 depicts a prior art showing management system.

The disclosed invention provides for improved functionality and management of electronic lockboxes 103 and electronic key devices 104 by integrating an electronic lockbox system (see FIG. 1) with a showing management system (see FIG. 2).

Automatic Access Control

One aspect of this invention is automatic access control to an electronic lockbox 103 utilizing scheduled showing appointment data maintained by the showing management system 100, whereby the scheduled showing appointment data is transmitted to the associated electronic lockbox 103 and/or electronic key device 104. The electronic lockbox 103 will open only when the actual access time is within the scheduled showing appointment time, whereby the showing appointment time is the time range within which lockbox access is granted to a particular Showing Agent ID. The following example illustrates this access control:

Showing agent Smith with the Showing Agent ID 534 uses the showing management system 100 to schedule a showing appointment for the property with the Listing ID 1234 on Jan. 11, 2008 between 10:00 AM and 11:00 AM. The actual showing appointment time may begin some time before 10:00 AM (X) and end some time after 11:00 AM (Y) on Jan. 11, 2008. The value for X and Y can be fixed values across the systems or could vary, for example, depending on individual showing appointments, different showing management systems, markets, properties, lockboxes, etc. The showing management system 100 also stores the Showing Agent ID of the showing agent authorized to access the electronic lockbox 103. The showing appointment time, the Showing Agent ID, and other data jointly constitutes showing appointment data. The showing management system 100 then transmits the showing appointment data to the electronic lockbox 103 that is assigned to the Listing ID for which the appointment was made. Assuming, that in the above example the value for X has been set to 30 minutes and the value for Y has been set to 15 minutes, the agent corresponding to Showing Agent ID 534 will not be able to access the lockbox 103 associated with the Listing ID 1234 before 9:30 AM and after 11:15 AM on Jan. 11, 2008. Furthermore, in this example, only the showing agent with the Showing Agent ID 534 will be allowed access to the lockbox 103 between 9:30 AM and 11:15 AM on Jan. 11, 2008.

In another embodiment of this invention the showing management system could allow for an assignment of a plurality of showing agents, i.e., Showing Agent IDs, to a particular scheduled showing appointment, thus allowing for parallel and/or overlapping appointments and access by more than one showing agent. In this case, all the assigned agents form a team. A team may consist of two or more members and the team members can represent each other in the sense of scheduling appointments and showing properties. The information that a plurality of agents with different respective Showing Agent IDs are a team may be provided by the respective agents, offices, brokerage, MLS or other entities. The showing management system is further able to define and manage teams of showing agents.

Transmission of Showing Appointment Data

Figure 3A:
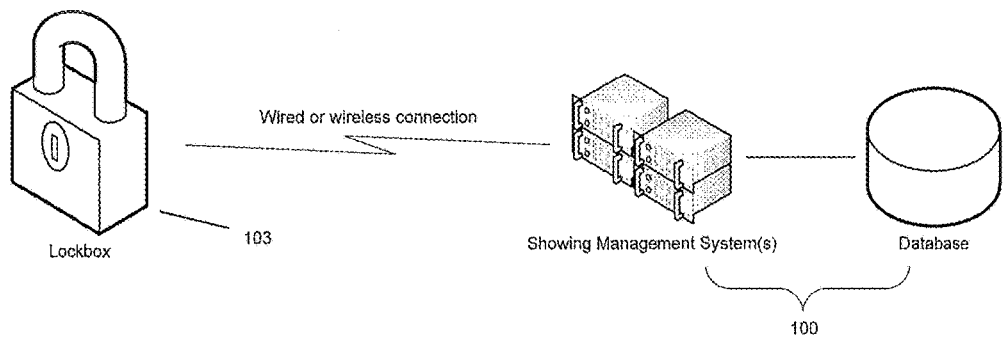
FIG. 3A depicts one embodiment of transmitting showing appointment data directly to the electronic lockbox.

With regard to the transmission of the showing appointment data to the electronic lockbox, there are many different possible embodiments. In one embodiment, shown in FIG. 3A, the showing management system 100 transmits the showing appointment data directly to the electronic lockbox 103 that has been assigned to the property for which the showing has been scheduled. In this embodiment, the specification of the electronic lockbox 103 needs to include at least a power source, such as a battery, an internal controller, an accurate timer which may be capable of synchronization with a time server, and a storage medium for storing showing appointment data and the lockbox's own unique ID. In this embodiment, the electronic lockbox 103 is further capable to connect to remote servers, such as those associated with a showing management system 100, over a wireless communications network. The electronic lockbox 103 may also be capable to send and receive encrypted data, including encrypted showing appointment data. The wireless connection between the lockbox 103 and the showing management system 100 may be permanent or only temporary following an activation request. A wired connection may also be implemented but appears to be of limited practicality for portable electronic lockboxes.

Figure 3B:
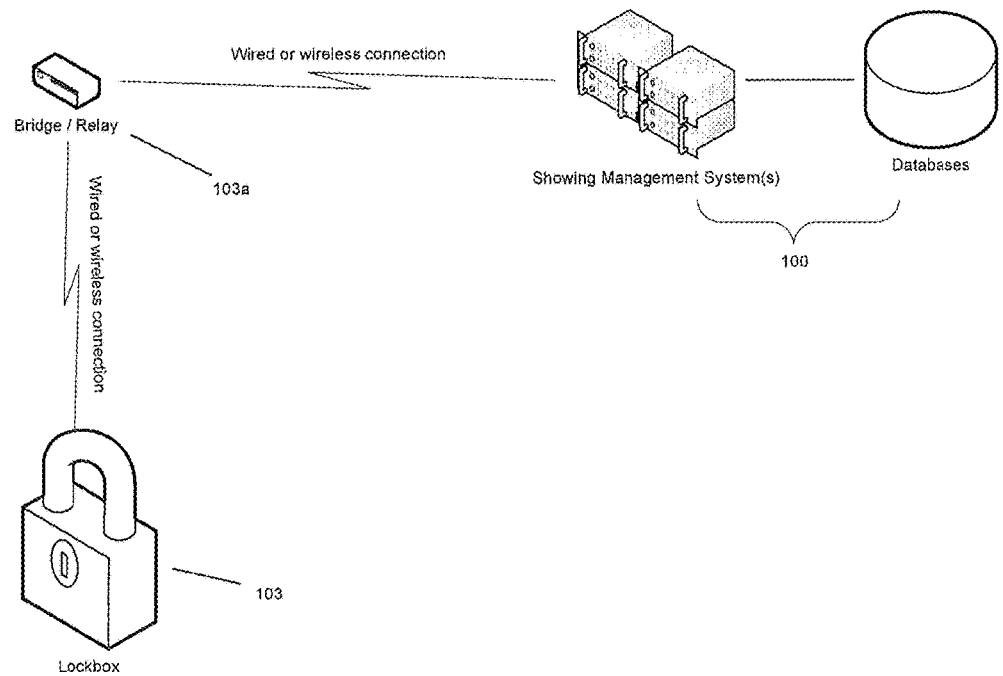
FIG. 3B depicts one embodiment of transmitting showing appointment data directly to the electronic lockbox, whereby the electronic lockbox is powered by a bridge/relay device (e.g., computer, wireless LAN access point, etc.)

FIG. 3B shows another embodiment where the showing management system 100 transmits the showing appointment data directly to the electronic lockbox 103 that has been assigned to the property for which the showing has been scheduled. However, in this embodiment, the electronic lockbox 103 is operatively coupled to and powered by a powered bridge/relay device 103A, capable of receiving and transmitting data. The bridge/relay device 103A could be, for example, a computer, a wireless LAN access point, etc. The bridge/relay device 103A is operatively coupled to the electronic lockbox 103 via a wired or wireless communications link.

Figure 3C:
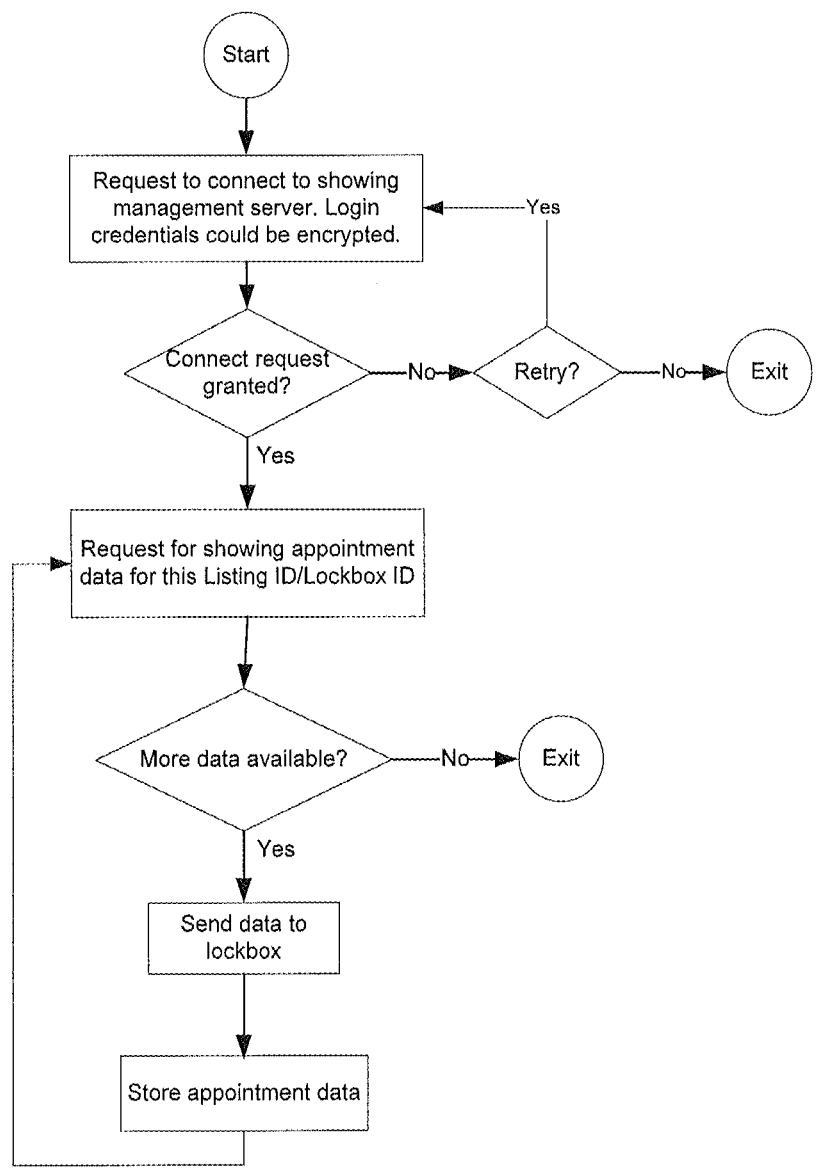
FIG. 3C depicts one embodiment of logic for transmitting showing appointment data from the showing management system to the electronic lockbox.

FIG. 3C shows a possible sequence of steps for transmitting showing appointment data from the showing management system 100 directly to the electronic lockbox 103. Upon request, the electronic lockbox 103 establishes a connection to a server of the showing management system 100. The electronic lockbox 103 then requests from the showing management system 100 all showing appointment data for the property associated with the requesting electronic lockbox 103. The showing appointment data for the property associated with the electronic lockbox 103 is then transmitted from the showing management system 100 to the electronic lockbox 103 via the communications link. The transmitted showing appointment data is then stored in a storage medium inside the electronic lockbox 103.

Figure 4A:
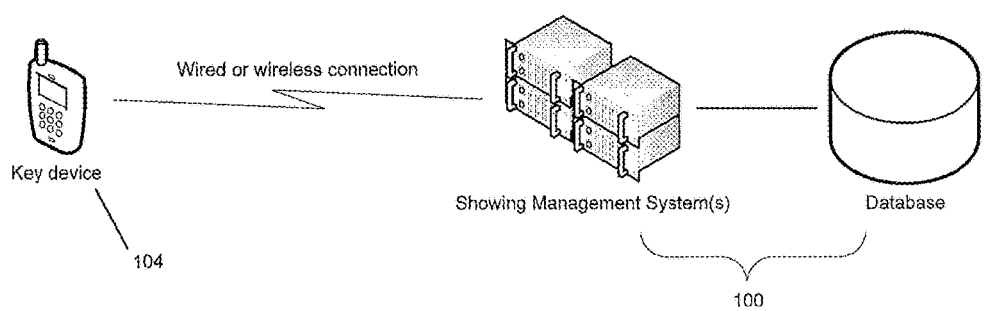
FIG. 4A depicts one embodiment of transmitting showing appointment data directly to the electronic key device.

In another embodiment, shown in FIG. 4A, the showing management system 100 transmits the showing appointment data directly to an electronic key device 104 that has been assigned to the showing agent who is scheduled to show the property to which the transmitted showing appointment data pertains to. In this embodiment, the specification of the electronic key device 104 needs to include at least, but is not limited to, a power source, an internal controller, an accurate timer which may be capable of synchronization with a timer server, and a storage medium for storing at least showing appointment data, the key device's own unique ID or the Showing Agent ID who uses the key device 104. In this embodiment, the electronic key device 104 is further capable to connect to remote servers, such as those associated with a showing management system 100, over a wireless communications network. The electronic key device 104 may also be capable to send and receive encrypted data, including encrypted showing appointment data. The wireless connection between the key device 104 and the showing management system 100 may be permanent or only temporary following an activation request. A wired connection may also be implemented but appears to be of limited practicality for portable electronic key devices.

Figure 4B:
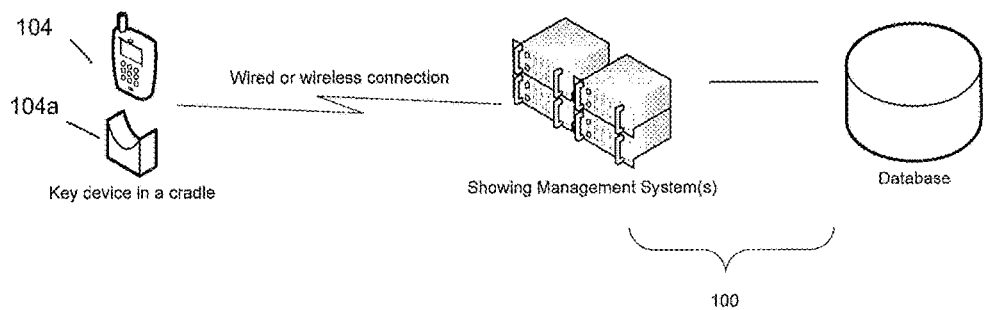
FIG. 4B depicts one embodiment of transmitting showing appointment data directly to the electronic key device coupled to a cradle device, whereby the cradle device may be a bridge/relay device.

FIG. 4B shows another embodiment where the showing management system 100 transmits the showing appointment data directly to the electronic key device 104 that has been assigned to the showing agent who is scheduled to show the property to which the transmitted showing appointment data pertains to. However, in this embodiment, the electronic key device 104 is operatively coupled to a powered bridge/relay device 104A, which may also be capable of receiving and transmitting data. The bridge/relay device 104A is operatively coupled to the electronic key device 104 via a wired or wireless communications link.

Figure 4C:
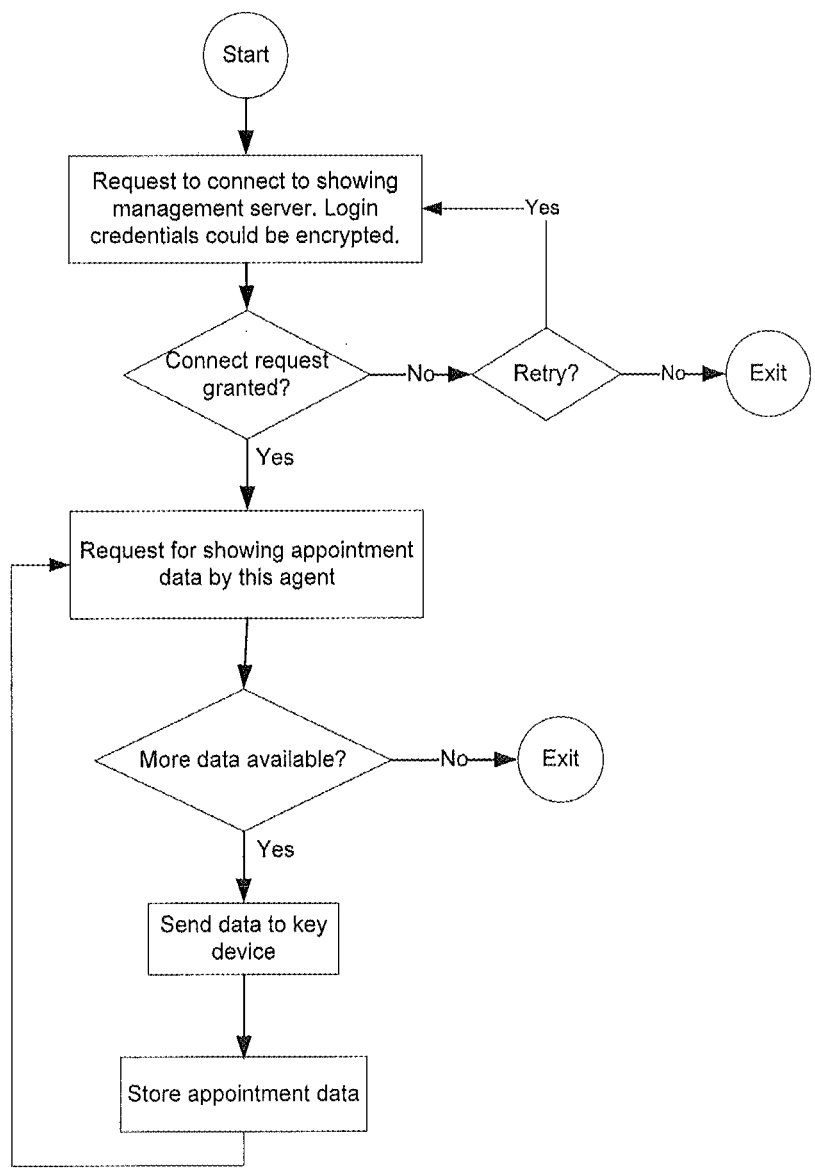
FIG. 4C depicts one embodiment of logic for transmitting showing appointment data from the showing management system to the electronic key device.

FIG. 4C shows a possible sequence of steps for transmitting showing appointment data from the showing management system 100 directly to the electronic key device 104. Upon request, the electronic key device 104 establishes a connection to a server of the showing management system 100. The electronic key device 104 then requests from the showing management system 100 all showing appointment data for the property associated with the requesting showing agent using the electronic key device 104. The showing appointment data for the requesting showing agent is then transmitted from the showing management system 100 to the electronic key device 104 via a communications link. The transmitted showing appointment data is then stored in a storage medium inside the electronic key device 104.

Figure 5:
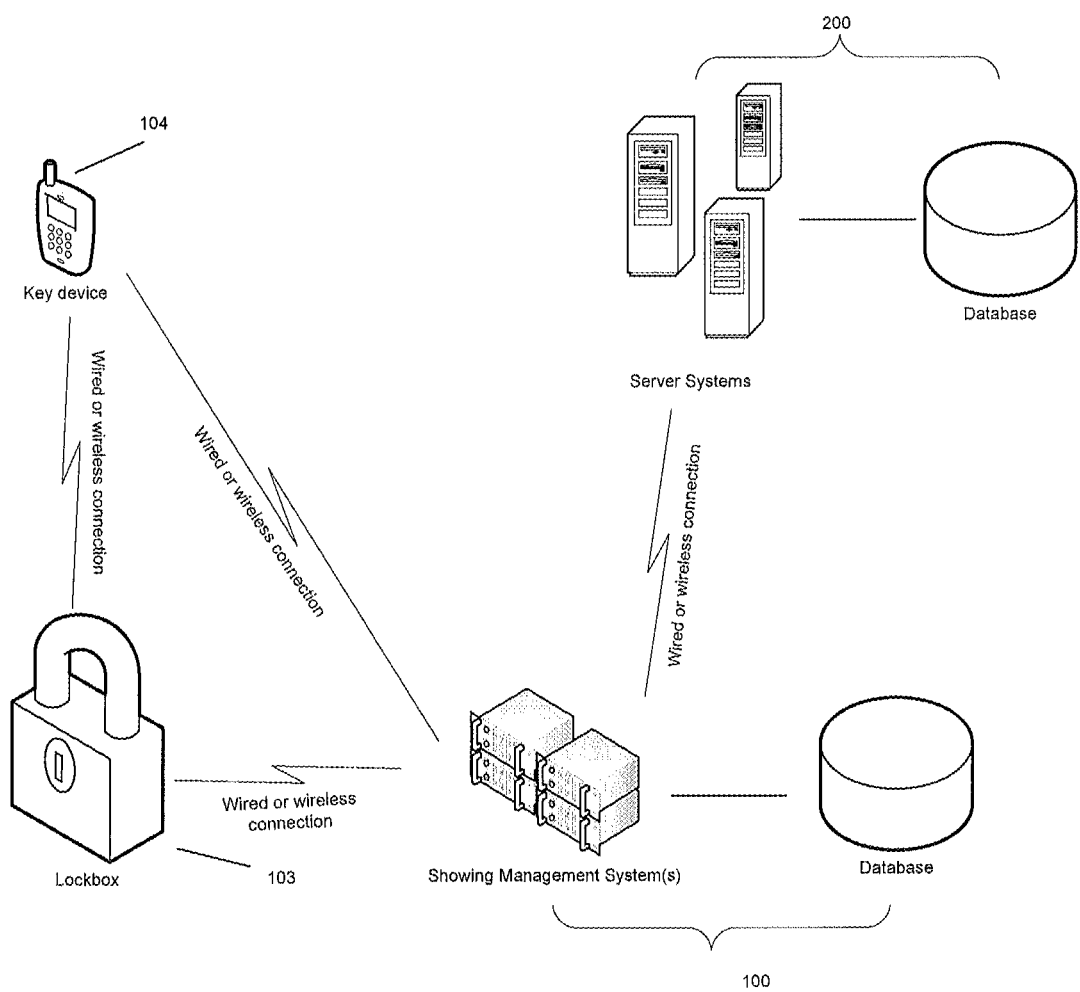
FIG. 5 depicts one embodiment of transmitting showing appointment data from the showing management system indirectly to the electronic lockbox and/or electronic key device, via a third party server system (e.g., electronic lockbox and electronic key device vendor)

FIG. 5 depicts an alternate embodiment, where instead of transmitting showing appointment data from the showing management system 100 directly to the electronic lockbox 103 and/or the electronic key device 104, the showing appointment data could be transmitted via a third party system 200, e.g., the electronic lockbox management system of the electronic lockbox and/or electronic key device vendor).

Figure 6A:
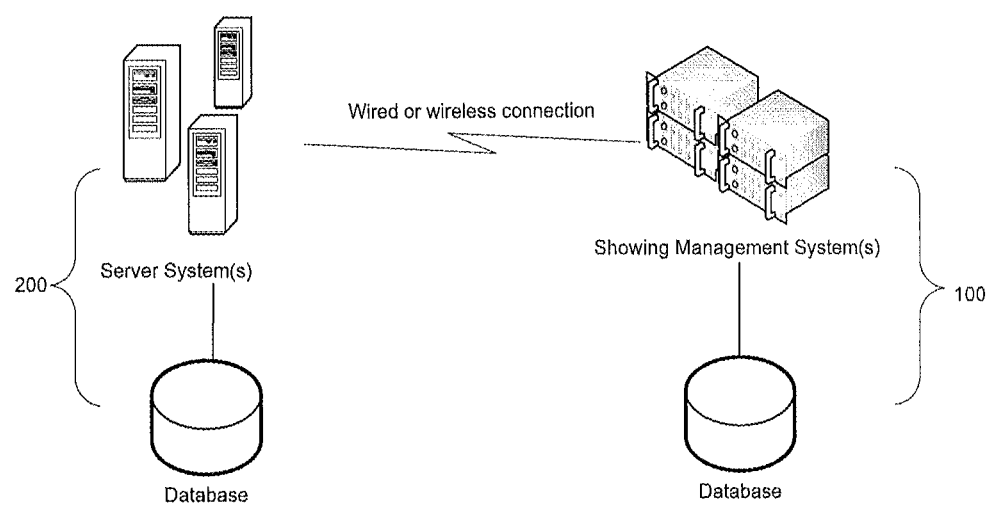
FIG. 6A depicts one embodiment of transmitting showing appointment data from the showing management system to a third party server system.

FIG. 6A depicts one embodiment of transmitting showing appointment data from the showing management system 100 to a third party system 200 via a wired or wireless communications link. The transmission of showing appointment data in FIG. 6A may be accomplished through either a pull or a push mechanism.

Figure 6B:
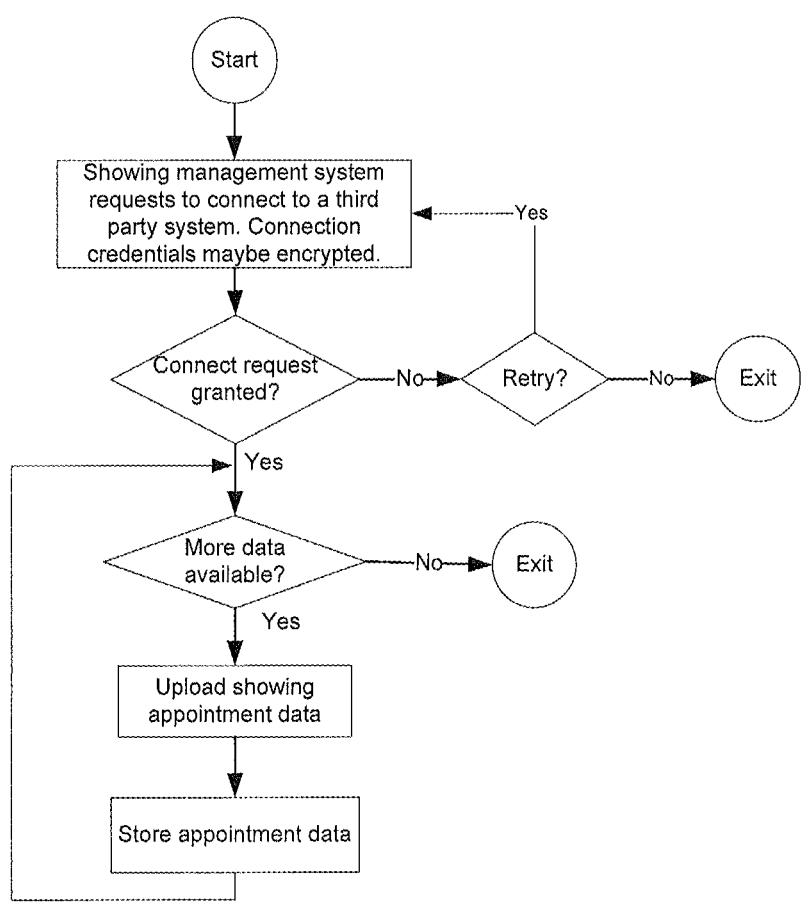
FIG. 6B depicts one embodiment of transmitting showing appointment data from the showing management system to a third party server system via a push mechanism.

FIG. 6B shows one embodiment of transmitting showing appointment data via a push mechanism, whereby the showing management system 100 requests to connect to the third party system 200 and after the connection is established, uploads, i.e., transmits, the showing appointment data from the showing management system 100 to the third party system 200. The transmitted showing appointment data is then stored on the third party system 200.

Figure 6C:
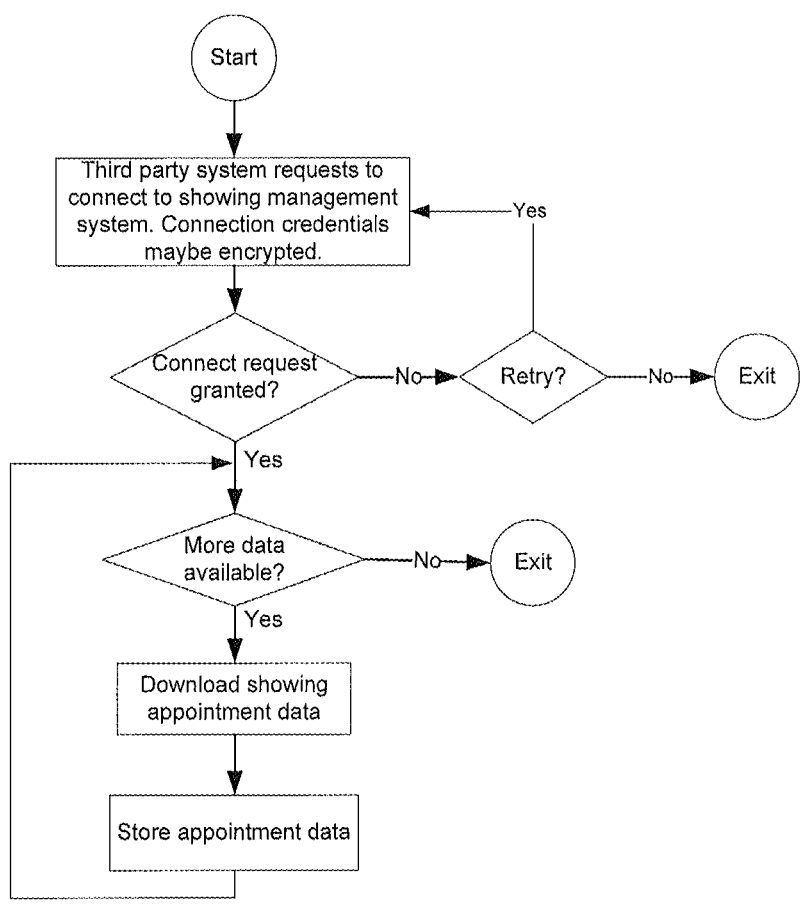
FIG. 6C depicts one embodiment of transmitting showing appointment data from the showing management system to a third party server system via a pull mechanism.

FIG. 6C shows one embodiment of transmitting showing appointment data via a pull mechanism, whereby the third party system 200 requests to connect to the showing management system 100 and after the connection is established, downloads, i.e., receives, the showing appointment data from the showing management system 100 to the third party system 200. The transmitted showing appointment data is then stored on the third party system 200.

Figure 7A:
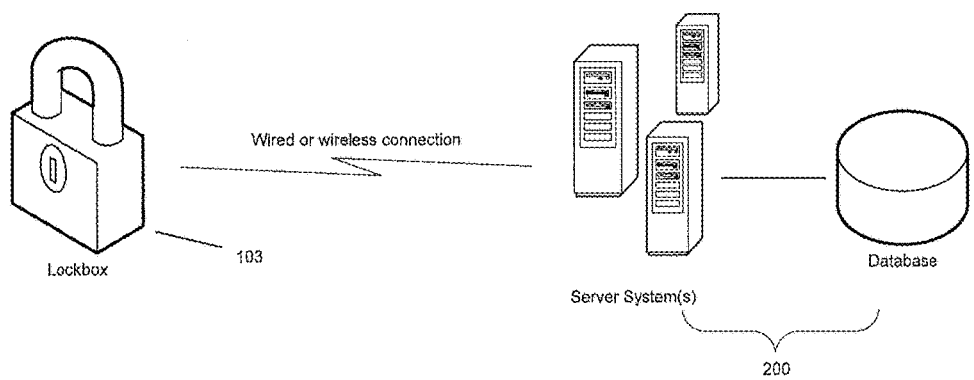
FIG. 7A depicts one embodiment of transmitting showing appointment data from the third party server system directly to the electronic lockbox.
Figure 7B:
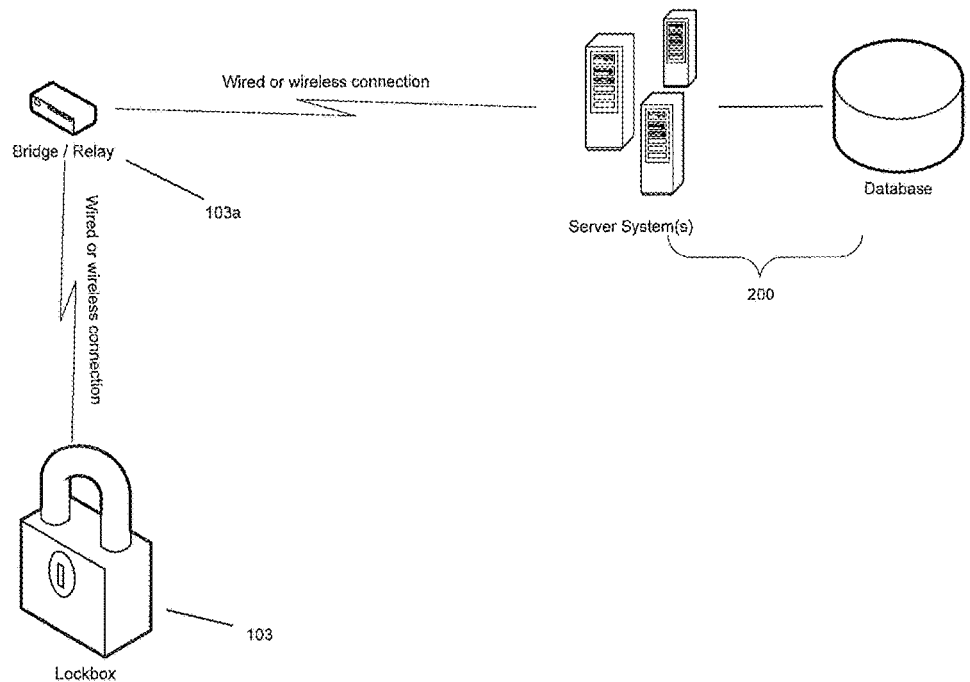
FIG. 7B depicts one embodiment of transmitting showing appointment data from the third party server system to the electronic lockbox, whereby the electronic lockbox is powered by a bridge/relay device (e.g., computer, wireless LAN access point, etc.)

Once the showing appointment data is stored on the third party system 200 it must be transmitted to the electronic lockbox 103 and/or the electronic key device 104. FIG. 7A shows one embodiment of transmitting the showing appointment data from the third party system 200 directly to the electronic lockbox 103 via a communications link. FIG. 7B shows another embodiment where the third party system 200 transmits the showing appointment data directly to the electronic lockbox 103 that has been assigned to the property for which the showing has been scheduled. However, in this embodiment, the electronic lockbox 103 is operatively coupled to, and potentially powered by, a powered bridge/relay device 103A, capable of receiving and transmitting data. The bridge/relay device 103A could be, for example, a computer, a wireless LAN access point, etc. The bridge/relay device 103A is operatively coupled to the electronic lockbox 103 via a wired or wireless communications link.

Figure 7C:
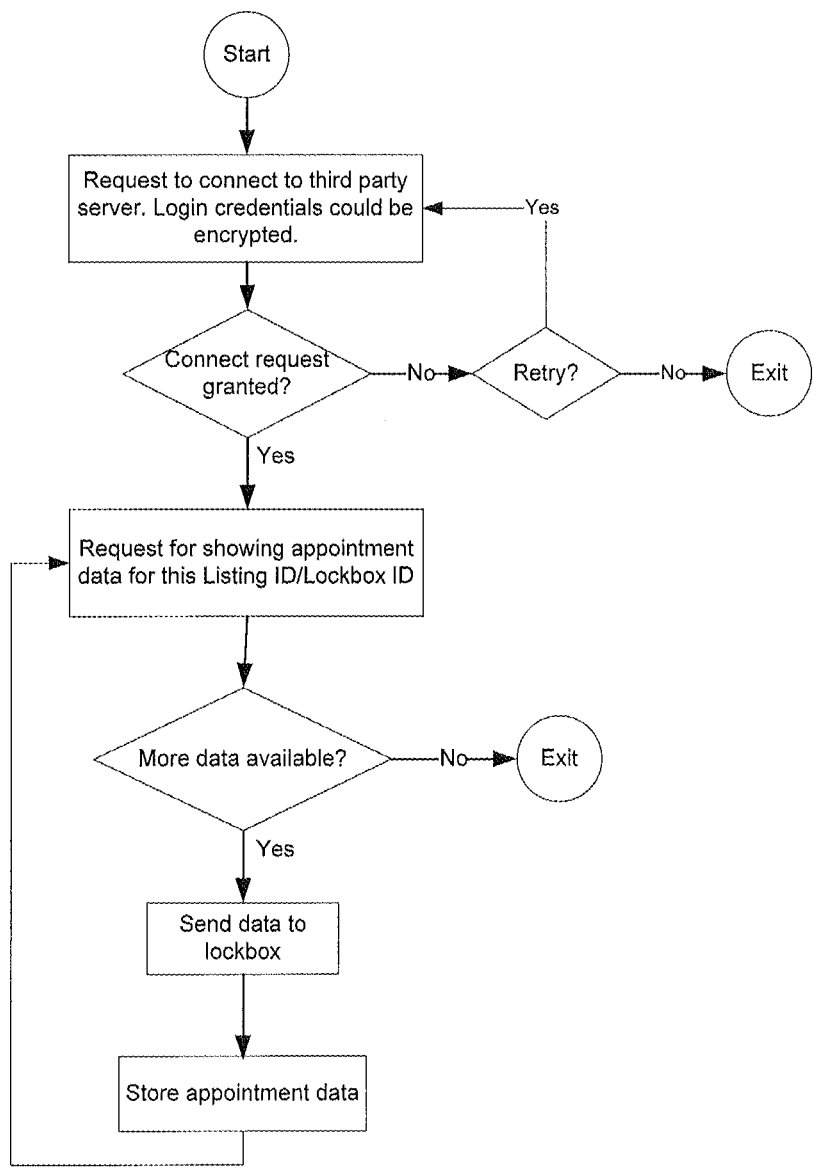
FIG. 7C depicts one embodiment of logic for transmitting showing appointment data from the third party server system to the electronic lockbox.

FIG. 7C shows a possible sequence of steps for transmitting showing appointment data from the third party system 200 directly to the electronic lockbox 103. Upon request, the electronic lockbox 103 establishes a connection to a server of the third party system 200. The electronic lockbox 103 then requests from the third party system 200 all showing appointment data for the property associated with the requesting electronic lockbox 103. The showing appointment data for the property associated with the electronic lockbox 103 is then transmitted from the third party system 200 to the electronic lockbox 103 via the communications link. The transmitted showing appointment data is then stored in a storage medium inside the electronic lockbox 103.

Figure 8A:
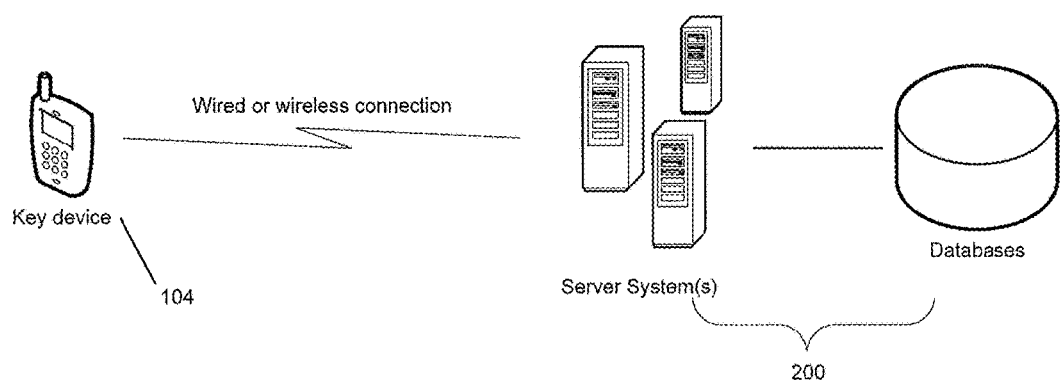
FIG. 8A depicts one embodiment of transmitting showing appointment data from the third party server system directly to the electronic key device.
Figure 8B:
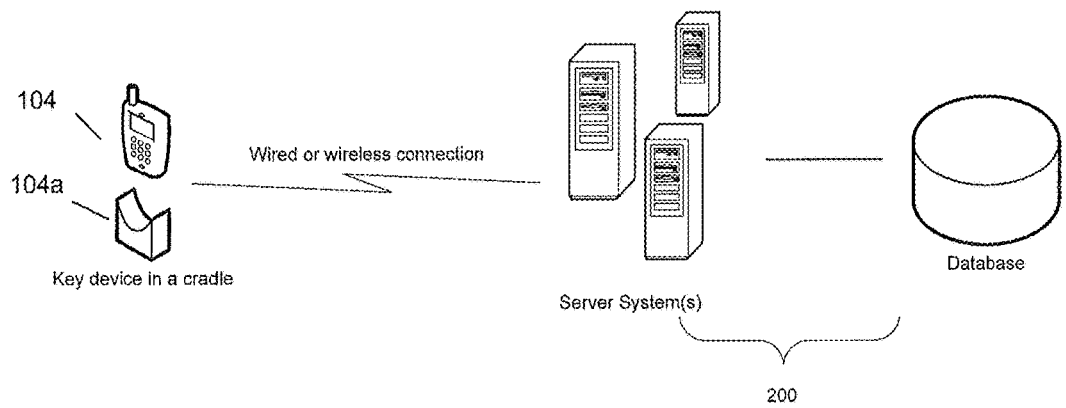
FIG. 8B depicts one embodiment of transmitting showing appointment data from the third party server system to the electronic key device coupled to a cradle device, whereby the cradle device may be a bridge/relay device.

FIG. 8A shows one embodiment of transmitting the showing appointment data from the third party system 200 directly to the electronic key device 104 via a communications link. FIG. 8B shows another embodiment where the third party system 200 transmits the showing appointment data directly to the electronic key device 104 that has been assigned to the showing agent who is scheduled to show the property to which the transmitted showing appointment data pertains to. However, in this embodiment, the electronic key device 104 is operatively coupled to a powered bridge/relay device 104A, which may also be capable of receiving and transmitting data. The bridge/relay device 104A is operatively coupled to the electronic key device 104 via a wired or wireless communications link.

Figure 8C:
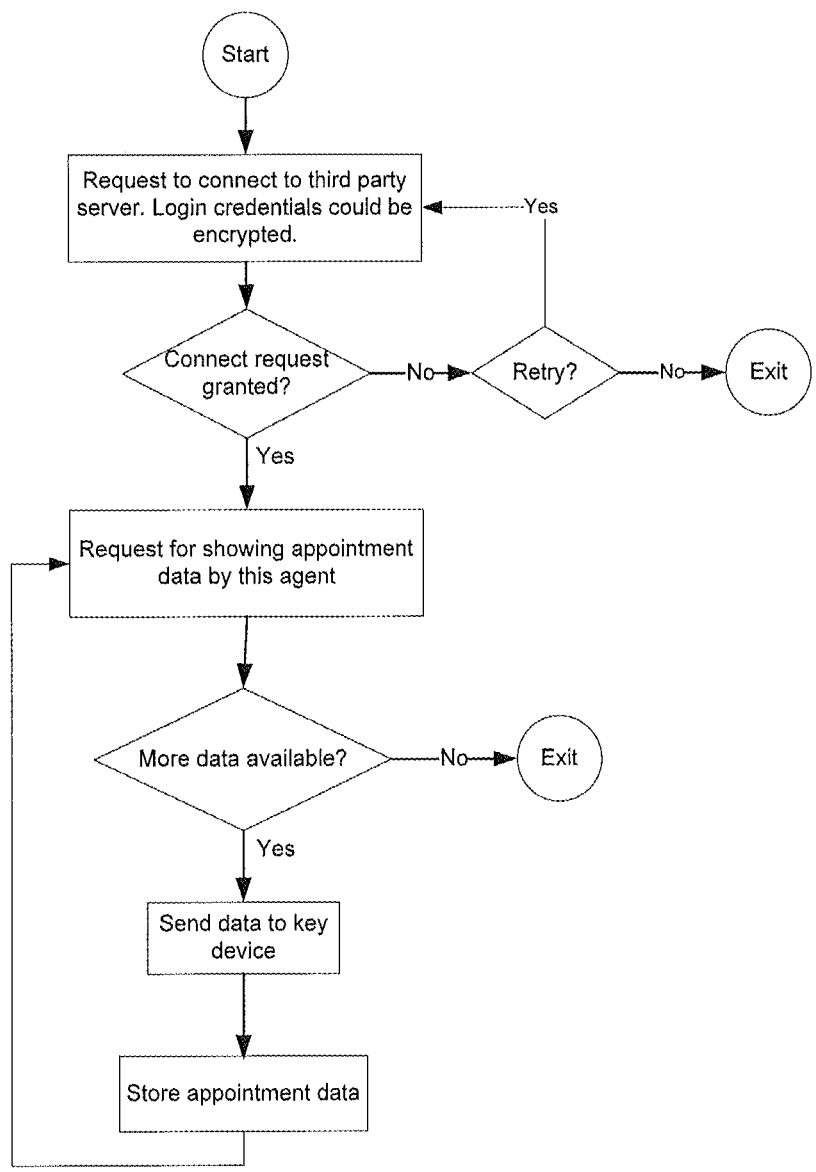
FIG. 8C depicts one embodiment of logic for transmitting showing appointment data from the third party server system to the electronic key device.

FIG. 8C shows a possible sequence of steps for transmitting showing appointment data from the third party system 200 directly to the electronic key device 104. Upon request, the electronic key device 104 establishes a connection to a server of the third party system 200. The electronic key device 104 then requests from the third party system 200 all showing appointment data for the property associated with the requesting showing agent using the electronic key device 104. The showing appointment data for the requesting showing agent is then transmitted from the third party system 200 to the electronic key device 104 via a communications link. The transmitted showing appointment data is then stored in a storage medium inside the electronic key device 104.

Controlling Lockbox Access

Figure 9:
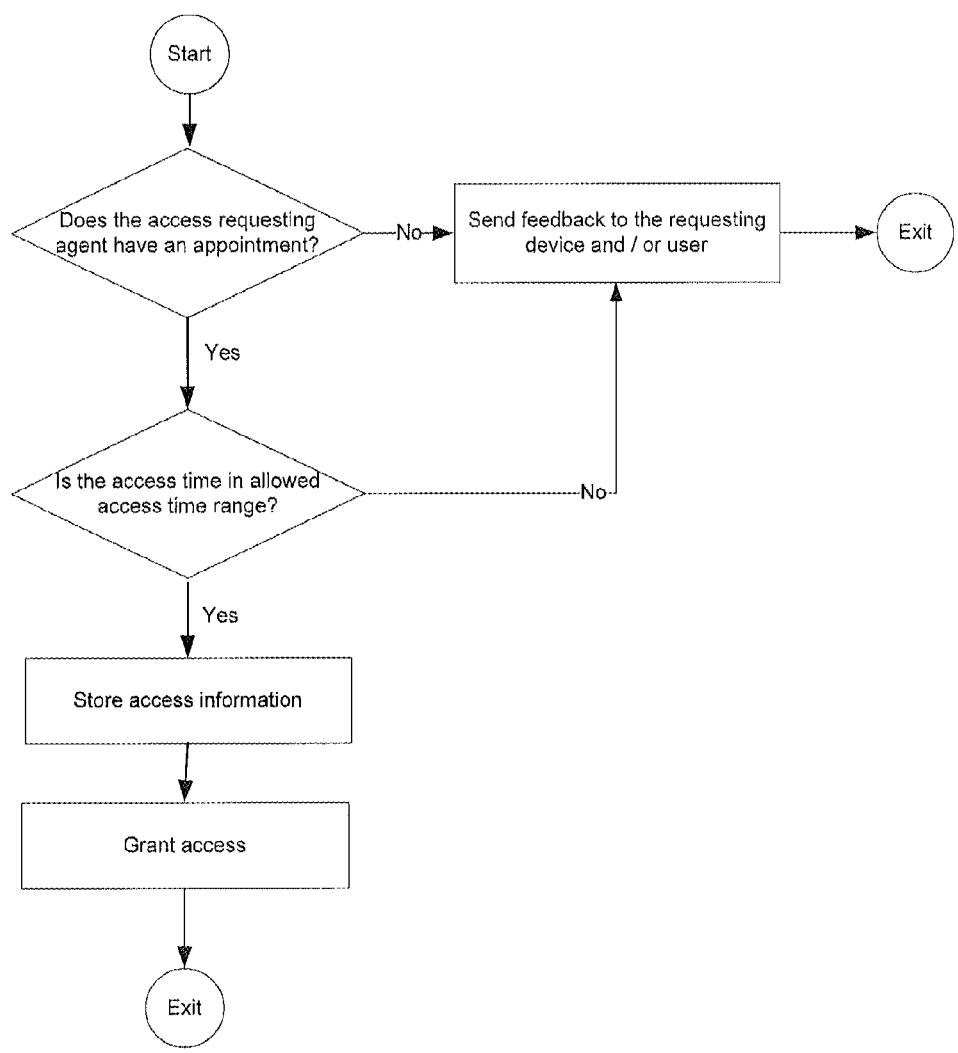
FIG. 9 depicts one embodiment of logic inside the electronic lockbox for controlling access when the showing appointment data is available at the electronic lockbox.

Once the showing appointment data is available at the electronic lockbox 103, the actual access to lockbox 103 is controlled by a logic executed inside the electronic lockbox 103. FIG. 9 shows a possible sequence of steps for controlling access when the showing appointment data is available at the electronic lockbox 103. In this embodiment, the logic inside the electronic lockbox 103 compares the current date and time of the internal timer and the Showing Agent ID of the showing agent attempting to access the lockbox 103 with the stored showing appointment data. As noted above, the showing appointment time comprises a time range/interval that may included a predetermined period of time before and after the actual showing appointment time as well as the Showing Agent ID of the showing agent for whom the appointment was made. In case the showing appointment was made for a plurality of showing agents or the showing management system has defined a team of showing agents, each of the corresponding Showing Agent IDs would also be included in showing appointment data. If the accessing Showing Agent ID and the current access time match the stored showing appointment data, the lockbox 103 will grant access.

Figure 10:
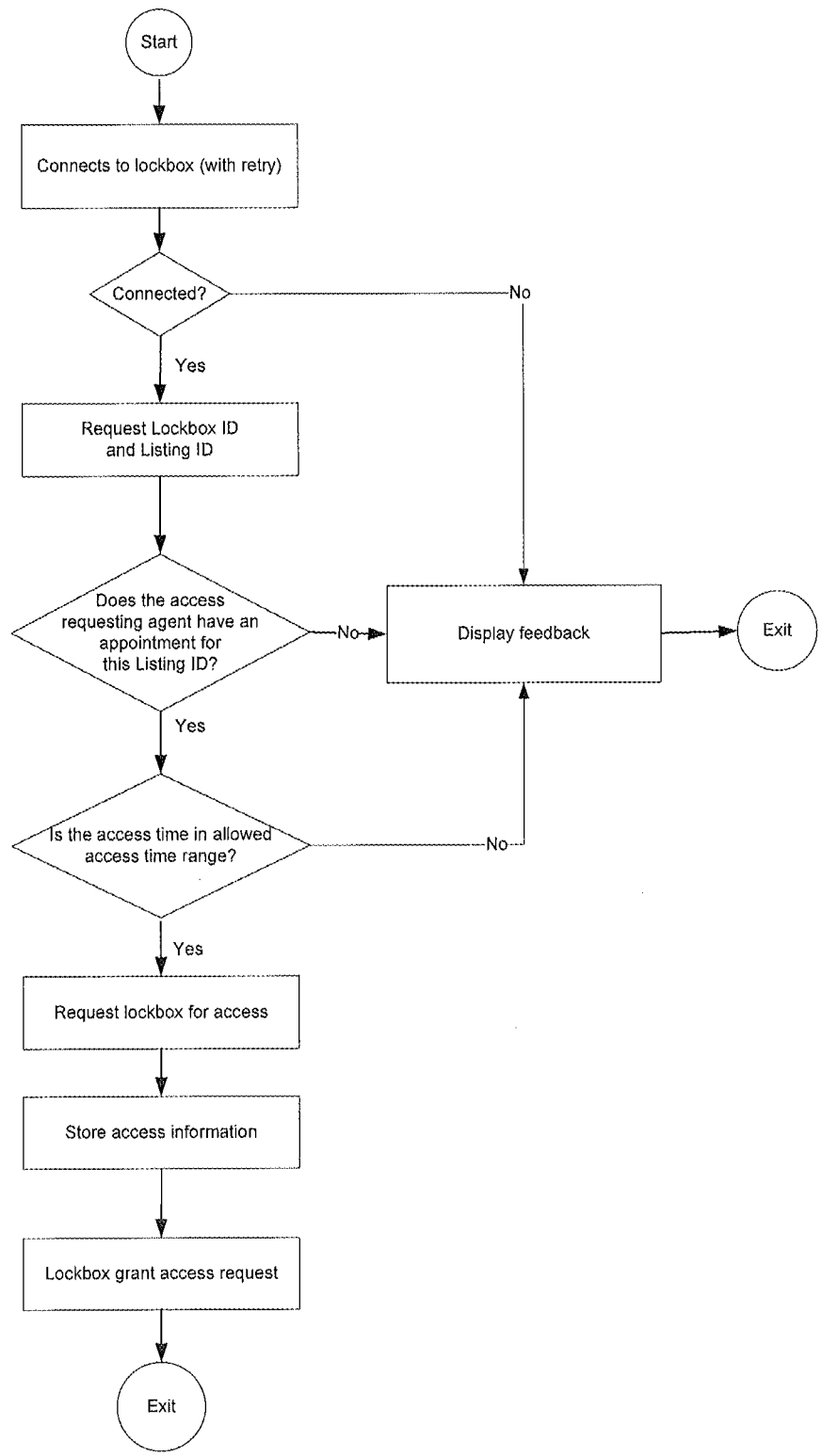
FIG. 10 depicts one embodiment of logic inside the electronic key device for controlling access when the showing appointment data is available at the electronic key device.

Alternatively, the showing appointment data may be available at the electronic key device 104. FIG. 10 shows an embodiment where the actual access to the lockbox 103 is controlled by logic executed inside the electronic key device 104. In this embodiment, the electronic key device 104 connects to the electronic lockbox 103 via a communications link. The key device 104 then determines the Lockbox ID and the Listing ID this particular lockbox is presently assigned to from data that is stored on a storage device inside the electronic lockbox 103. The logic inside the key device 104 then determines if the showing agent with a particular Showing Agent ID has a scheduled appointment for the Listing ID stored on the electronic lockbox 103 by comparing the Listing ID with the one that is part of the showing appointment data stored inside the key device 103. If the Listing ID matches, the logic inside the key device 104 compares the current date and time of the internal timer with the stored showing appointment data. As noted above, the showing appointment data comprises a time range/interval that may include a predetermined period of time before and after the actual showing appointment time as well as the Showing Agent ID of the showing agent for whom the appointment was made. In case the showing appointment was made for a plurality, i.e., team of showing agents, each of the corresponding Showing Agent IDs would also be included in showing appointment data. If the current access time matches the stored showing appointment time, the lockbox 103 will grant access.

Figure 11:
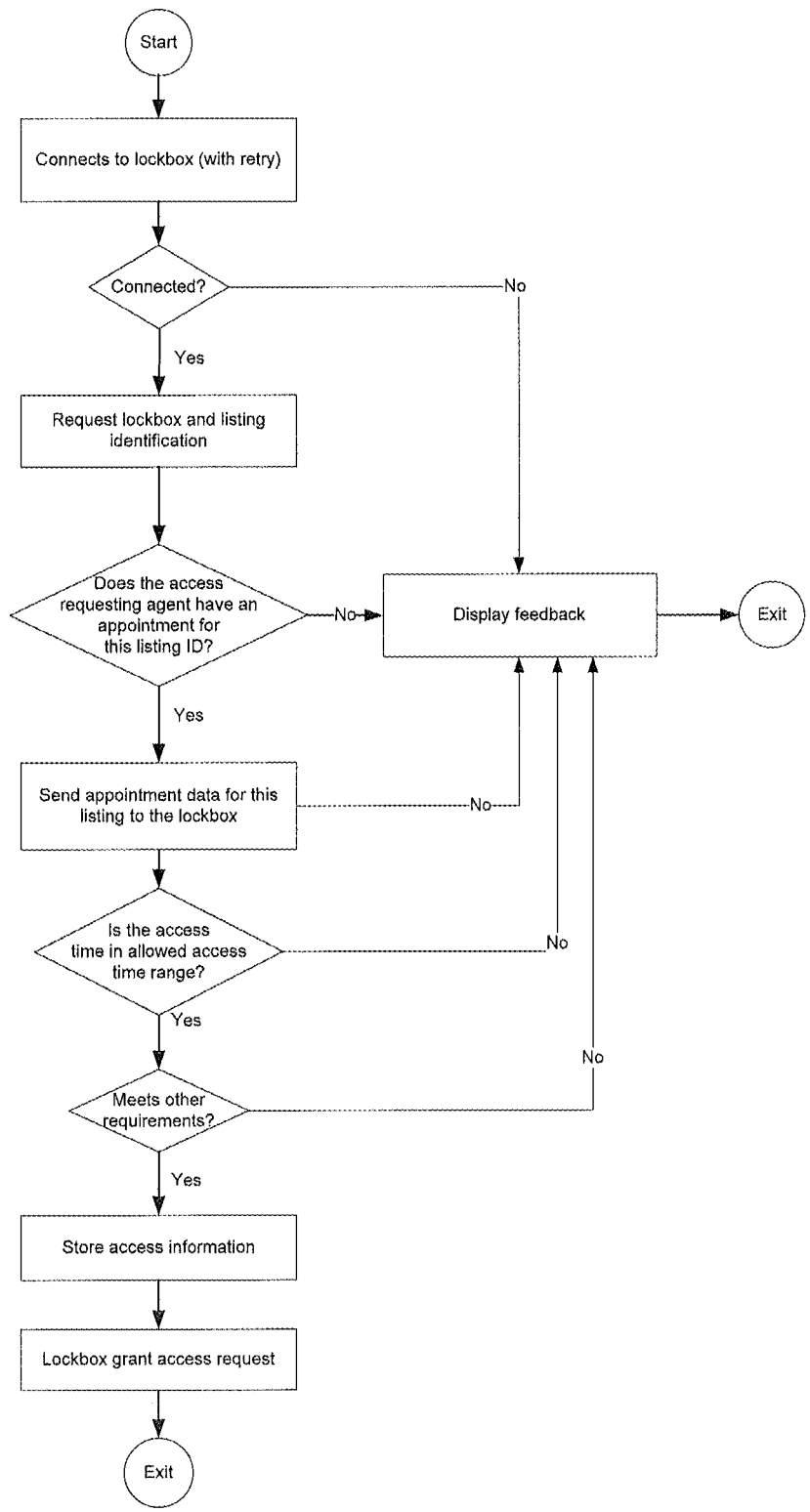
FIG. 11 depicts another embodiment of logic inside the electronic key device for controlling access when the showing appointment data is available at the electronic key device.

FIG. 11 shows another possible sequence of steps where the actual access to the lockbox 103 is controlled by logic executed inside the electronic key device 104. In this embodiment, the electronic key device 104 connects to the electronic lockbox 103 via a communications link. The key device 104 then determines the Lockbox ID and the Listing ID this particular lockbox is presently assigned to from data that is stored on a storage device inside the electronic lockbox 103. The logic inside the key device 104 then determines if the showing agent with a particular Showing Agent ID has a scheduled appointment for the Listing ID stored on the electronic lockbox 103, by comparing the Listing ID with the one that is part of the showing appointment data stored inside the key device 103. If the Listing ID matches, the key device 104 transmits the showing appointment data to the lockbox 103. Then, logic inside the lockbox 103 compares the current date and time of the internal timer with the showing appointment data. As noted above, the showing appointment data comprises a time range/interval that may include a predetermined period of time before and after the actual showing appointment time as well as the Showing Agent ID of the showing agent for whom the appointment was made. In case the showing appointment was made for a plurality, i.e., team of showing agents, each of the corresponding Showing Agent IDs would also be included in showing appointment data. If the current access time matches the stored showing appointment time, the lockbox 103 will grant access.

Time Synchronization

Figure 12:
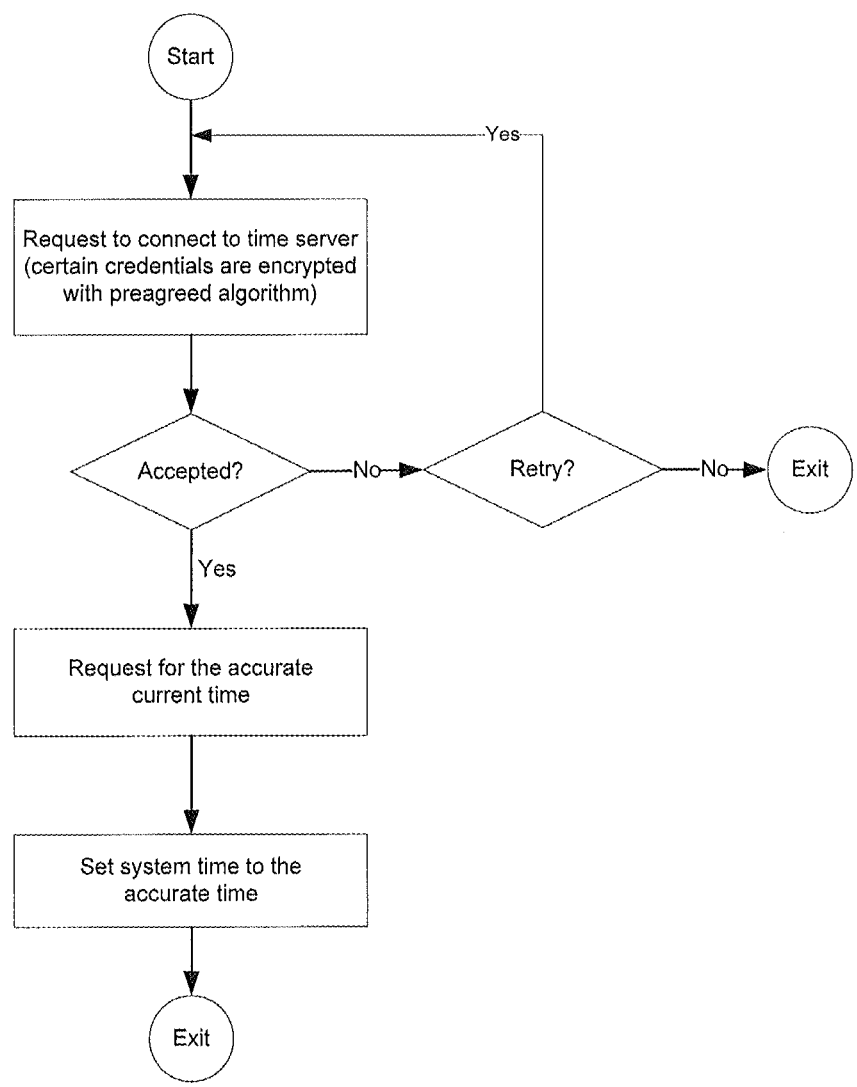
FIG. 12 depicts one embodiment of logic inside the electronic key device and/or the electronic lockbox for time synchronization of the device.

Reliable lockbox access control based on predetermined showing appointment data requires an accurate internal timer inside the electronic lockbox 103 and/or the electronic key device 104 to ensure that access is actually granted during the predetermines showing times. Systems and methods to synchronize internal timing devices are widely known in the art. FIG. 12 shows just one of many possible sequences of steps the electronic lockbox 103 and/or the electronic key device 104 may execute to synchronize their internal timers. In this embodiment, the electronic lockbox 103 and or the electronic key device 104 will establish a connection to a remote server via a communications link, whereby the remote server will synchronize the internal timer.

Matching Lockbox ID with Listing ID

The showing management system of this invention further programmatically matches a specific electronic lockbox with a specific Listing ID. As noted above, most electronic lockboxes are capable of storing access data, which may include, but are not limited to, Lockbox ID, Showing Agent ID, Access Date and Time, Listing ID, etc. However, electronic lockboxes are only temporarily "assigned" to a specific property, i.e., they are constantly moved from one listed property to the next and the seller's agent or listing office personnel is required to manually enter both the unique Lockbox ID and the Listing ID into the a database or other means of tracking the lockbox's location whenever it is moved to a new property. However, many times this manual assignment is not completed by the agents or listing offices resulting in an incomplete lockbox access data record. A lockbox access data record where the Listing ID is missing may be formatted as below:

| Access Event | Lockbox ID | Listing ID | Access Date | Access Time | Showing Agent Key ID | Showing Agent ID |
|---|---|---|---|---|---|---|
| L1 | 3453 | n.a. | Jan 11, 2008 | 9:40 AM | 7655 | 566 |

Prior art showing management services, such as ShowingTime™'s ShowingDesk™ software (see U.S. Pat. No. 6,973,432) allows real estate professionals, especially listing and showing agents, to schedule an appointment for a showing. A typical showing appointment data record stored in the showing management system's database may contain, but is not limited to, the data fields shown in the table below.

| Listing ID | Showing Date | Showing Time | Showing Agent ID |
|---|---|---|---|
| 1234 | Jan. 4, 2008 | 9:45 AM | 566 |
| 1234 | Jan. 4, 2008 | 3:00 PM | 582 |

The showing management system of this invention compares available lockbox access records with the stored showing time appointment data records and programmatically matches a Listing ID to a Lockbox ID.

Optional Preprocessing of Imported Lockbox Access Records

In order to process the lockbox access records, they must be imported into the showing management system's database. In one embodiment the lockbox access records stored in the electronic lockboxes are transmitted via a communications link between the electronic lockbox and the showing management system's servers coupled to the showing management system's database. An imported lockbox access record from a particular electronic lockbox may look like the table below.

| Access Event | Lockbox ID | Listing ID | Access Date | Access Time | Showing Agent Key ID | Showing Agent ID |
|---|---|---|---|---|---|---|
| L1 | 3453 | 1234 | Jan 11, 2008 | 9:40 AM | 7655 | 566 |
| L2 | 3453 | n.a. | Jan 11, 2008 | 3:10 PM | 8224 | 582 |
| L3 | 3453 | n.a. | Jan 12, 2008 | 11:12 AM | 7655 | 566 |
| L4 | 3453 | 1234 | Jan 14, 2008 | 2:58 PM | 4357 | 226 |
| L5 | 3453 | 1234 | Jan 15, 2008 | 10:05 AM | 7790 | 733 |

In the table above, recorded Access Events L2 and L3 do not list Listing IDs. If desired the showing management system may perform preprocessing of the lockbox access record of a particular lockbox (here: lockbox with Lockbox ID 3453) to automatically fill in the missing Listing ID. This is designed to cover either of two scenarios: (1) a user has inadvertently removed the assignment during the time period between events L1 and L4, or (2) the empty entries remain after other lockbox assignment steps described elsewhere in this disclosure have been done.

Figure 13:
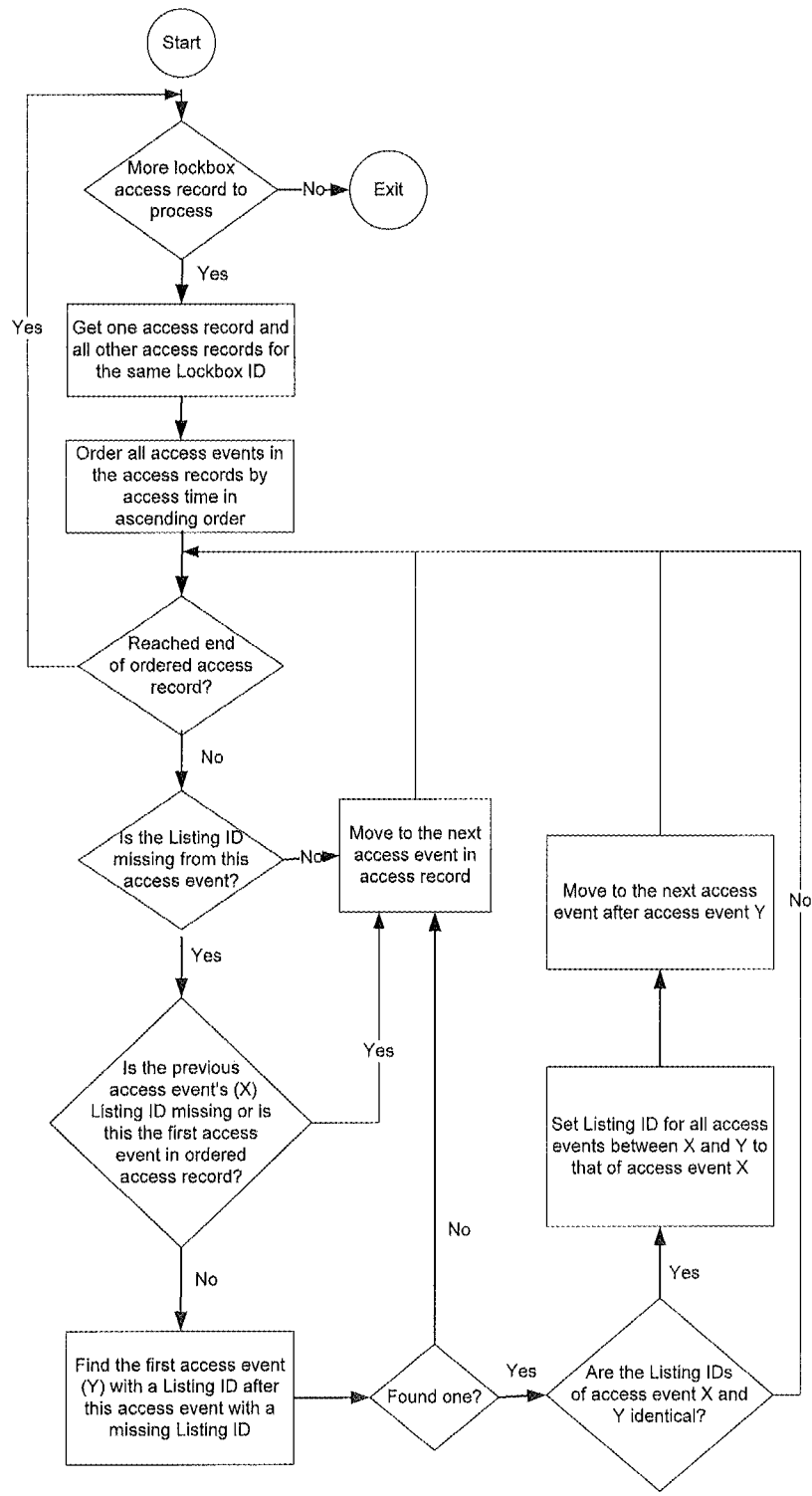
FIG. 13 depicts one embodiment of logic inside the showing management system for preprocessing data from an electronic lockbox.

The flowchart of FIG. 13 depicts one possible sequence of steps for preprocessing lockbox access records from a lockbox having a particular Lockbox ID. The showing management system gathers all available lockbox access records from one particular lockbox and orders all Access Events by Access Date and Access Time in ascending order. When an Access Event in the access record does not list a Listing ID, the logic will compare the Listing ID recorded for the previous Access Event (X) with the first available Listing ID in an access event (Y) after this incomplete Access Event. If the Listing ID of Access event X and Y are identical, the logic will set the Listing ID for all the incomplete Access Events between Access Event X and Y to that of Access Event X. Accordingly, in the example above, the showing management system's logic would automatically set the Listing ID for the Access Events L2 and L3 to 1234.

A similar preprocessing logic may also be used if a Listing ID in the lockbox access record is not missing, but appear to be erroneous or inconsistent. For example, Access Event L2 lists the Listing ID 1243, while the other Access Events list the Listing ID 1234.

| Access Event | Lockbox ID | Listing ID | Access Date | Access Time | Showing Agent Key ID | Showing Agent ID |
|---|---|---|---|---|---|---|
| L1 | 3453 | 1234 | Jan 11, 2008 | 9:40 AM | 7655 | 566 |
| L2 | 3453 | 1243 | Jan 11, 2008 | 3:10 PM | 8224 | 582 |
| L3 | 3453 | 1234 | Jan 12, 2008 | 11:12 AM | 7655 | 566 |
| L4 | 3453 | 1234 | Jan 14, 2008 | 2:58 PM | 4357 | 226 |

Here, the preprocessing logic would identify the Listing ID recorded for L2, i.e., 1243 as being inconsistent, by comparing all Listing IDs recorded in the given lockbox access record. In the event the preprocessing logic fails to deliver an obvious correction with high certainty, the showing management system will treat all inconsistent Listing IDs as if they were missing all together and will run this modified lockbox access record through the matching algorithm described below. The system will then compare the results of the matching algorithm with the original lockbox access record that contains the apparently inconsistent Lockbox IDs. If the matched Listing IDs are different from the original Lockbox IDs the showing management system will keep the Lockbox IDs that resulted from the matching algorithm.

Matching a Lockbox ID with a Listing ID

Figure 14:
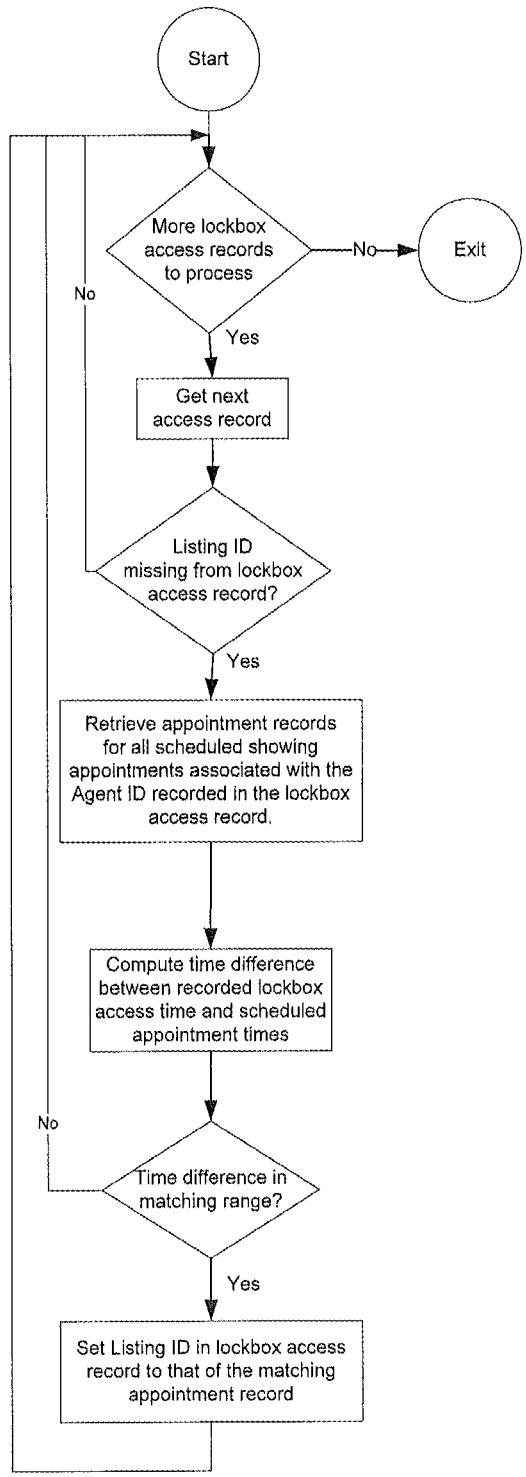
FIG. 14 depicts one embodiment of logic inside the showing management system for matching a lockbox ID with a Listing ID, when the Listing ID is missing from electronic lockbox access data records when the showing management system is processing a batch of electronic lockbox access data records.

FIG. 14 depicts one embodiment of logic inside the showing management system for matching a Lockbox ID with a Listing ID, when the Listing ID is missing from electronic lockbox access data records. For an Access Event without a Listing ID, the showing management system will analyze the Showing Agent ID, the Access Date and the Access Time recorded for that particular Access Event. The showing management system then retrieves the records for all scheduled showing appointments associated with the recorded Showing Agent ID from the showing management system's database. Next, the system will compute the time differences between the recorded lockbox Access Date and Access Time and the scheduled showing appointment times. If the Access Date/Access Time recorded for the particular Access Event fall within a scheduled showing appointment's start and end time, i.e., less than x minutes before the scheduled showing appointment's start time and less then y minutes after the scheduled showing appointment's end time, the showing management system will assign the Listing ID from this matching showing appointment to this Access Event. The value for x and y may be determined by an administrator of the showing management system, and may depend on many factors. When determining values for x and y, it is obvious that setting lower values for x and y may result in fewer but more accurate Listing ID matches, whereby higher values may yield more but less accurate matches.

The logic of FIG. 14 is further explained in the following example. The following table contains a number of scheduled showing appointments.

| Showing Appt. | Showing Date | Showing Time | Showing Agent ID | Listing ID |
|---|---|---|---|---|
| A1 | Jan. 11, 2008 | 3:00 PM | 582 | 1234 |
| A2 | Jan. 11, 2008 | 3:30 PM | 566 | 5678 |
| A3 | Jan. 11, 2008 | 4:00 PM | 244 | 1234 |
| A4 | Jan. 11, 2008 | 5:30 PM | 868 | 1234 |

Imported lockbox access records from different lockboxes, where the Listing ID was not recorded or is missing may look like this:

| Access Event | Access Date | Access Time | Showing Agent ID | Lockbox ID | Listing ID |
|---|---|---|---|---|---|
| L1 | Jan. 11, 2008 | 3:10 PM | 582 | 9001 | n.a. |
| L2 | Jan. 11, 2008 | 3:15 PM | 566 | 9002 | n.a. |
| L3 | Jan. 11, 2008 | 3:50 PM | 244 | 9001 | n.a. |
| L4 | Jan. 11, 2008 | 5:31 PM | n.a. | 9001 | n.a. |

For these sets of data, it is likely that the lockbox with the Lockbox ID 9001 is assigned to Listing ID 1234 and Lockbox ID 9002 is assigned to Listing ID 5678.

The following examples will illustrate the application of the matching logic shown in FIG. 14. First, Showing Appointment A1 for the showing of the property with the Listing ID 1234 was set for 3:00 PM for the showing agent with ID 582. According to the lockbox Access Event L1, Agent ID 582 was accessing Lockbox ID 9001 at 3:10 PM. Since the lockbox access by Agent ID 582 occurred at about the same time as the appointment was scheduled, i.e., 10 minutes late, it is likely that the showing agent was accessing the property with the Listing ID 1234 using the lockbox with the Lockbox ID 9001. Furthermore, for this same reason it is unlikely that the other lockboxes in this exemplary lockbox access record match with Listing ID 1234 or that any other Listing ID is associated with Lockbox ID 9001.

Second, Showing Appointment A2 for the showing of the property with the Listing ID 5678 was set for 3:30 PM for the showing agent with ID 566. According to the lockbox Access Event L2, Agent ID 566 was accessing Lockbox ID 9002 at 3:15 PM. Since the lockbox access occurred by Agent ID 566 at about the same time as the appointment was scheduled, i.e., 15 minutes early, it is likely that the showing agent was accessing the property with the Listing ID 5678 using the lockbox with Lockbox ID 9002. Furthermore, for this same reason it is unlikely that the other lockboxes in this exemplary lockbox access record match with Listing ID 1234 or that any other Listing ID is associated with Lockbox ID 9002.

Third, Showing Appointment A3 was set for a 4:00 PM showing of Listing ID 1234 by the agent having Agent ID 244. According to the lockbox Access Event L3, Agent ID 244 was accessing Lockbox ID 9001 at 3:50 PM. Since the lockbox access occurred by the agent having Agent ID 244 at about the same time as the appointment was scheduled, i.e., 10 minutes early, it is likely that the agent was accessing the property with the Listing ID 1234 using the lockbox with Lockbox ID 9001. Furthermore, for this same reason it is unlikely that the other lockboxes match Listing ID 1234 or that any other Listing ID is associated with Lockbox ID 9001.

Finally, this logic is also capable to determine the Showing Agent ID for a recorded Access Event, should that data be absent from the record. In the table above, the Showing Appointment A4 for a showing of Listing ID 1234 by Agent ID 868 was set for 5:30 PM. According to the lockbox Access Event L4, Lockbox ID 9001 was accessed by an unidentified showing agent at 5:31 PM. Since the lockbox access occurred at about the same time as the appointment was scheduled, i.e., 1 minute late, it is likely that the showing agent that was accessing the lockbox was the showing agent with Showing Agent ID 868 and that the associated property has the Listing ID 1234.

Improved Matching

While the aforementioned matching algorithm is easy to implement and is reasonably efficient, there is no guarantee that the matches generated by the algorithm are correct. For example, in the likely case where multiple showings occur simultaneously, and multiple fields are uncertain, the above algorithm will not generate accurate matches. Therefore, another aspect of this invention is the use of an improved matching algorithm incorporating statistical methods to generate an acceptable level of confidence. Cumulative probabilities for a standard normal distribution table are shown in FIG. 17.

Figure 15:
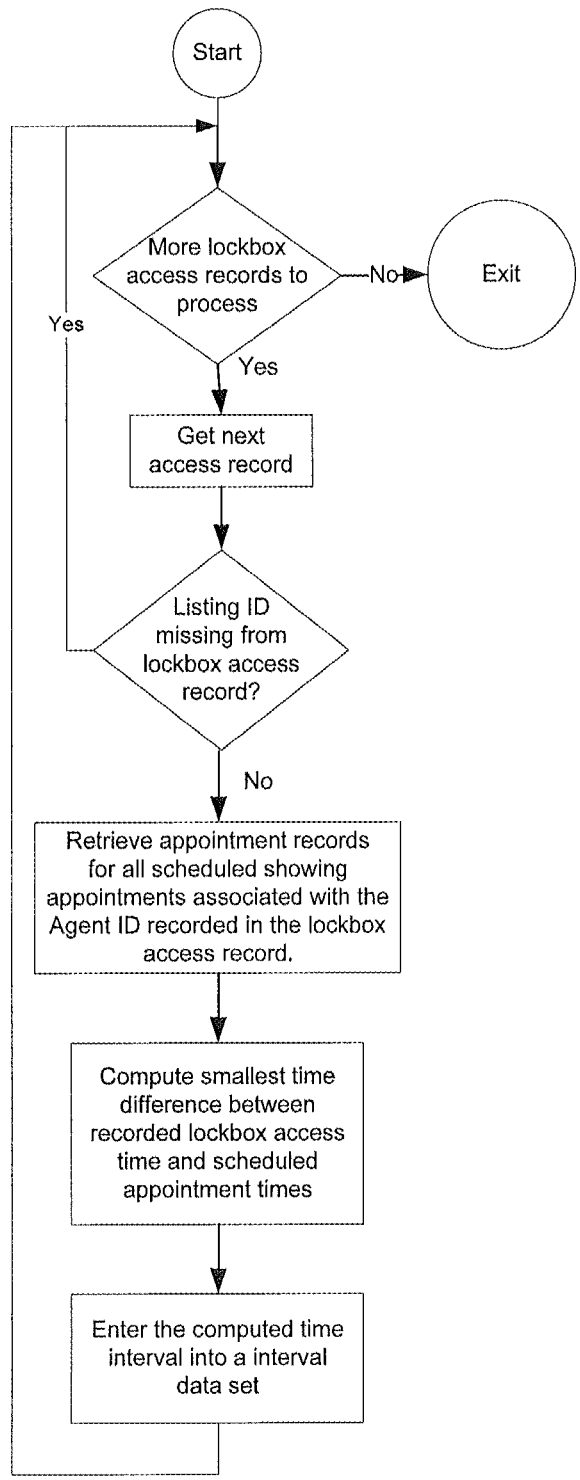
FIG. 15 depicts one embodiment of logic inside the showing management system to determine values for an approximately normal distribution by computing time intervals.
Figure 16:
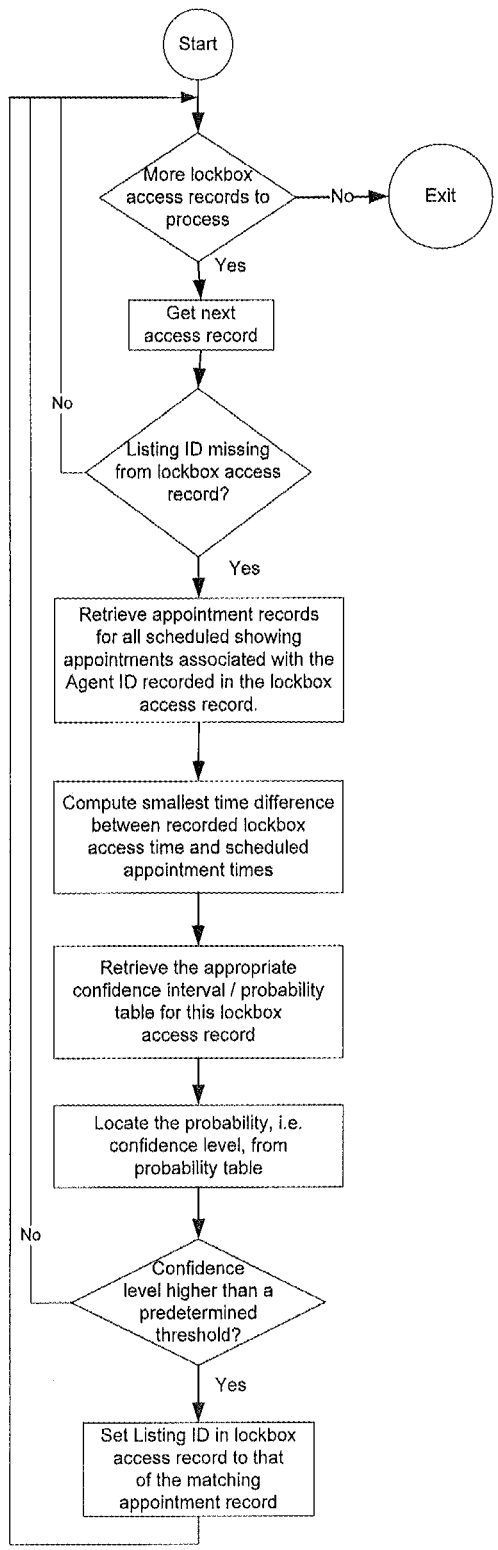
FIG. 16 depicts one embodiment of logic for matching Listing ID and Lockbox ID using a predetermined confidence level.

FIG. 15 depicts one embodiment of logic for matching a Listing ID with a Lockbox ID by establishing a "normal distribution." For an Access Event without a Listing ID, the showing management system will analyze the Showing Agent ID, the Access Date and the Access Time recorded for that particular Access Event. The showing management system then retrieves all scheduled showing appointments associated with that Showing Agent ID for the same date as the recorded Access Date with the missing Listing ID. Next, the system will compute the smallest time difference between the recorded lockbox Access Date/Access Time and all scheduled showing appointments for that particular Showing Agent ID on that particular Access Date.

When calculating the time difference/interval, the following algorithm is applied. When the recorded lockbox Access Time is before the scheduled appointment's start time, then the appointment start time is subtracted from the lockbox Access Time. When the recorded lockbox Access Time is after a scheduled appointment's end time, the appointment's end time is subtracted from the recorded lockbox Access Time. When the recorded lockbox Access Time is between the appointment's start and end time, then the time interval is set to 0 (zero). The smallest time intervals are then entered into a new interval data set. This interval data set is approximately a normal distribution.

Figure 18:
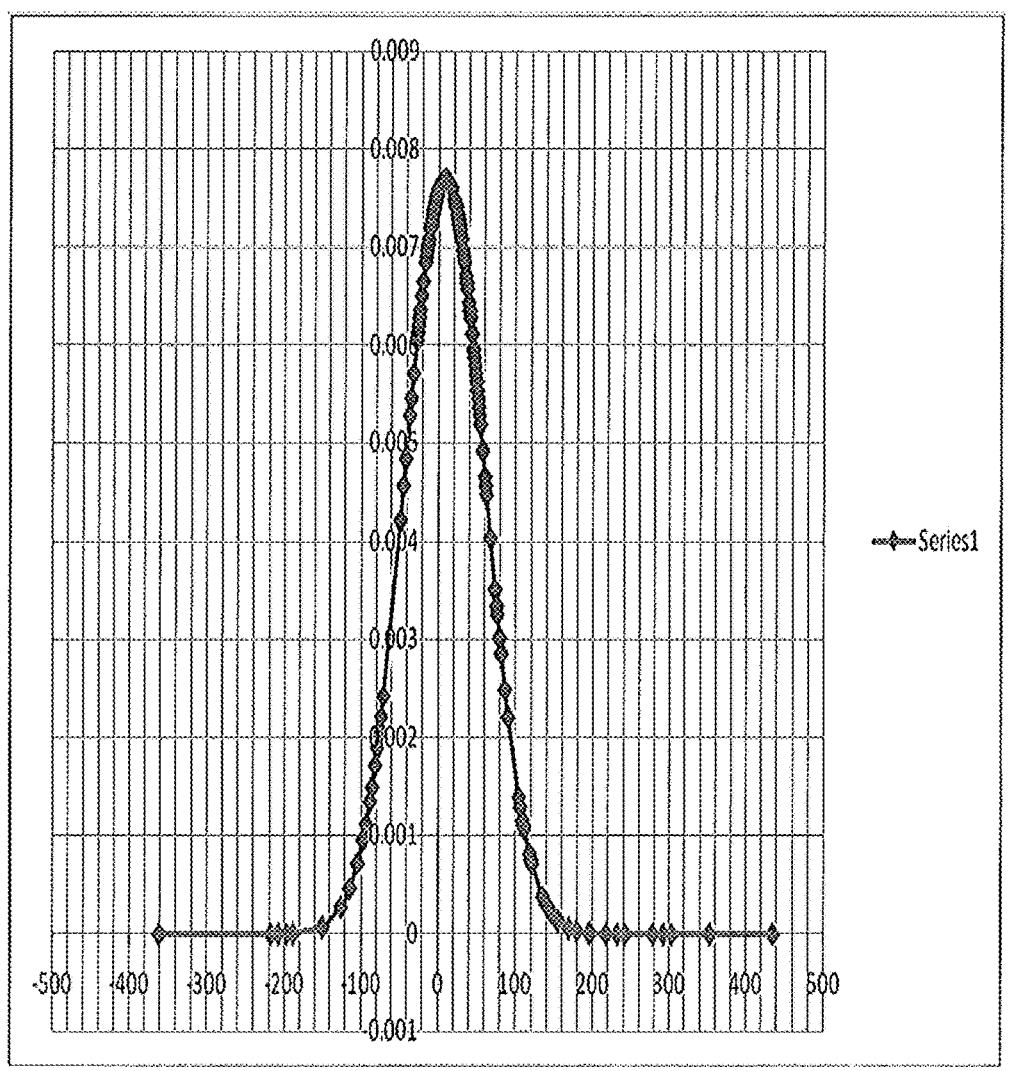
FIG. 18 depicts a probability density graph based on a given set of data.

FIG. 18 is a graph depicting a probability density curve demonstrating the approximately normal distribution based on a given set of data. Here, the given set of data includes a mean of m=7.965079365, and a standard deviation of s=51.93862147, whereby the horizontal axis shows the smallest time intervals in minutes.

Let X stand for the normal random variable of these intervals, whose values are this data set and P stand for the cumulative probability. By utilizing the technique of standardizing a normal distribution, $Z=(X-m)/s$, and the table of Cumulative Probabilities for a Standard Normal Distribution (see FIG. 17), we can establish the relationship between confidence intervals and probabilities. The following small table lists several value pairs of this relationship. A more refined table with many more entries or a formula approach may be used in an actual implementation.

| Confidence interval mathematical representation | Confidence interval value representation in minutes | Probability or confidence level |
|---|---|---|
| m ± 0.667*s | −26.67798116 to 42.60813989 | 50% |
| m ± 1.0*s | −43.97354211 to 59.90370084 | 68% |
| m ± 1.645*s | −77.47395295 to 93.40411168 | 90% |
| m ± 1.96*s | −93.83461872 to 109.7647774 | 95% |
| m ± 2.58*s | −126.036564 to 141.9667228 | 99% |

Figure 26:
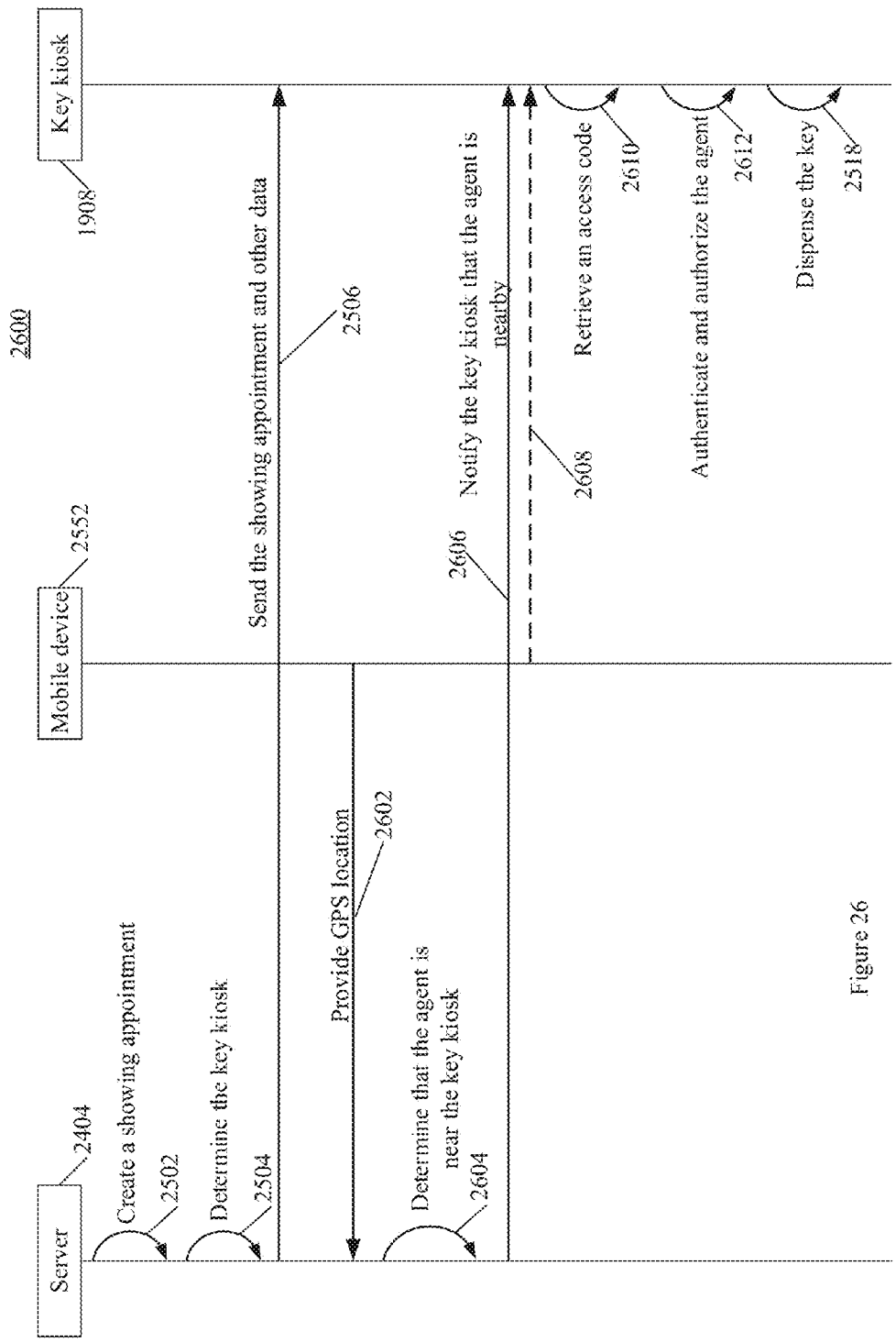
FIG. 26 is a sequence diagram depicting a process by which the GPS location of a showing agent is used to retrieve a key from a key kiosk in accordance with the present teachings.

For example, one value from the above computed data set is 90 minutes. In the table above, the smallest range the value 90 falls in is −77.47395295 to 93.40411168. Accordingly, we can say that we are 90% confident that the match between the lockbox access record and showing appointment record is accurate. FIG. 26 depicts one embodiment of logic to match a Listing ID with a Lockbox ID and to determine the confidence level of the accuracy of the match.

To further enhance the accuracy of the matches it should further be considered that the approximate normal distribution curve's properties, mean and standard deviation may vary based on the underlying data set. There are many approaches to utilize this technique. One way is to categorize the lockbox access records by real estate agency offices, groups of offices (based on specific criteria, such as, for example, geographical location, real estate professional association, etc.), all offices, or other criteria. After having computed the mean and standard deviation for each category, it is applied to lockbox access records with missing Listing IDs that belong to the same category.

Matching Based on Multiple Showing Agents

The aforementioned matching is based on only one lockbox access record. By itself, this can be inaccurate and/or impossible to use for matching. For example, the disclosed matching algorithm cannot be used at all or will be highly inaccurate if: 1) there are no showing appointments in the showing management's database that are associated with the Showing Agent ID recorded in the lockbox access record, 2) even the smallest computed time difference between the recorded lockbox Access Date/Access Time and all scheduled showing appointments for that particular Showing Agent ID on that particular Access Date is still too large (i.e., outside the normal distribution), or 3) some other irregularity occurs. Such an incomplete lockbox access record prior to matching efforts may look like this:

| Access Event | Access Date | Access Time | Showing Agent ID | Lockbox ID | Listing ID |
|---|---|---|---|---|---|
| L1 | Jan. 11, 2008 | 9:29 AM | 582 | 9001 | n.a. |
| L2 | Jan. 12, 2008 | 4:00 PM | 566 | 9001 | n.a. |

Based on the aforementioned matching, different Listing IDs might be determined for these two Access Events. These two Access Events are presented as an example. There might be multiple records from the same Lockbox ID. When different Listing IDs are found for access records for the same Lockbox ID, there are two scenarios. First, the Access Events are timely ordered:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 15, 2008 | 4:00 PM | 54 | 3453 | 234 |
| L4 | Jan. 16, 2008 | 4:00 PM | 434 | 3453 | 234 |
| L5 | Jan. 17, 2008 | 4:00 PM | 543 | 3453 | 456 |

For example, the lockbox access record above contains Listing IDs 123, 234 and 456. If the access events are grouped by Listing IDs, these subgroups are in timely sequential order. It can be assumed that the match is accurate and that the lockbox with Lockbox ID 3453 was indeed used on different properties (i.e., was associated with different Listing IDs).

In the second scenario the Access Events in a lockbox access record are not timely ordered:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 13, 2008 | 4:00 PM | 54 | 3453 | 234 |
| L4 | Jan. 16, 2008 | 4:00 PM | 434 | 3453 | 234 |
| L5 | Jan. 17, 2008 | 4:00 PM | 543 | 3453 | 456 |

Note that in the example above Access Event L3 is not in timely order. There are many possible ways to process these "noise" cases and a variety of factors to consider, whereby the results can vary dramatically. One possible way to approach these "noise" cases is to consider the computed confidence level for each matching. When in conflict, the match with highest computed confidence level should overwrite possible matches with lower confidence levels. For example, if the computed confidence level for Access Event L2 is 87% and the computed confidence level for Access Event L3 is only 13%, then it is far more accurate if the system assigns Listing ID 123 to Access Event L3 instead of Listing ID 234.

Utilizing Historic Lockbox Access Data to Improve Matching Accuracy

The showing management system may not have available all lockbox access data when performing the disclosed matching algorithm. This may be the case when the lockbox access data are not promptly transmitted to the showing management system. Therefore the matching algorithm may be performed repeatedly to improve the matching accuracy. Each time the algorithm is performed, it will have available more lockbox access data for processing than before. Accordingly, the more historic lockbox access data are available for processing, the more accurate the resulting matches are and it will be possible to assign most of the lockboxes (i.e., Lockbox IDs) to Listing IDs without having to rely on a constant availability of up to date lockbox access data.

The Showing Agent is not the Agent Who Scheduled the Showing Appointment

According to the disclosed matching algorithm, a recorded Access Event should match a scheduled showing appointment for the accessed property (i.e., Listing ID). However, there may be instances where the showing agent is not the same agent for whom a showing appointment was scheduled. In other words, a showing agent with a Showing Agent ID different from the one that was scheduled access the lockbox. There are two possible scenarios.

First, the Access Event is the intended showing of the appointment. In this case, the accessing showing agent and the agent for whom the showing appointment was made form a team. A team may consist of two or more members and the team members can represent each other in the sense of scheduling appointments and showing properties. The information that a plurality of agents with different respective Showing Agent IDs are a team can be provided by the respective agents, offices, brokerage, MLS or other entities. The showing management system is further capable of defining and managing teams of showing agents. To allow for accurate matching in cases like this, the disclosed matching algorithm must be able to treat a plurality of different Showing Agent IDs as one, when processing lockbox access records and showing time appointment records. The algorithm is required to be resilient to this situation. It does so by cumulatively building the probability prior to the final assignment.

Second, the Access Event is not the intended showing of the appointment. In this case, the disclosed matching algorithm cannot produce a match. However, the "Refine lockbox data process" described below, could assign a Listing ID to this lockbox Access Event.

Repeated Matching

It is very likely that the result of a matching process is not accurate. For example, one result might look like what is described in the following table, assuming any "noise" or conflicts have been resolved.

| Access Event | Lockbox ID | Listing ID | Access Date | Access Time | Confidence Level of Match |
|---|---|---|---|---|---|
| L1 | 3453 | 123 | Jan. 3, 2008 | 11:29 AM | Listing ID present |
| L2 | 3453 | 123 | Jan. 3, 2008 | 2:00 PM | 0.9 |
| L3 | 3453 | n.a. | Jan. 10, 2008 | 2:00 PM | 0 (no match) |
| L4 | 3453 | 234 | Jan. 18, 2008 | 1:00 PM | 0.7 |
| L5 | 3453 | 234 | Jan. 20, 2008 | 3:00 PM | 0.8 |
| L6 | 3453 | 456 | Jan. 24, 2008 | 4:00 PM | Listing ID present |

Ratings can be established on a result of a matching process. One rating may be the sum of these confidence levels. In this example, the rating would be 0.9+0.0+0.7+0.8=2.4. The next table is the result of a subsequent matching process.

| Access Event | Lockbox ID | Listing ID | Access Date | Access Time | Confidence Level of Match |
|---|---|---|---|---|---|
| L1 | 3453 | 123 | Jan. 3, 2008 | 11:29 AM | Listing ID present |
| L2 | 3453 | 123 | Jan. 3, 2008 | 2:00 PM | 0.9 |
| L3 | 3453 | n.a. | Jan. 10, 2008 | 2:00 PM | 0 (no match) |
| L4 | 3453 | 234 | Jan. 18, 2008 | 1:00 PM | 0.7 |
| L5 | 3453 | 456 | Jan. 20, 2008 | 3:00 PM | 0.9 |
| L6 | 3453 | 456 | Jan. 24, 2008 | 4:00 PM | Listing ID present |

In this case, the rating for this matching process is 0.9+0.0+0.7+0.9=2.5. When comparing the two ratings, i.e., 2.4 and 2.5, the rating of 2.5 is higher and the system should accept the matching results of the matching process with the higher rating.

Improved Rating for Match Results

In the last two tables above, the Access Date of Access Event L5 is closer to the Access Date of L4 than to the Access Date of L6. The match ratings are further improved by assigning a bigger weight to the matching results of the first table. There are many different ways to assign weights. One possible way is 1/n, whereby n is the sum of 1 and the number of days between the Access Event of the matched Access Event and the previous or subsequent Access Event, whichever is closer. If the previous or subsequent Access Event doesn't have the same Listing ID as the matched Access Event, then n is set to a fixed number. The appropriate value for n may be the number of unassigned lockboxes in the set of possible lockboxes. In this example, the value for n is n=365. Based on this improvement, the new ratings would be 0.9/1+0.0+0.7/365+0.8/3=1.168584 and 0.9/1+0.0+0.7/365+0.85/5=1.071918. Based on this adjusted rating, the result of the first matching is a better one.

No Scheduled Showing Appointment Data

There may be a recorded lockbox Access Event though no showing appointment was scheduled. This is particularly common on vacant properties. Since there is no scheduled showing appointment for the lockbox, the lockbox cannot be assigned to the property/Listing ID.

Refine Lockbox Access Data Processing

Before the lockbox access records are run through the disclosed matching algorithm, the records may look like this:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | n.a. |
| L2 | Jan. 14, 2008 | 4:00 PM | 765 | 3453 | n.a. |
| L3 | Jan. 13, 2008 | 4:00 PM | 54 | 3453 | n.a. |
| L4 | Jan. 16, 2008 | 4:00 PM | 434 | 3453 | n.a. |
| L5 | Jan. 17, 2008 | 4:00 PM | 543 | 3453 | n.a. |

After the matching, the records may look like the following table. This pattern may be repeated for a large set of records. Here Access Events L1, L4 and L5 are now assigned to the same Listing ID.

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | n.a. |
| L3 | Jan. 13, 2008 | 4:00 PM | 54 | 3453 | n.a. |
| L4 | Jan. 16, 2008 | 4:00 PM | 434 | 3453 | 123 |
| L5 | Jan. 17, 2008 | 4:00 PM | 543 | 3453 | 123 |

In this refinement process, the Listing ID 123 was assigned to Access Events L2 and L3. The "refinement" logic may be similar to the one shown in FIG. 23 (i.e., Preprocessing of lockbox access data).

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 13, 2008 | 4:00 PM | 54 | 3453 | 123 |
| L4 | Jan. 16, 2008 | 4:00 PM | 434 | 3453 | 123 |
| L5 | Jan. 17, 2008 | 4:00 PM | 543 | 3453 | 123 |

Team Matching

In instances where a plurality of showing agents, i.e., a showing agent team, is assigned to a particular Listing ID, the disclosed logic and matching algorithms may also be used to assure correct matching of Listing ID and Showing Agent IDs. Like matching individual Showing Agent IDs with a Listing ID, the showing management system would use the same available showing appointment data and imported lockbox access records. The disclosed algorithms and methods to improve the matching accuracy would be applied repeatedly to account for members joining or leaving a team. The matching results may also be used for controlling the access to an electronic lockbox.

Kiosk Based Scheduling

In a further aspect of the disclosed system, a showing appointment making system may be coupled with a key delivery kiosk. The disclosed system may be advantageously used with any high density real estate property, such as, for example, an apartment complex, a condominium complex, or a town home development. Using the disclosed system, a user of the showing management system, such as an agent or a potential buyer, may make an appointment to show a real property. The user may then proceed to the key delivery kiosk, which may advantageously be disposed at a real estate office. Using methods defined herein, the key delivery kiosk will receive the showing time period from the showing scheduling system, and will make a key available to the user at the time of the showing.

Figure 19:
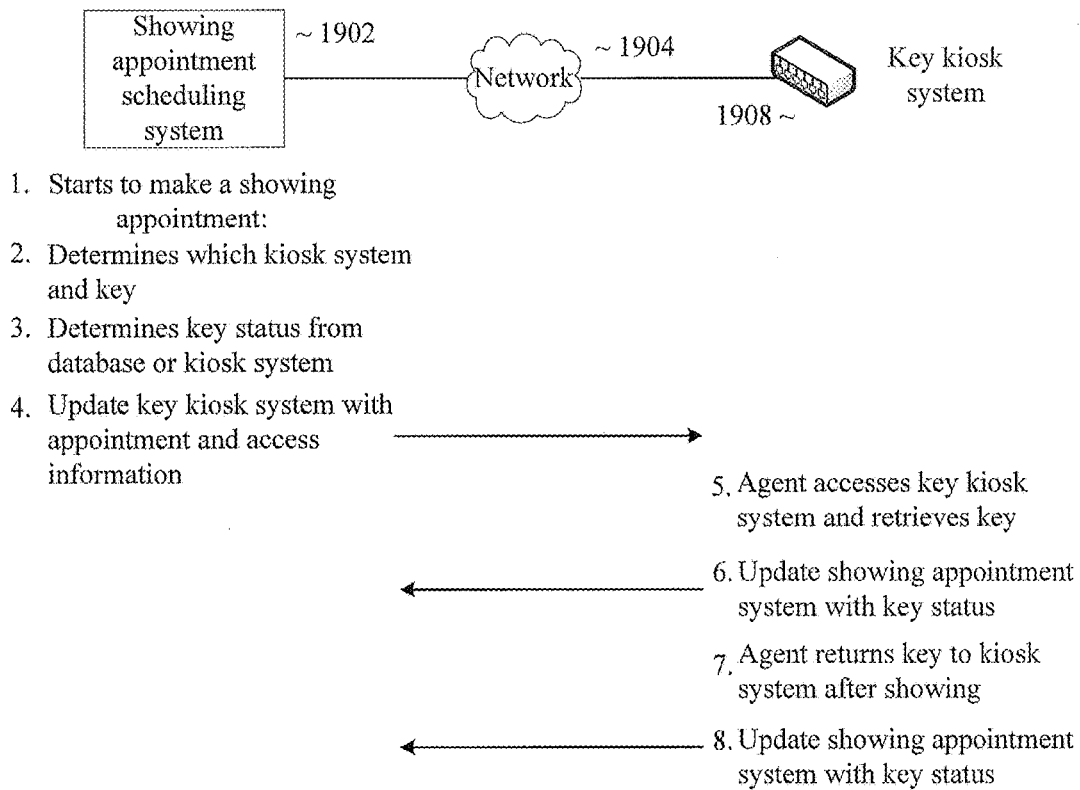
FIG. 19 depicts a kiosk based showing appointment scheduling system.

FIG. 19 depicts a key delivery kiosk integrated with a showing appointment making system. A showing appointment making system 1902, such as that disclosed earlier herein, or that disclosed in U.S. Pat. No. 6,973,432, is used to schedule appointments to view a real property, such as a condominium, town home, apartment building, or some other form of real property. A key kiosk system, such as that described in the background of this document, is coupled to the showing appointment making system 1902 by a network 1904. While any form of network may be used, such as, for example, a switched telephone network coupled to the key kiosk system 1908 and the showing appointment making system 1902 by analog modems (not shown), a local area network utilizing, for example, Ethernet or some other networking format, the disclosed system is especially well suited for use with a generally reliable public network such as the Internet. In an Internet based system, the showing appointment making system 1902 and the key kiosk system 1908 may be coupled to the Internet through a router (not shown), and may utilize an Ethernet connection (not shown).

The process by which the disclosed system may be used is generally described in FIG. 19 as well. First, a user makes an appointment to view a real property using the disclosed showing scheduling system. Based on the selected property, the showing scheduling system will determine which key delivery kiosk will be used to deliver a particular key to the user. The showing scheduling system may then interface with the appropriate key delivery kiosk and determine the key status, or, alternatively, the showing scheduling system may determine the key status from a local database. The key delivery kiosk is then updated with appointment and access information, such as, for example, the start and end time of the appointment, as well as an identifier corresponding to a realtor who will conduct the showing. At the appropriate time the user goes to the kiosk and retrieves the key. The key kiosk then updates the showing scheduling system with the keys status; i.e., that the key is out with the user. The user then returns the key to the key kiosk, which then updates the showing scheduling system with the key's updated status; i.e., the key is available for use again.

Figure 20:
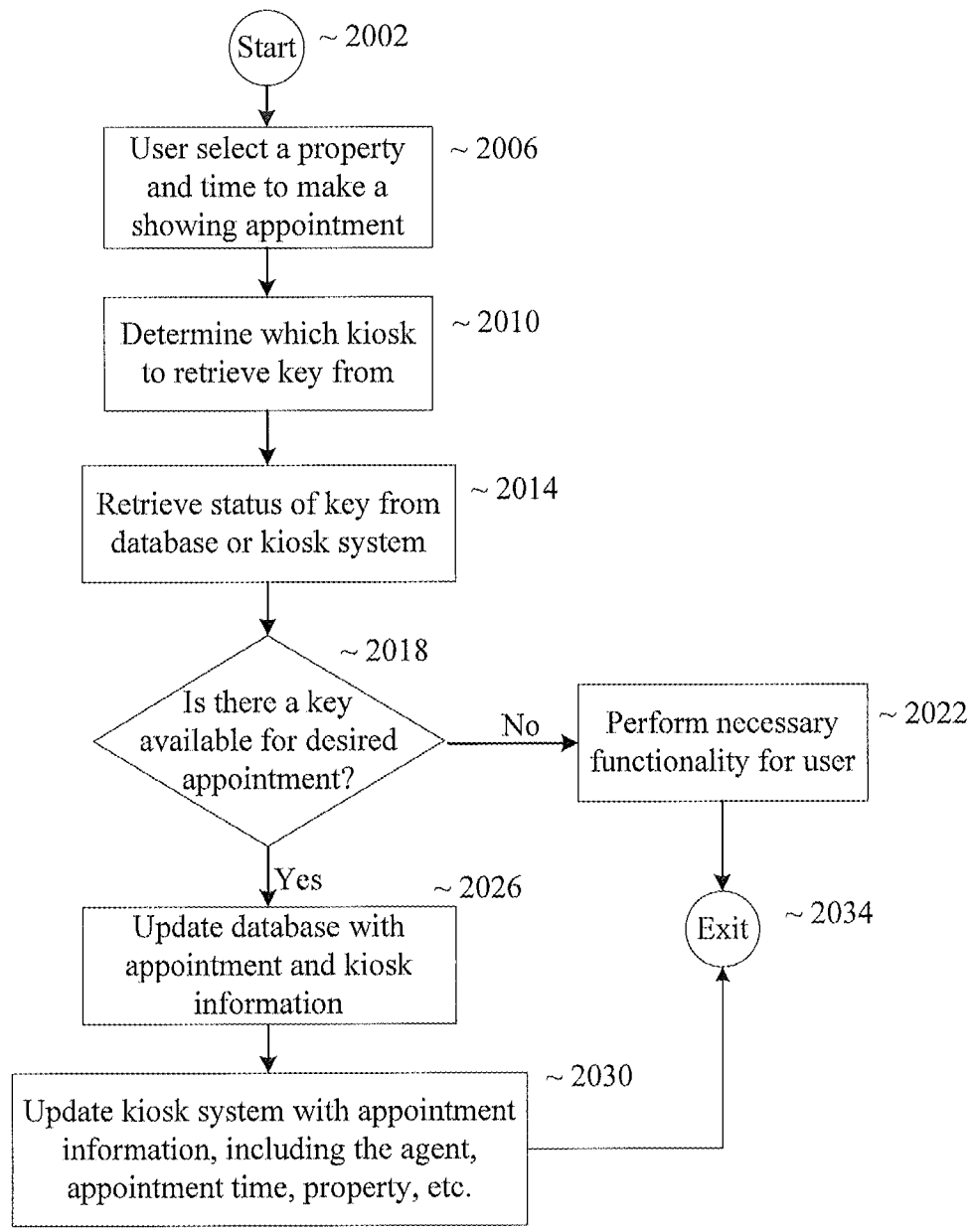
FIG. 20 depicts one possible embodiment of appointment making logic executed by a kiosk based showing appointment scheduling system.

FIG. 20 is a flowchart depicting one possible implementation of showing scheduling logic executed by the showing scheduling system 1902 and interfacing with the key kiosk 1908. This logic could be implemented, for example, as a software program running on a computer integrated into the showing scheduling system 1902. In step 2002, the showing scheduling method is entered. In step 2006, a user selects a property and time to make a showing appointment. This step may be performed, for example, by the user interfacing with a browser based showing scheduling interface, or some other form of interface. The showing scheduling system then determines which kiosk the key needs to be retrieved form in step 2010. This determination may be made, for example, by accessing a database associating key kiosks with properties, or by querying a list of key kiosks over a network until the appropriate key kiosk is located.

After determining the proper kiosk, the showing management system retrieves the status of the key associated with the property for which a showing is to be scheduled in step 2014. The showing management system may accomplish this step by accessing a key database maintained by the showing management system based on updates received from various key kiosks, or the showing management system may direct query the appropriate key kiosk for the status of the desired key. In step 2014, the showing scheduling system determines if a key is available for the selected property at the desired date and time. If no key is available, execution transitions to step 2022, where any other functionality necessary for the user may be performed. Such functionality may include, for example, displaying a schedule of when a key is available, and allowing the user to select a different time for the appointment. After any additional functionality is provided to the user, the method exits in step 2034. However, if a key is available for the selected property at the desired date and time of the appointment, a showing database is updated with the appointment information as well as the kiosk and possibly the key information in step 2026. In step 2030, the showing system updates the key kiosk 1908 with the appointment information as well, including an authorized user identifier, the appointment start time, the appointment end time, and a property identifier. The method then exits in step 2034.

Figure 21:
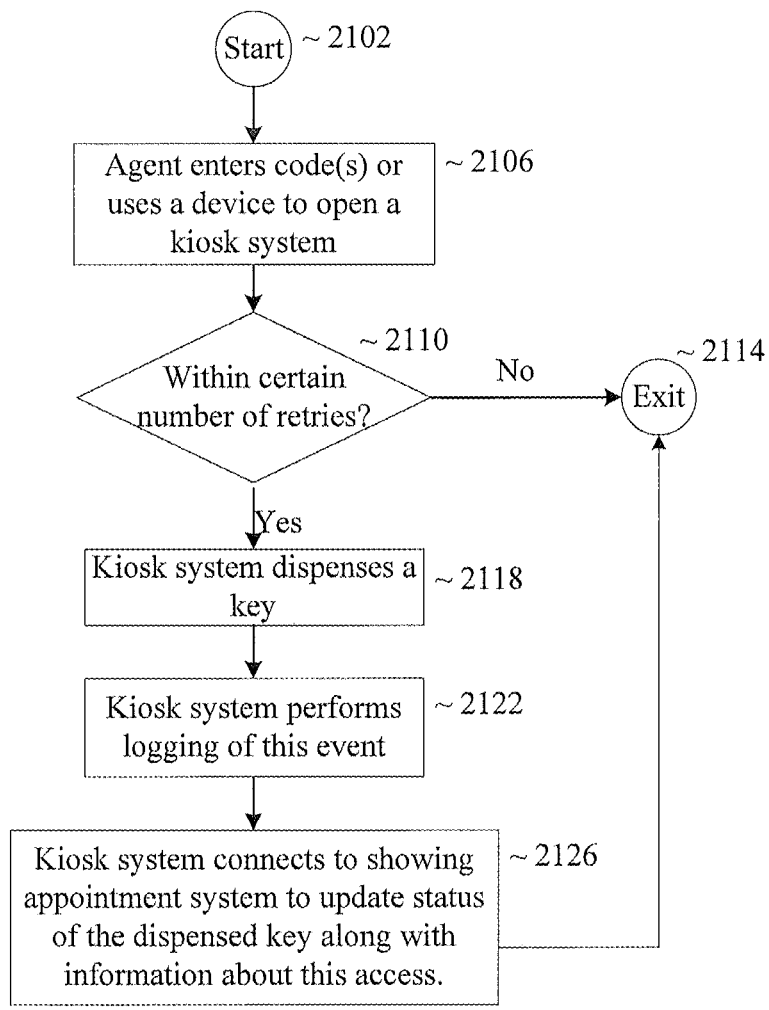
FIG. 21 depicts one possible embodiment of key retrieval logic executed by a kiosk based showing appointment scheduling system.

FIG. 21 is a flowchart depicting one possible implementation of key retrieval logic executed by the key kiosk 1908 and interfacing with the showing scheduling system 1902. This logic could be implemented, for example, as a software program running on a computer integrated into the key kiosk system 1908. In step 2102, the key retrieval method is entered. In step 2106, the user identifies herself to the kiosk. One way to do this would be to enter a code associated with the individual user, such as, for example, an agent code. It should be noted that other forms of authorization could be used with the disclosed showing scheduling system. However, within the parameters of a user code security system, the disclosed method then checks to ensure that the correct code was entered within a predetermined number of attempts in step 2110. If not, execution proceeds to step 2114, which exits the method. However, if the code was entered correctly within an acceptable number of attempts, execution proceeds to step 2118, where the kiosk will make the key available to the user, such as, for example, by dispensing the key using a key dispensing mechanism. In step 2122, the key kiosk logs the key dispensing event, and then notifies the showing scheduling system in step 2126. The method then exits in step 2114.

Figure 22:
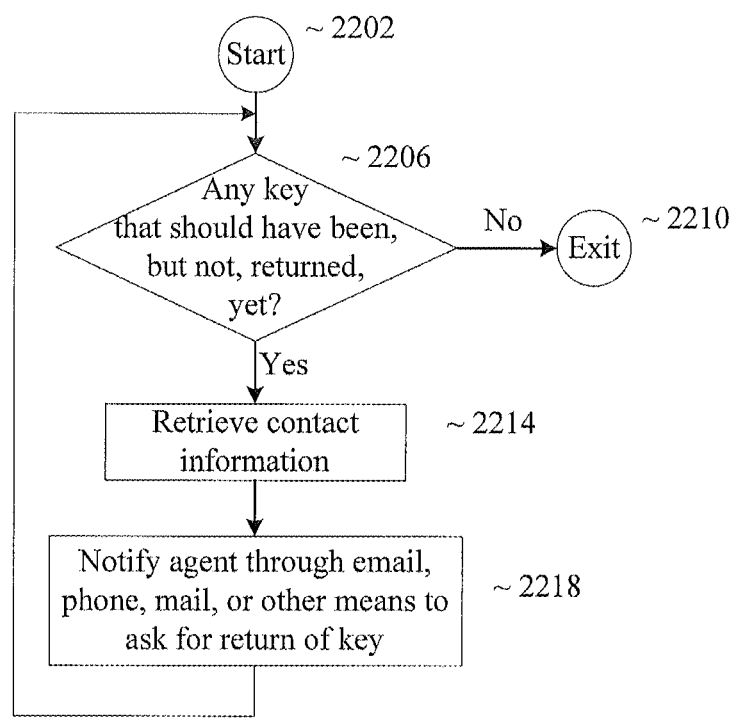
FIG. 22 depicts one possible embodiment of key checking logic executed by a kiosk based showing appointment scheduling system.

FIG. 22 is a flowchart depicting one possible implementation of key monitoring logic that may be implemented as, for example, a software program executing on the showing scheduling system 1902 or the key kiosk 1908. In step 2202, the key monitoring logic method is entered. In step 2206, a check is conducted to determine if any key was checked out, but not timely returned. If not, the method exits in step 2216. However, if there are keys checked out that were not timely returned, contact information for users that checked keys out but did not return them are retrieved in step 2214. In step 2218, the users that were identified in step 2216 are notified through some mechanism, such as email, a telephone call, regular mail, text message, etc. Note that this monitoring logic will require access to a database associating user identifiers with contact information, and, accordingly, may be easier to implement as part of the showing scheduling system 1902.

Figure 23:
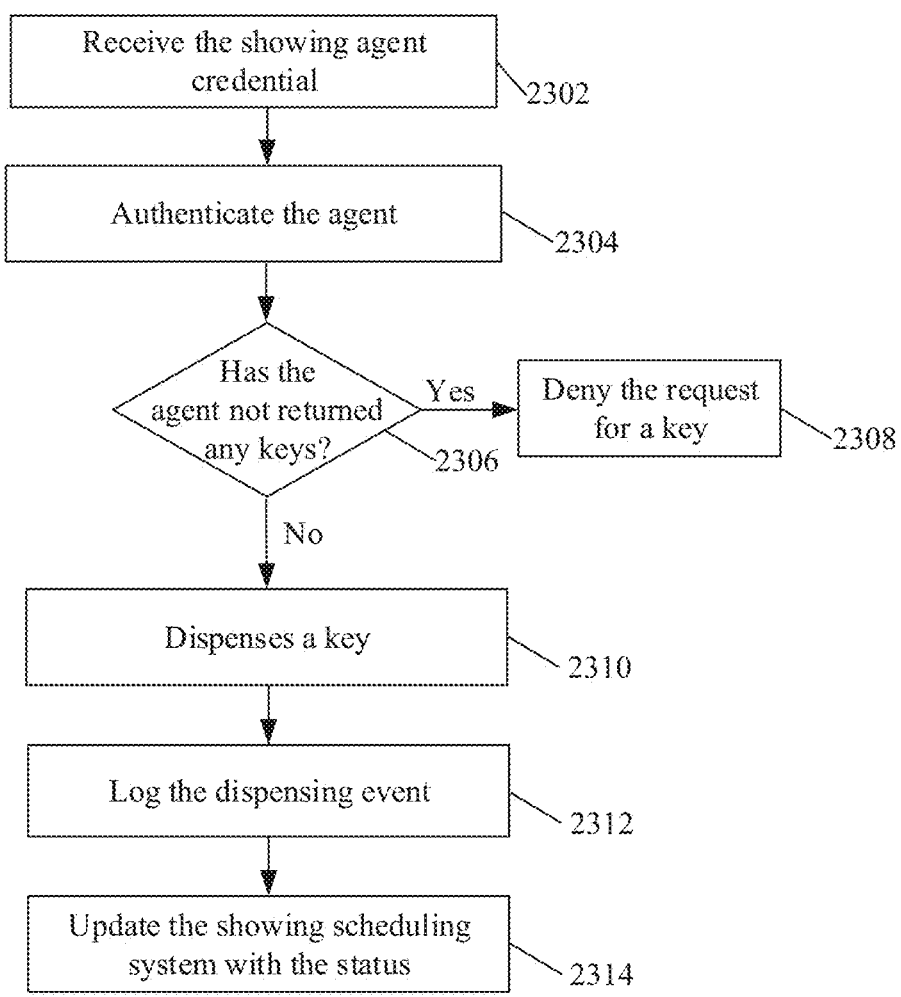
FIG. 23 is a flowchart depicting a process by which a key kiosk denies a key check-out request when the showing agent already has a key checked out in accordance with the present teachings.

In one implementation, when a showing agent fails to return the key to the key kiosk 1908 within a predetermined amount time (such as one hour or three hours) after her showing appointment time, she is not allowed to obtain an additional key from the key kiosk 1908 or a different key kiosk. This rule can be implemented by a software program running on the key kiosk 1908 or the showing scheduling system 1902 (including one or more servers). Referring to FIG. 23, a flowchart depicting a process by which the software program manages the key retrieval process is shown and generally indicated at 2300. At 2302, the software program receives the showing agent credential information that is manually entered by the agent at the key kiosk 1908 for the purpose of obtaining a key from the key kiosk 1908. For example, the showing agent enters her showing agent ID and/or a security code (such as a pin number or password) using a touch screen or keypad of the key kiosk 1908. Alternatively, the showing agent provides her authorization credentials by using an accessing device, such as a smartphone, to transmit her credentials to the key kiosk 1908 over a wireless connection (such as a Bluetooth, Infrared or WiFi connection).

At 2304, based on the showing agent's credential, the software program authenticates the showing agent. For example, the software program communicates with the showing scheduling system 1902 to authenticate the agent. As an additional example, the software program accesses a local database containing authentication information to authenticate the agent. After the agent is authenticated, at 2306, the software program authorizes the showing agent's access to the key kiosk 1908. For example, at 2306, the software program determines whether the showing agent has not returned any checked-out key(s) to the key kiosk 1908 or a different key kiosk. In one implementation, the software program requests the system 1902 to determine whether the showing agent has possession of any unreturned key that should have been returned. The system 1902 accesses a database to determine whether there is any key that the showing agent still have possession of a key that has not been returned beyond a predetermined timeframe from any key kiosks. If so, at 2308, the software program denies the showing agent's request for a key. For example, the software program displays a denial message on a screen of the key kiosk 1908, or plays a sound indicating the denial. In other words, at 2308, the key kiosk 1908 refuses to dispense a key to the showing agent.

Turning back to 2306, if the showing agent does not have any unreturned keys, at 2310, the key kiosk 1908 dispenses a key for the showing agent to access a real property (or property for short). As used herein, a property is also referred to as a listing or property listing. At 2312, the software program logs the key dispensing event. In one implementation, the software program logs the event by recording the event in a local database. In a further implementation, at 2314, the software program communicating the event to the system 1902, which records the event in a database, such as a relational database. The record or records in the database indicate the showing agent, the dispensed key, the key kiosk 1908, date and time when the key is dispensed, etc.

Figure 24:
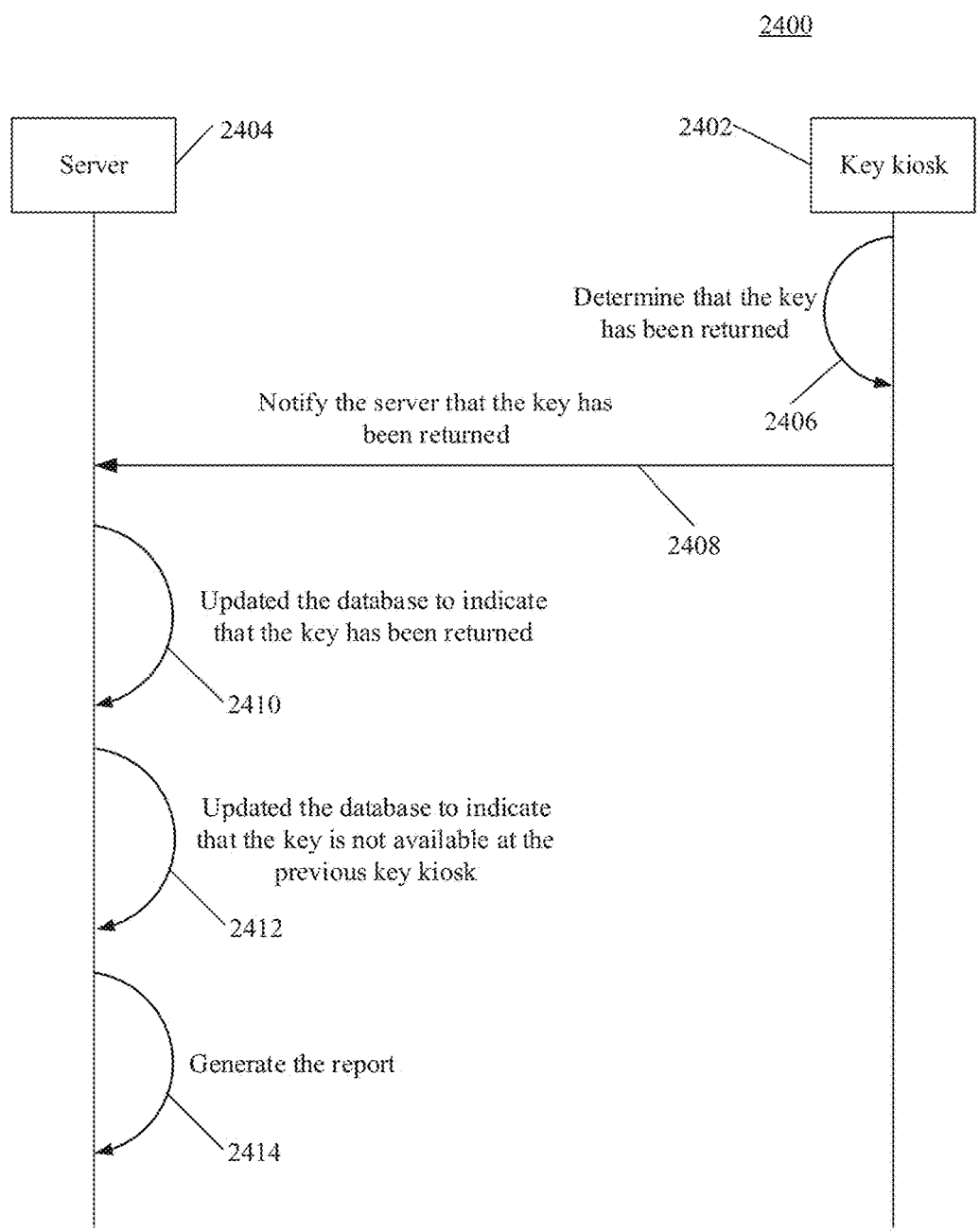
FIG. 24 is a sequence diagram depicting a process by which key return status is updated in accordance with the present teachings.

When the showing agent returns the key, she may return it to the key kiosk 1908 from which the key is dispensed, or a different key kiosk. The system 1902 then updates a database to indicate that the showing agent has returned the key. Turning to FIG. 24, a sequence diagram depicting a process by which key return status is updated is shown and generally indicated at 2400. When the showing agent retrieves the key from the key kiosk 1908, and returns it to a different key kiosk 2400, at 2406, a software program running on the key kiosk 2402 determines that the key has been returned to the key kiosk 2402. At 2408, the software program notifies a server 2404 within the showing scheduling system 1902 that the key has been returned to the key kiosk 2402 by, for example, sending a message, making a web request or calling a web interface to the server 2404. The notification further indicates that the key is now available at the key kiosk 2402, instead of the key kiosk 1908. At 2410, a server software program running on the server 2404 receives the notification, and updates a database reflecting the fact that the key has been returned to the key kiosk 2402 by the showing agent. In a further implementation, at 2412, the database is updated to indicate that the returned key is no longer available at the previous key kiosk 1908.

Moreover, the server software program or a different software program running on a different server provides a report indicating the available keys at each key kiosk, when a key is dispensed (meaning checked out), when a key is returned (meaning checked in), the key kiosk where a key is dispended, the key kiosk where a key is returned, etc. At 2414, the software program generates the report. The report can be generated in response to a request through a web page. Alternatively, the server software program generates the report as part of a background process. For example, at 2:00 AM each morning, the server software program generates the report and saves it on a storage device.

In one embodiment in accordance with the present teachings, when the showing agent schedules a showing appointment to show a property by accessing the showing appointment scheduling system 1902, a barcode (such as a Quick Response Code (QR code)) is generated for retrieving a key from the key kiosk 1908. The retrieved key is used to access the property. For example, the showing agent presents the QR code for scanning by the key kiosk 1908. The software program running on the key kiosk 1908 retrieves information contained in the QR code, and authenticate and authorize the agent based on such information. The retrieved information may include, for example, an identifier of the property, the key kiosk 1908 that contains the key, the showing appointment time (such as beginning time and end time of the showing appointment), the showing agent ID of the showing agent, an access code (such as a pin number), etc.

In one implementation, a server software program running on a server, such as the server 2404, within the system 1902 generates the QR code and presents the QR on a web page. The web page containing the QR code is displayed on a mobile communication device, such as a smartphone, that is used and operated by the showing agent. The showing agent then has the QR code scanned by the key kiosk 1908 for retrieving the key. Alternatively, a mobile software program running on the smartphone generates the QR code, and displays it on the screen of the smartphone for scanning by the key kiosk 1908.

Figure 25:
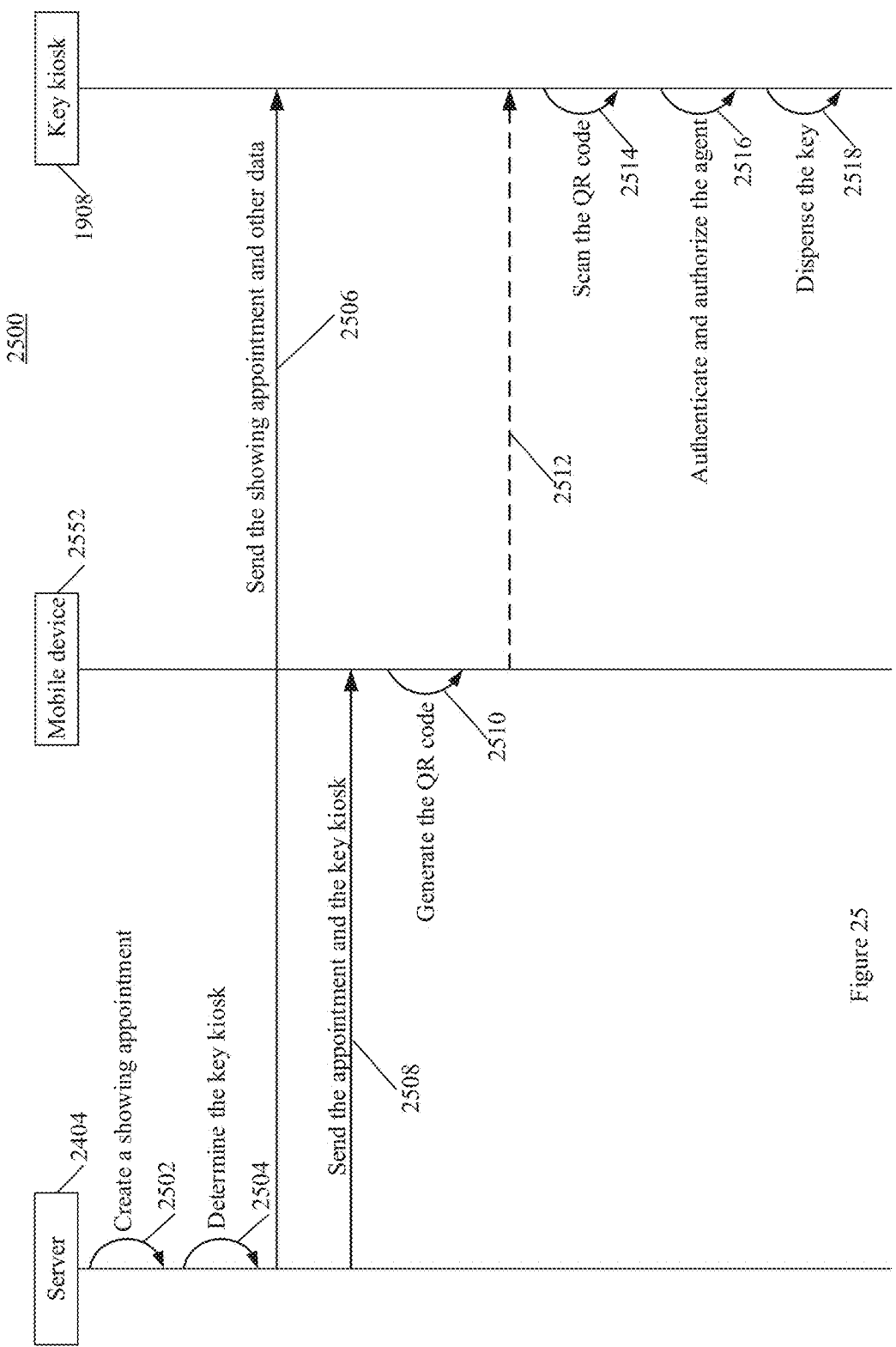
FIG. 25 is a sequence diagram depicting a process by which a QR code is used to retrieve a key from a key kiosk in accordance with the present teachings.

Turning to FIG. 25, a sequence diagram depicting a process by which the QR code is used to retrieve a key from the key kiosk 1908 is shown and generally indicated at 2500. At 2502, the server software program creates a showing appointment identifying the showing appointment beginning time, the showing appointment end time, the property, and the showing agent for the showing appointment. The server software program further saves the generated showing appointment into a database operatively coupled to the server 2404. At 2504, the server software program determines the key kiosk, such as the key kiosk 1908, that contains one or more keys to the property of the showing appointment. The determination can be achieved by, for example, querying the database that includes one or more database records indicating the association between keys, key kiosks and properties.

At 2506, the server software program automatically sends the showing appointment related data (such as showing appointment data and an access code) to the key kiosk 1908 over the network 1904 (such as the Internet). For example, the showing agent ID and the beginning time and end time of the showing appointment are sent to the key kiosk 1908. Alternatively, a security code or a pin number is sent to the key kiosk for the showing appointment. The security code is also provided to the showing agent by, for example, displaying it on a web page when the showing agent makes the showing appointment, or sending it to the smartphone using a text or Email message.

In a further implementation, a starting key retrieval time before the beginning time of the showing appointment is also sent to the key kiosk 1908. The staring key retrieval time determines the earliest time when the agent can access the key kiosk 1908 to obtain the key for the showing appointment. For example, when the showing appointment is from 2:00 PM to 2:45 PM on Apr. 18, 2014, and the starting key retrieval time is 1:45 PM, the agent is only allowed to access the key kiosk 1908 on or after 1:45 PM on Apr. 18, 2014 for retrieving a key to access the property for the scheduled showing appointment. In a different implementation, the element 2506 is not performed. In such a case, the key kiosk 1908 replies on the server 2404 or the system 1902 to make certain decisions. In alternate embodiments, the starting key retrieval time is not set or enforced, or set to a large number.

At 2508, the server software program sends the showing appointment and information (such as ID and location) of the key kiosk 1908 to a mobile device (such as the smartphone) 2552 used by the showing agent. As used herein, the mobile device is said to be associated with the showing agent. In a further implementation, the security code or the pin number sent to the key kiosk 1908 is also provided to the showing agent by, for example, displaying it on a web page when the showing agent makes the showing appointment, or sending it to the mobile device 2552 using a text or Email message. At 2510, the mobile software application running on the mobile device 2552 receives the showing appointment and other data, and generates and displays the QR code. Alternatively, at 2510, the mobile device 2552 displays a web page including the QR code. In such a case, the web page and the QR code are generated by the server 2552.

At 2512, the showing agent presents the QR code for being scanned by the key kiosk 1908 incorporating a QR code scanner device. At 2514, the key kiosk 1908 scans the QR code. At 2516, the software program running on the key kiosk 1908 authenticates and authorizes the showing agent based on the information contained in the QR code. For example, the software program authenticates the showing agent by checking when the showing agent ID and showing appointment time match that received at 2506.

In a different implementation, the software program sends the showing appointment data retrieved from the QR code to the server 2404 for authentication and/or authorization. It should be noted that, at 2516, the agent can be required to enter a security code, pin number, passcode, password, etc., for accessing the key kiosk 1908 to retrieve a key. When the showing agent is authenticated and authorized at 2516, at 2518, the key kiosk 1908 dispenses a key to the agent for accessing the property. It should be noted that the agent may scan the QR code before the starting key retrieval time for the showing appointment. In such a case, the agent is not authorized to retrieve a key from the key kiosk 1908, which will not dispense the key.

In a further implementation, the physical location (meaning geographical location) of the showing agent is used to authenticate and authorize the showing agent for dispensing a key. As used herein, the physical location of the mobile device 2552 is regarded as the physical location of the showing agent. The physical location of the mobile device 2552 is, for example, its GPS (Global Positioning System) location. Alternatively, the physical location of the mobile device 2552 is determined using cellular phone triangulation technologies, or inertia tracking systems. Referring to FIG. 26, a sequence diagram depicting a process by which the physical location of the showing agent is used to retrieve a key from a key kiosk is shown and generally indicated at 2600. At 2502, the server software program generates a showing appointment and stores it into a database. At 2504, the server software program determines the key kiosk 1908 that contains a key for accessing the property for which the showing appointment is made by the showing agent. At 2506, the server software program optionally sends the showing appointment and other data to the key kiosk 1908 over the network 1904.

At 2602, the mobile software program periodically retrieves the GPS location of the mobile device 2552, and provides the GPS locations to the server software program. For example, the GPS location (represented by GPS coordinates) is retrieved by calling an Application Programming Interface ("API"). The GPS coordinates can also be provided by registering a GPS location listener with a GPS system running on the mobile device 2552. At 2604, based on the GPS locations, the server software program determines that the mobile device 2552 is within a predetermined range (defined by a radius or blocks) from the physical location of the key kiosk 1908. At 2606, the server software program notifies the key kiosk 1908 by, for example, sending a message to the key kiosk 1908 over the network 1904 that the showing agent is near the key kiosk 1908 now. In other words, the showing agent is within a predetermined range (such as within one hundred feet) from the key kiosk 1908.

At 2608, the showing agent accesses the key kiosk 1908 trying to retrieve a key to access and show the real property by entering, for example, an access code. The access code can be, for example, her showing agent ID, a security code, a pin number, a passcode, or password. At 2610, the software program running on the key kiosk 1908 retrieves the access code. At 2612, the software program authenticates and authorizes the showing agent based on the access code, the notification sent at 2606, and the showing appointment and other data sent at 2506. For example, the agent is authenticated because of the correct access code is entered and the fact that the showing agent is nearby the key kiosk 1908. In addition, the showing agent is authorized to retrieve a key when she has a showing appointment to show the property and the current time is after the starting key retrieval time for the showing appointment. When the showing agent is authenticated and is authorized to use a key to access the real property, at 2518, the key kiosk dispenses the key.

After the showing of the property, the showing agent returns the key to the key kiosk 1908. In a further implementation, the showing agent is not required to return the key to the key kiosk 1908, and can return the key to a different key kiosk, such as the key kiosk 2402. For example, the showing agent forgets about returning the key to the key kiosk 1908 and leaves the property after the showing. In such a case, as further illustrated by reference to FIG. 27, the showing agent uses the mobile software application running on the mobile device 2552 to locate key kiosks near her physical location.

Figure 27:
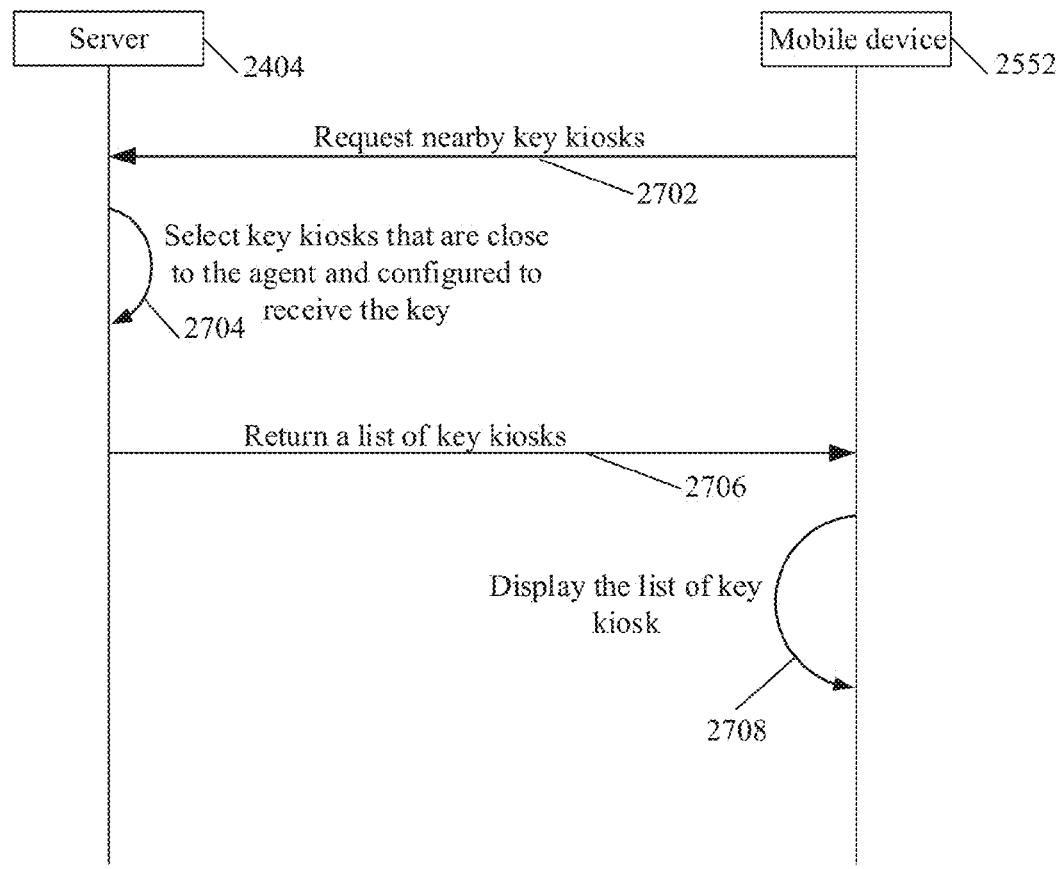
FIG. 27 is a sequence diagram depicting a process by which nearby key kiosks are presented to a showing agent in accordance with the present teachings.

Referring to FIG. 27, a sequence diagram depicting a process by which the mobile software application presents nearby key kiosks to the showing agent is shown and generally indicated at 2700. At 2702, the mobile software application requests for key kiosks near (e.g., within five miles) the showing agent's current physical location by, for example, calling a web service interface of or makes a web request (such as a HTTP request) to the server 2404 over an Internet connection. In one implementation, the physical location is identified by the GPS location of the mobile device 2552. The GPS location is received from the mobile device 2552. The request further indicates the current GPS location of the mobile device 2552, and the identification of the showing agent. At 2704, the server selects key kiosks that are close (meaning within a predetermined range) to the showing agent and are configured to receive the key. At 2706, the server returns a list of key kiosks over an Internet connection. Each key kiosk is indicated by, for example, a GPS location. At 2708, the mobile software application displays the list of key kiosks on a screen of the mobile device 2552. For example, the list of key kiosks is displayed on a map. The showing agent then selects a key kiosk to return the key. Alternatively, the list of key kiosks are displayed on a web page provided by the server 2404.

Oftentimes, a showing agent shows multiple properties in a showing tour route. For example, the showing agent shows four properties during a time frame of five hours. A server software program running on the server 2404 determines the tour route based on, for example, the showing appointment time and GPS location for each of the multiple properties. When access to one or more of the multiple properties requires the showing agent to obtain a key from a key kiosk, it is desirable to include the key kiosk in the showing tour route. The destination and direction to the key kiosk take the showing agent to the key kiosk before she shows the corresponding property. The improved showing tour route generation is further illustrated by reference to FIG. 28.

Figure 28:
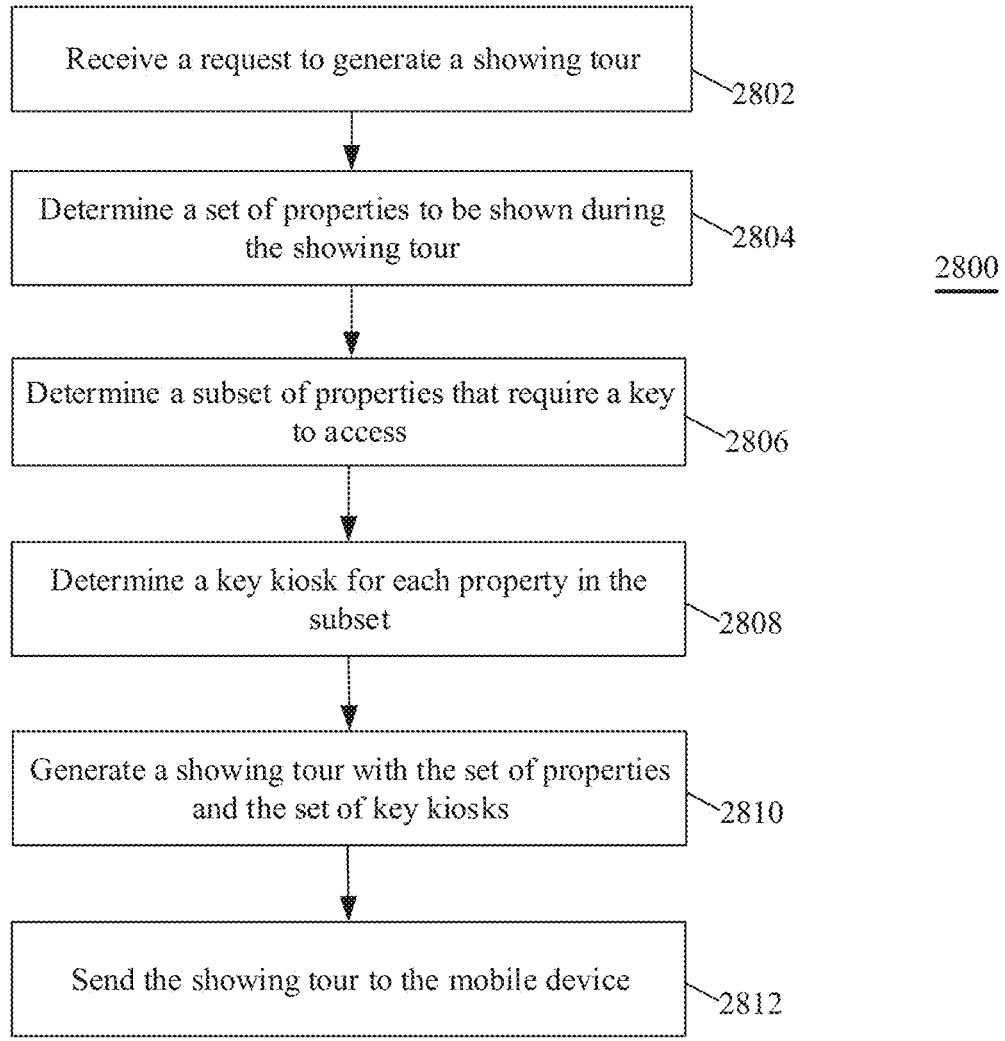
FIG. 28 is a flowchart depicting a process by which a showing appointment scheduling system server determines a showing tour including a key kiosk in accordance with the present teachings.

Referring to FIG. 28, a flowchart depicting a process by which the server 2404 determines a showing tour is shown and generally indicated at 2800. At 2802, the server software program receives a request from, for example, the mobile device 2552 to generate a showing tour. At 2804, the server software program determines a set of properties to be shown by the showing agent during the showing tour. For example, through a web page, the showing agent selects the set of properties for her showing tour. As an additional example, by accessing the showing appointment scheduling system 1902, the showing agent makes a set of showing appointments to show the set of properties. The set of showing appointments identifies the set of properties. Each property has a physical location.

Figure 31:
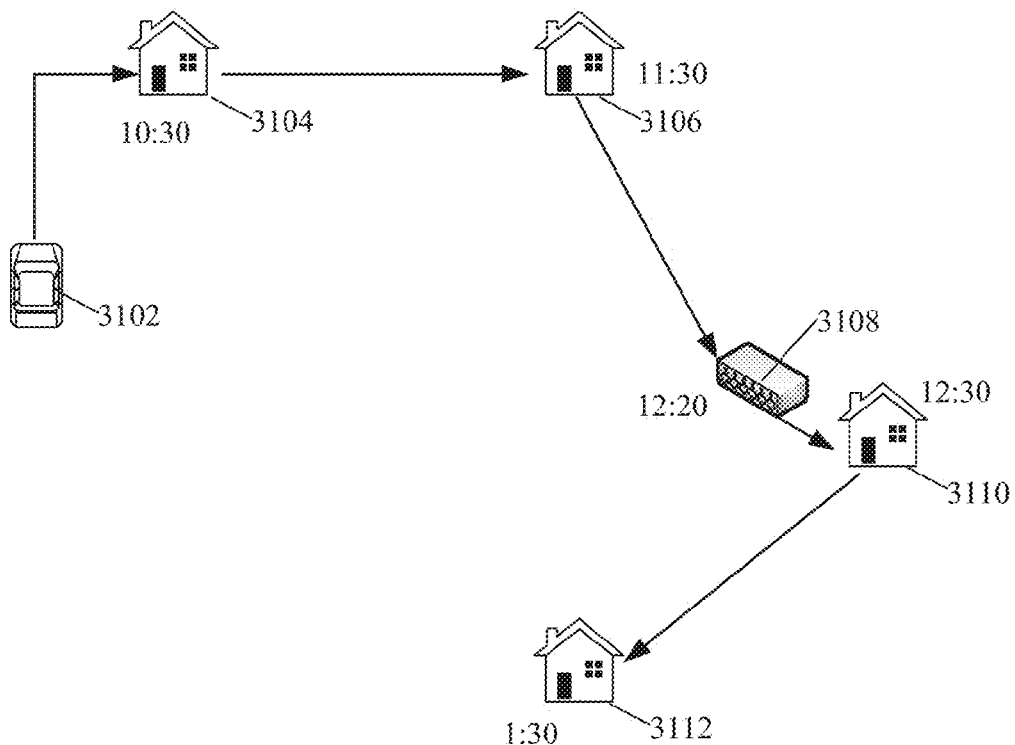
FIG. 31 is a simplified block diagram depicting a showing tour route including a key kiosk in accordance with the present teachings.

At 2806, the server software program determines a subset of properties of the set that require a physical key from a key kiosk to access. The key requirement can be preconfigured and stored in a database. At 2808, the server software program determines a key kiosk for each property in the subset. From the selected key kiosk, the showing agent can check out a key to access the corresponding property. It should be noted that the selected key kiosk needs to have a key available for accessing the corresponding property at the scheduled time of showing. The key availability status for each key kiosk is stored in a database or memory. At 2810, the server software program generates a showing tour with stops at each property in the set and each key kiosk in the set of key kiosks. In the generated tour route, each key kiosk is placed immediately before the corresponding property. A sample showing tour is further illustrated by reference to FIG. 31. The tour 3100 starts from the current position 3102 of the showing agent with the first stop being a property 3104. The second stop is a property 3106. The third stop 3108 is a key kiosk containing a key for accessing a property 3110. The property 3110 is the fourth stop of the tour 3100. The fifth stop of the tour 3100 is a property 3112. It should be noted that directions are not displayed in FIG. 31 for the purpose of simplicity and clarity of illustration.

Turning back to FIG. 28, at 2812, the server software program sends the generated showing tour to the mobile device 2552. For example, the showing tour is presented on a web page. As an additional example, the showing tour is sent to the mobile device 2552 in an Email message or a text message. The showing tour includes a destination address and directions to the destination address for each stop within the tour. The directions are determined based on the immediate preceding stop.

The showing agent sometimes shows multiple properties with common facilities within a short time frame, such as two or three hours. For example, the showing agent shows two condos or apartments of the same building during a single visit to the building. The two condos have a shared main building entrance and/or garage. To access each of the two condo, the showing agent needs a key to enter the main building entrance and a separate key to access the specific condo. However, the showing agent only needs a single key for entering the main building and two separate keys to access the two condos. In such a case, it is desirable that the key kiosk only dispenses a single (not two) key for accessing the main building entrance and two additional keys for the two condos.

Figure 29:
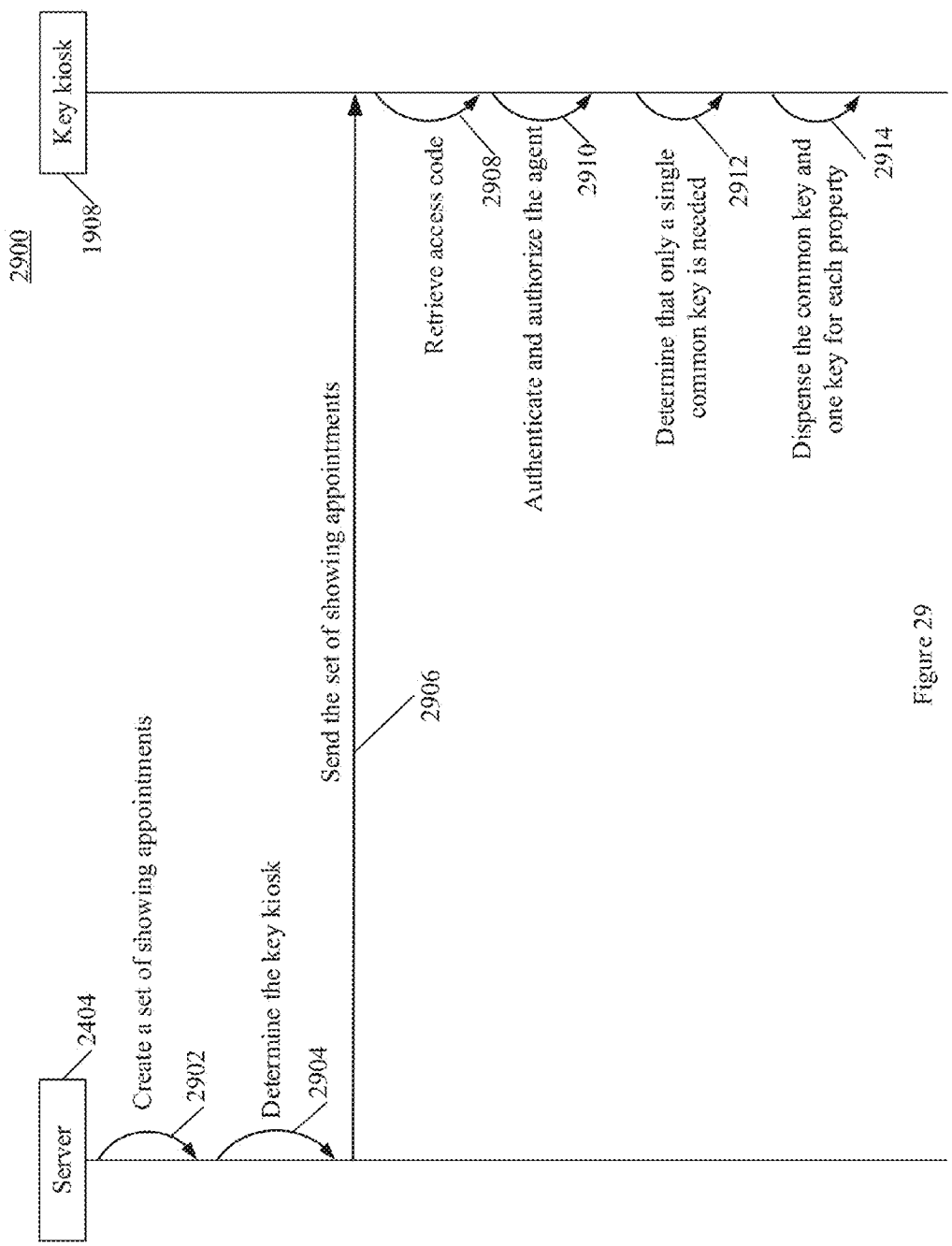
FIG. 29 is a sequence diagram depicting a process by which a key kiosk dispenses a single common key in accordance with the present teachings.

Referring now to FIG. 29, a sequence diagram depicting a process by which only a single key to common facilities is dispensed when multiple properties are shown. At 2902, the server 2404 within the showing appointment scheduling system 1902 creates a set of showing appointments for showing a corresponding set of properties (such as the two condo of the example above). At 2904, the server 2404 determines the key kiosk (such as the key kiosk 1908) that contains available keys for the corresponding set of properties. At 2906, the server 2404 automatically sends the set of showing appointments to the key kiosk 1904 over the network 1904. In a further implementation, at 2906, the server 2404 sends one or more access codes (such as the showing agent's ID) corresponding to the set of showing appointments to the key kiosk 1904.

When the showing agent accesses the key kiosk 1908 to retrieve the keys for the two condos, she enters the access code. At 2908, the key kiosk 1908 retrieves the access code through an input device of the key kiosk 1908. At 2910, the key kiosk 1908 authenticates and authorizes the showing agent based on the access code and the showing appointments. In a different implementation, the key kiosk 1908 sends user input (such as the access code entered by the showing agent) to the server 2404 for authentication and/or authorization. In such a case, the key kiosk 1908 relies on the decision by the server 2404 to determine whether to dispense a key(s) to the showing agent.

When the showing agent is successfully authenticated and authorized, at 2912, the key kiosk 1908 determines that only a single key to a common facility (such as the main building entrance in the example above) is needed to access each property in the set of properties. In a different implementation, the decision that only a single common key is needed is made by the server 2404, and sent to the key kiosk 1908. At 2914, the key kiosk 1908 dispenses the single common key and one additional key for each property in the set of properties.

Figure 30:
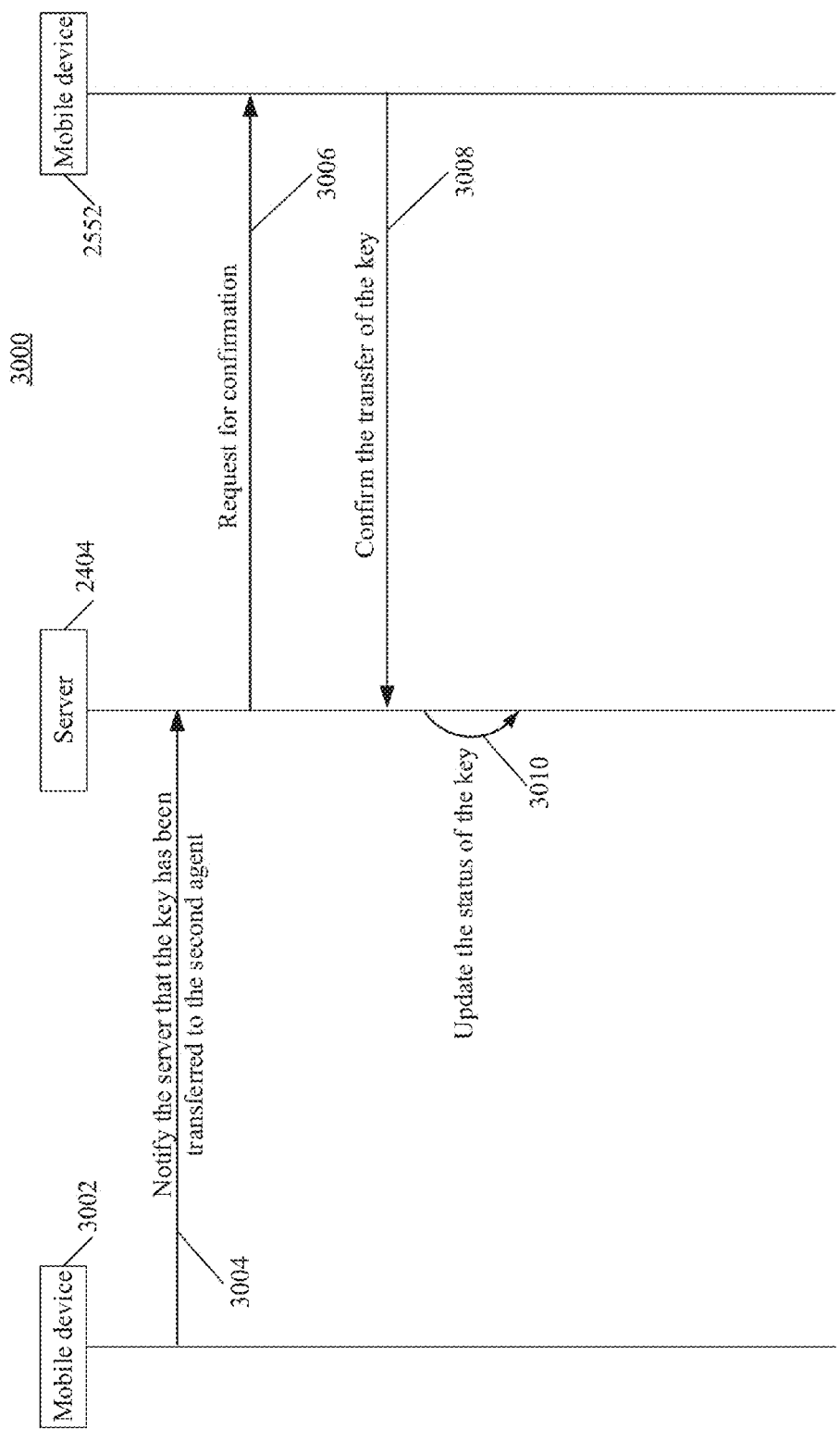
FIG. 30 is a sequence diagram depicting a process by which a showing appointment scheduling system server coordinates a key transfer between showing agents in accordance with the present teachings.

Sometimes, one showing agent physically hands over a key to another showing agent without first returning the key to the key kiosk from which the key is dispensed. In such a case, the showing appointment scheduling system 1902 coordinates the key transfer as further illustrated in FIG. 30. Referring now to FIG. 30, a sequence diagram depicting a process by which the system 1902 coordinates the key transfer is shown and generally indicated at 3000. After the first showing agent transfers a key for accessing a property, she presses, for example, a button provided by the mobile software application running on an associated mobile device 3002 to indicate that she has transferred the key to the second showing agent operating the mobile device 2552.

At 3004, the mobile software application notifies the server 2404 of the transfer of the key by, for example, sending a message to or calling an application programming interface of the server 2404 over an Internet connection. The message indicates that the first agent has transferred the key to the second agent. The agents are identified by, for example, their showing agent IDs. The ID of the second showing agent can be entered on the mobile device 3002 by the first showing agent. Alternatively, the ID of the second showing agent is programmatically determined based on, for example, her showing appointment, the ID of the first showing agent, and the time of the key transfer. At 3006, the server 2404 sends a confirmation request to the mobile device 2552 over the Internet requiring the second showing agent to confirm the key transfer. The request can be, for example, a text message, an Email message, a phone call, or a proprietary application message.

At 3008, the mobile software application running on the mobile device 2552 confirms the key transfer by sending, for example, a replying text message, a replying Email message, a replying phone call, or a replying proprietary application message to the server 2404. At 3010, the server 2404 updates the status of the transferred key. For example, the updated status indicates that the key has been checked out by the second showing agent, instead of the first showing agent. In other words, at 3010, the server 2404 indicates that the key has been returned by the first showing agent, and is checked out by the second showing agent. The status update is recorded in a database.

Figure 32:
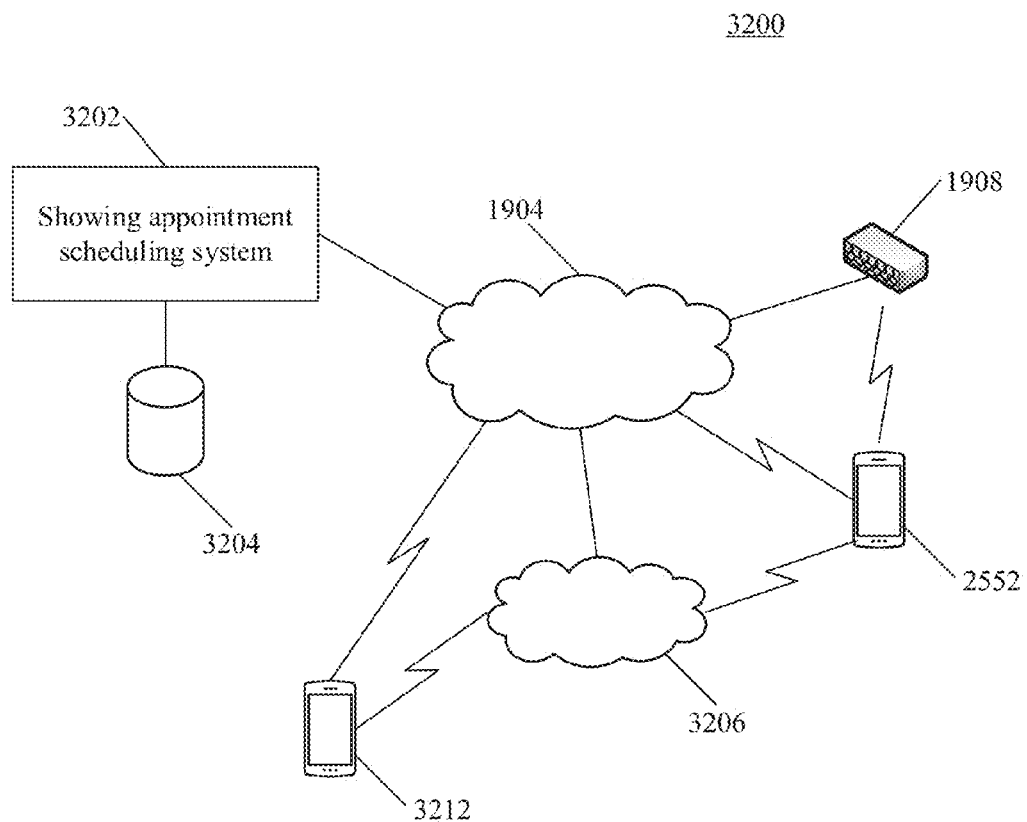
FIG. 32 is a simplified block diagram depicting a real estate showing system in accordance with the present teachings.

Further in accordance with the present teachings, a real estate showing management system providing finger print (also referred to herein as fingerprint) authentication for accessing a key kiosk is shown in FIG. 32 and generally indicated at 3200. Turning to FIG. 32, the system 3200 includes a showing appointment scheduling system (such as the system 1902 or the server 2404) 3202, a database 3204 operatively coupled to the system 3302, the key kiosk 1908 communicating with the system 3202 over the wide area network 1904, a mobile communication device (such as a smartphone) 2552, and a mobile communication device 3212. The mobile device 2552 communicates with the system 3202 over the wide area network (such as the Internet) 1904 via a wireless link. The wireless link can be a WiFi connection or a wireless connection through a public cellular network 3206. The mobile device 3212 communicates with the system 3202 over the wide area network 1904 via a wireless link, such as WiFi connection or a wireless connection via the public cellular network 3206. In one implementation, the mobile device 2552 is operated by a showing agent while the mobile device 3212 is operated by a listing agent (or a home owner). The database 3202 stores showing appointments, data of listing agents, showing agents, listings, and home owners, data of key kiosks, status of keys, etc.

Figure 33:
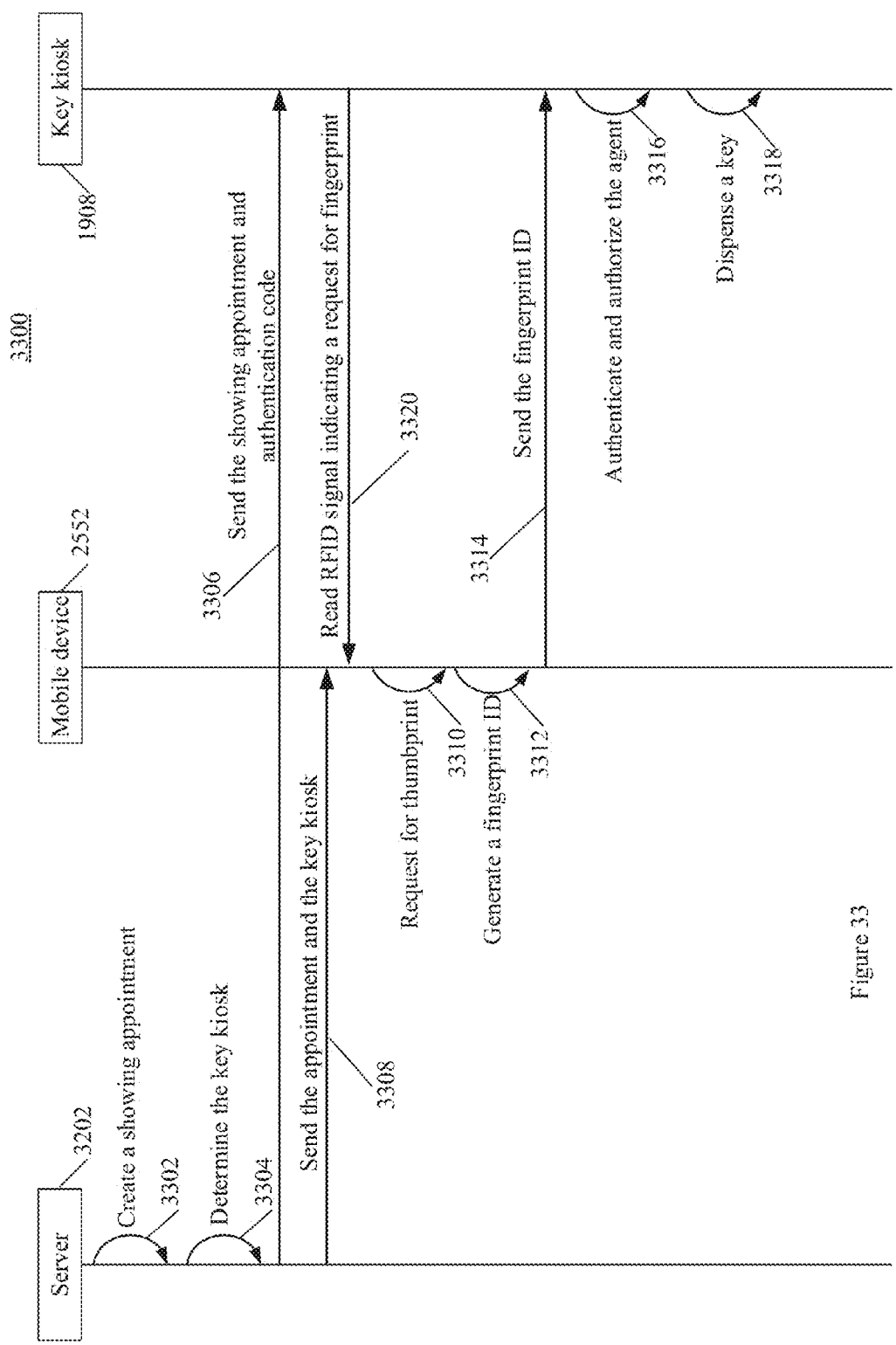
FIG. 33 is a sequence diagram depicting a process by which a showing system authenticates a user based on fingerprint at a key kiosk in accordance with the present teachings.

The system 3200 allows finger print based authentication when an agent using the mobile device 2552 intends to obtain a key from the key kiosk for a real estate property showing appointment. The authentication process is further illustrated by reference to FIG. 33. Referring to FIG. 33, a sequence diagram depicting the process by which finger print authentication is performed is shown and generally indicated at 3300. At 3302, in response to user inputs, the server 3202 creates a showing appointment. In one implementation, the appointment is saved into the database 3202 as well. At 3304, the server 3202 determines a key kiosk that contains a key for accessing the property of the showing appointment. In a further implementation, at 3304, the server 3202 determines more than one key kiosk from which a showing agent corresponding to the showing appointment can obtain a key.

At 3306, the server software program automatically sends the showing appointment related data, such as showing appointment data and a showing agent authentication code, to the key kiosk 1908 over the network 1904. For example, the authentication code is an identifier of the showing agent's finger print. The finger print ID is generated from, for example, a thumb print of the showing agent. In one implementation, the thumb print is generated on and uploaded from the mobile device 2552. In such a case, the server 3202 extracts image features of the thumb print and generates the finger print ID from these features. Alternatively, the finger print ID is generated on and uploaded from the mobile device 2552.

At 3308, the server 3202 sends the showing appointment and an identifier of the key kiosk 1908 to the mobile device 2552. The identifier of the key kiosk 1908 includes a location (such as address or GPS coordinates) of the key kiosk 1908. The mobile device 2552 runs a mobile software application communicating with the server 3202 and receives the showing appointment and the key kiosk data. The mobile device 2552 is equipped with GPS capabilities.

At 3310, when the showing agent operating the mobile device 2552 approaches the key kiosk 1908 for the purpose of obtaining a key to show a property in accordance with the showing appointment, the mobile software application recognizes that the showing agent is nearby the key kiosk 1908 based GPS locations of the mobile device 2552 and the key kiosk 1908. Furthermore, at 3310, the mobile software prompts the showing agent to submit a thumbprint. For example, the mobile software application plays a reminding sound and displays a user interface for the showing agent to press her/his thumb against the screen of the mobile device 2552.

At 3312, the mobile software application captures an image of the thumb, extracts image features from the image (i.e., the fingerprint), and generates a fingerprint ID from the features. At 3314, the mobile software application sends the fingerprint ID to the key kiosk 1908. At 3316, the mobile software application receives the fingerprint ID, and authenticates the showing agent by comparing the fingerprint ID against the authentication code received at 3306. When the showing agent is successfully authenticated, at 3318, the key kiosk 1908 dispenses a key to the showing agent. The key kiosk 1908 then updates the server 3202 with the status of the key.

The mobile device 2552 communicates with the key kiosk 1908 over a wireless link, such as Blue Tooth and WiFi. In a different implementation, the showing agent holds the mobile device to tap a RFID tag on the key kiosk tag attached to the key kiosk 1908. The mobile software application then reads a RFID signal indicating a request for fingerprint authentication. In such a case, the mobile software application performs the element 3310.

Figure 34:
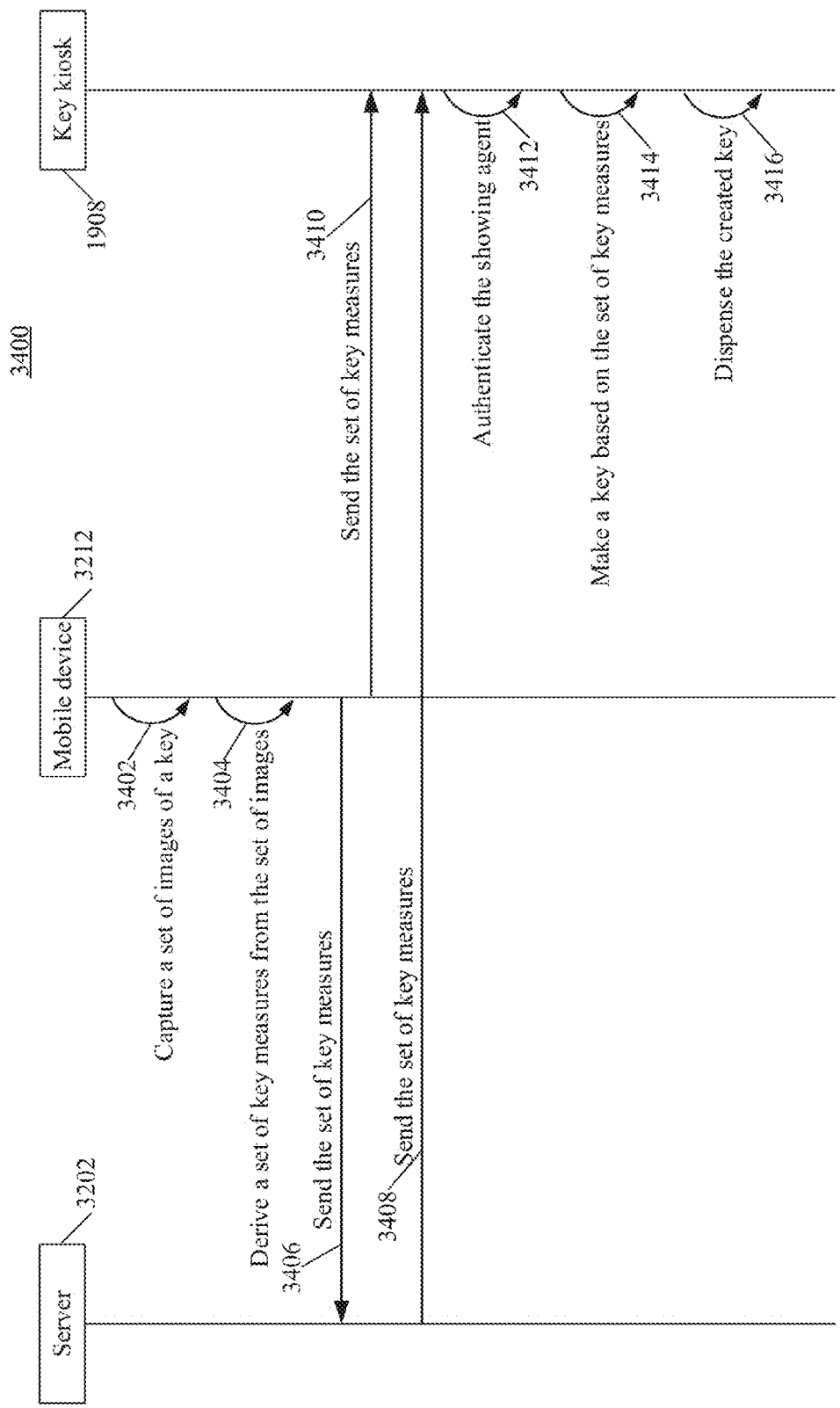
FIG. 34 is a sequence diagram depicting a process by which a showing system manages showing appointments and provides keys created from key kiosks in accordance with the present teachings.

Further in accordance with the present teachings, the key kiosk 1908 is capable of creating a physical key for accessing a property from digital data specifying the key. The system 3200 thus allows showing agents retrieve keys from the key kiosk 1908 without requiring listing agents or home owners to deposit their physical keys into the key kiosk 1908. The process of managing showing appointments and keys made by key kiosks from blank key templates is further illustrated in FIG. 34 and generally indicated at 3400. Referring to FIG. 34, at 3402, the mobile device 3212 captures a set of images of a physical key. For example, when a listing agent lists a real estate property for sale, she/he uses a mobile software application running on the mobile device 3212 to captures a set of pictures of the keys. For instance, pictures of the top view, the bottom view, the left side view and the right side view of the key are taken. At 3404, the mobile software application analyzes the set of images and derives a set of key measures of the key from the set of images. The set of key measures specify the physical dimensions, characteristics and features of the key. The set of key measures provides sufficient details of the key to allow the key kiosk 1908 to make a copy of the physical key from the set of key measures.

At 3406, the mobile software application sends the set of key measures to the server 3202. At 3408, the server 3202 sends the set of key measures to the key kiosk 1908. Alternatively, the mobile device 3212 sends the set of key measures to the key kiosk 1908. The key kiosk 1908 is selected based on, for example, its proximity to the real estate property of a showing appointment scheduled by the server 3202.

When a showing agent makes a showing appointment to show the property, the server 3202 sends the showing appointment to the key kiosk 1908, and sends the identifier of the key kiosk 1908 to the mobile device 2552 operated by the showing agent. The showing agent then accesses the key kiosk 1908 to retrieve a key for her/his showing appointment by, for example, entering an authentication code or submitting a fingerprint. Accordingly, at 3412, the key kiosk 1908 authenticates the showing agent. Once the showing agent is authenticated, at 3414, the key kiosk 1908 creates a copy key from a blank key template based on the set of key measures. At 3416, the key kiosk 1908 dispenses the copy key made at 3414. The key kiosk 1908 then notifies the server 3202 that a copy key has been dispensed for the showing appointment. The server 3202 receives the status update and stores it into the database 3204.

Figure 35:
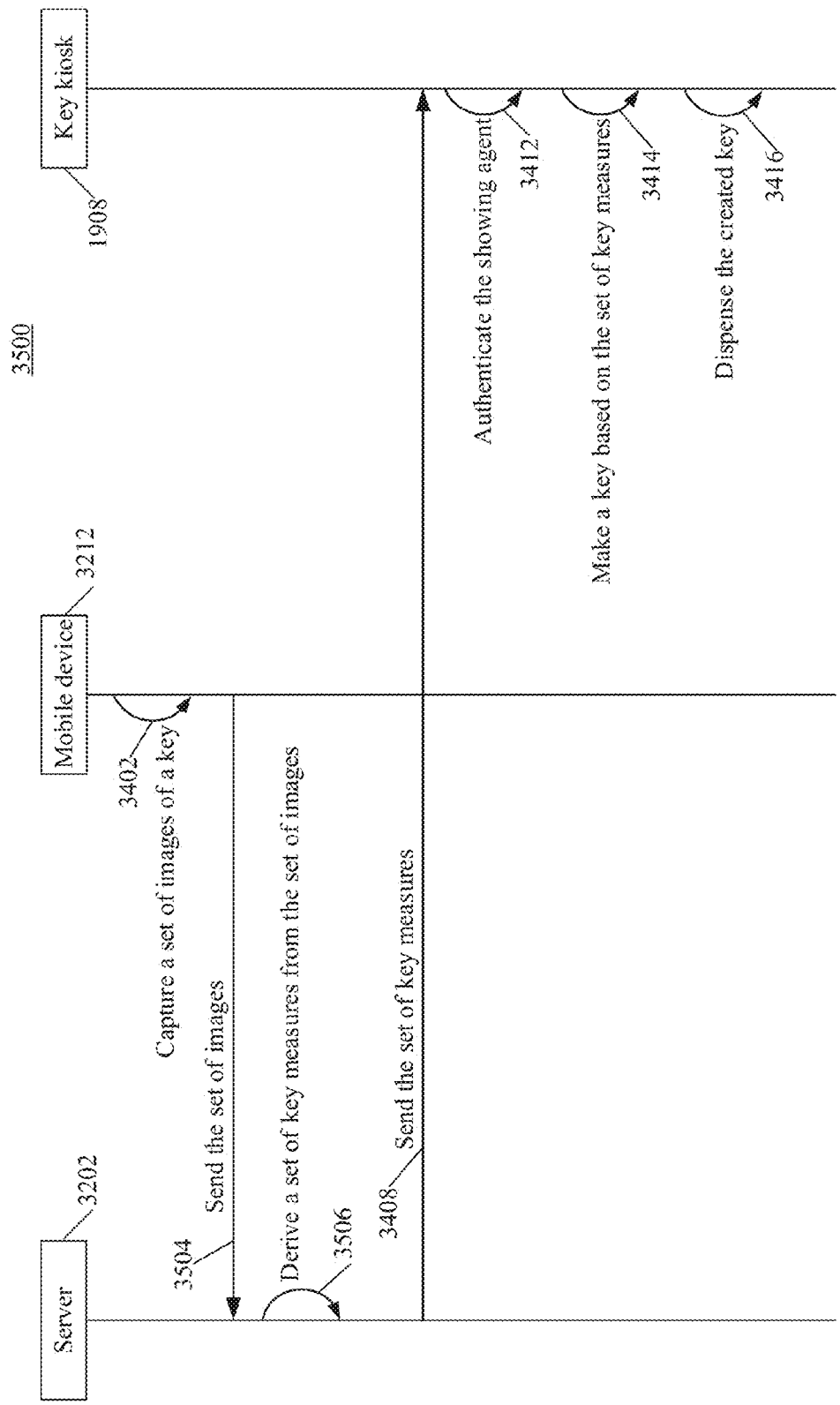
FIG. 35 is a sequence diagram depicting a process by which a showing system manages showing appointments and provides keys created from a key kiosk in accordance with the present teachings.

In a different implementation, the mobile device 3212 provides the set of images to the server 3202 as shown in FIG. 35. At 3504, the mobile device 3212 sends the set of images to the server 3202. At 3506, a server software application running on the server 3202 derives the set of measures from the set of images.

Obviously, many additional modifications and variations of the present disclosure are possible in light of the above teachings. Thus, it is to be understood that, within the scope of the appended claims, the disclosure may be practiced otherwise than is specifically described above. For example, a QR code or RFID (meaning Radio Frequency Identification) tag is printed on each key. When the key is obtained from and returned to a front desk person. The front desk person scans the QR code or RFID tag when the key is checked out and checked in. The scanner is connected to a computer which sends the key status to the server 2404.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for managing real estate property keys, the method performed by a key kiosk, the method comprising:
1) providing a first status of a first key within a set of keys to a server within a showing appointment management system over the Internet, said key kiosk containing said set of keys for a set of real estate properties, said first status indicating said first key available for accessing a first real estate property within said set of real estate properties;
2) receiving a showing appointment for showing said first real estate property and a fingerprint based authentication code from said server over the Internet, said showing appointment including a date, time, and user identifier, said appointment requested by a showing agent and generated by said showing appointment management system, said fingerprint based authentication code generated from a fingerprint of said showing agent;
3) receiving a fingerprint identifier from a mobile communication device, said fingerprint identifier generated from image features derived from a fingerprint image of said showing agent captured by said mobile communication device;
4) authenticating said showing agent based on said showing appointment, said fingerprint authentication code, and said fingerprint identifier;
5) where said showing agent is authorized, dispensing said first key; and
6) communicating to said server a second status of said first key as dispensed to said authorized showing agent from said key kiosk.

2. The method of claim 1, wherein said mobile communication device is adapted to prompt said showing agent to submit a fingerprint, capture an image of a finger of said showing agent, extract image features from said image, and generate said fingerprint identifier from said image features.

3. The method of claim 2, wherein said finger is a thumb of said showing agent.

4. The method of claim 2, wherein said mobile communication device prompts said showing agent to submit said fingerprint when said mobile communication device recognizes that it is in a close range of said key kiosk based on GPS locations of said mobile communication device and said key kiosk.

5. The method of claim 2, wherein said mobile communication device prompts said showing agent to submit said fingerprint when said mobile communication device reads a RFID signal from a RFID tag of said key kiosk, said RFD signal indicating a request for fingerprint authentication.

6. A method for managing real estate property keys, the method performed by a key kiosk, the method comprising:
1) receiving a showing appointment for showing a real estate property from a server within a showing appointment management system over the Internet, said showing appointment including a date, time, and user identifier, said appointment requested by a showing agent and generated by said showing appointment management system;
2) receiving a set of key measures from said server over the Internet;
3) receiving a fingerprint based authentication code from said server over the Internet, said fingerprint based authentication code generated from a fingerprint of said showing agent;
4) receiving a fingerprint identifier from a first mobile communication device, said fingerprint identifier generated from image features derived from a fingerprint image of said showing agent captured by said first mobile communication device;
5) authorizing said showing agent based on said showing appointment, said fingerprint based authentication code, and said fingerprint identifier;
6) where said showing agent is authorized, creating a copy key based on said set of key measures; and
7) dispensing said copy key for accessing said real estate property.

7. The method of claim 6, wherein said server determines said set of key measures by receiving said set of key measures from a second mobile communication device, wherein said second mobile communication device is adapted to capture a set of images of a physical key for said real estate property, derive said set of key measures from said set of images, and send said set of key measures to said server.

8. The method of claim 6, wherein said server determines said set of key measures by deriving said set of key measures from a set of images of a physical key for said real estate property, wherein said set of images is captured by and received from a second mobile communication device.

9. The method of claim 6, wherein said first mobile communication device is adapted to prompt said showing agent to submit a fingerprint for generating said fingerprint identifier from said image features.

10. The method of claim 8, wherein said first mobile communication device prompts said showing agent to submit said fingerprint when said first mobile communication device recognizes that it is in a close range of said key kiosk based on GPS locations of said first mobile communication device and said key kiosk.

11. The method of claim 8, wherein said first mobile communication device prompts said showing agent to submit said fingerprint when said first mobile communication device reads a RFD signal from a RFID tag of said key kiosk, said RFID signal indicating a request for fingerprint authentication.

* * * * *